United States Patent
Mizumaki et al.

[11] Patent Number: 6,006,041
[45] Date of Patent: Dec. 21, 1999

[54] DISPLAY DEVICE

[75] Inventors: Masao Mizumaki, Yokohama; Kazuki Konishi, Tokyo, both of Japan

[73] Assignee: Canon Kabushiki Kaisha, Tokyo, Japan

[21] Appl. No.: 09/038,110

[22] Filed: Mar. 11, 1998

[30] Foreign Application Priority Data

| Mar. 12, 1997 | [JP] | Japan | 9-074690 |
| Jun. 6, 1997 | [JP] | Japan | 9-163481 |
| Jun. 6, 1997 | [JP] | Japan | 9-163484 |
| Jun. 6, 1997 | [JP] | Japan | 9-163487 |

[51] Int. Cl.$^6$ .................................................. G03B 17/20
[52] U.S. Cl. .............................. 396/296; 396/52; 396/55
[58] Field of Search .............................. 396/296, 52, 55

[56] References Cited

U.S. PATENT DOCUMENTS

| 3,672,286 | 6/1972 | Wagner et al. | 396/296 |
| 4,067,030 | 1/1978 | Kuramoto et al. | 396/296 |
| 4,804,992 | 2/1989 | Moriyama et al. | 396/296 |
| 5,218,396 | 6/1993 | Morisawa | 396/296 |
| 5,579,077 | 11/1996 | Owashi | 396/296 |
| 5,734,428 | 3/1998 | Suda et al. | 396/296 |
| 5,740,482 | 4/1998 | Inazuka | 396/296 |
| 5,754,900 | 5/1998 | Suda | 396/296 |
| 5,802,408 | 9/1998 | Suda | 396/296 |
| 5,893,650 | 4/1999 | Ohmura | 396/296 |

FOREIGN PATENT DOCUMENTS

| 63-275917 | 11/1988 | Japan . |
| 1-123219 | 5/1989 | Japan . |
| 5-204021 | 8/1993 | Japan . |

*Primary Examiner*—Russell Adams
*Attorney, Agent, or Firm*—Fitzpatrick, Cella, Harper & Scinto

[57] ABSTRACT

There is disclosed an arrangement which has a projection means (LEDs) for projecting a light, a display means (mirror, finder view field range and the like) for guiding the light projected by the projection means to a predetermined display portion to display an index in the display portion, a variable means (masks, motor, decentring axis and the like) for periodically changing a projecting direction of the light of the projection means, and a control means (mask position detection circuit, control circuit and the like) for determining a projection timing of the projection means in accordance with the projecting direction changed by the variable means to control a position of the index on the display portion. By controlling the projection timing of the projection means, the position of the index in the display portion is controlled. Thereby, without irregularly or complicatedly changing the projecting direction itself, the index can be variously displayed.

20 Claims, 29 Drawing Sheets

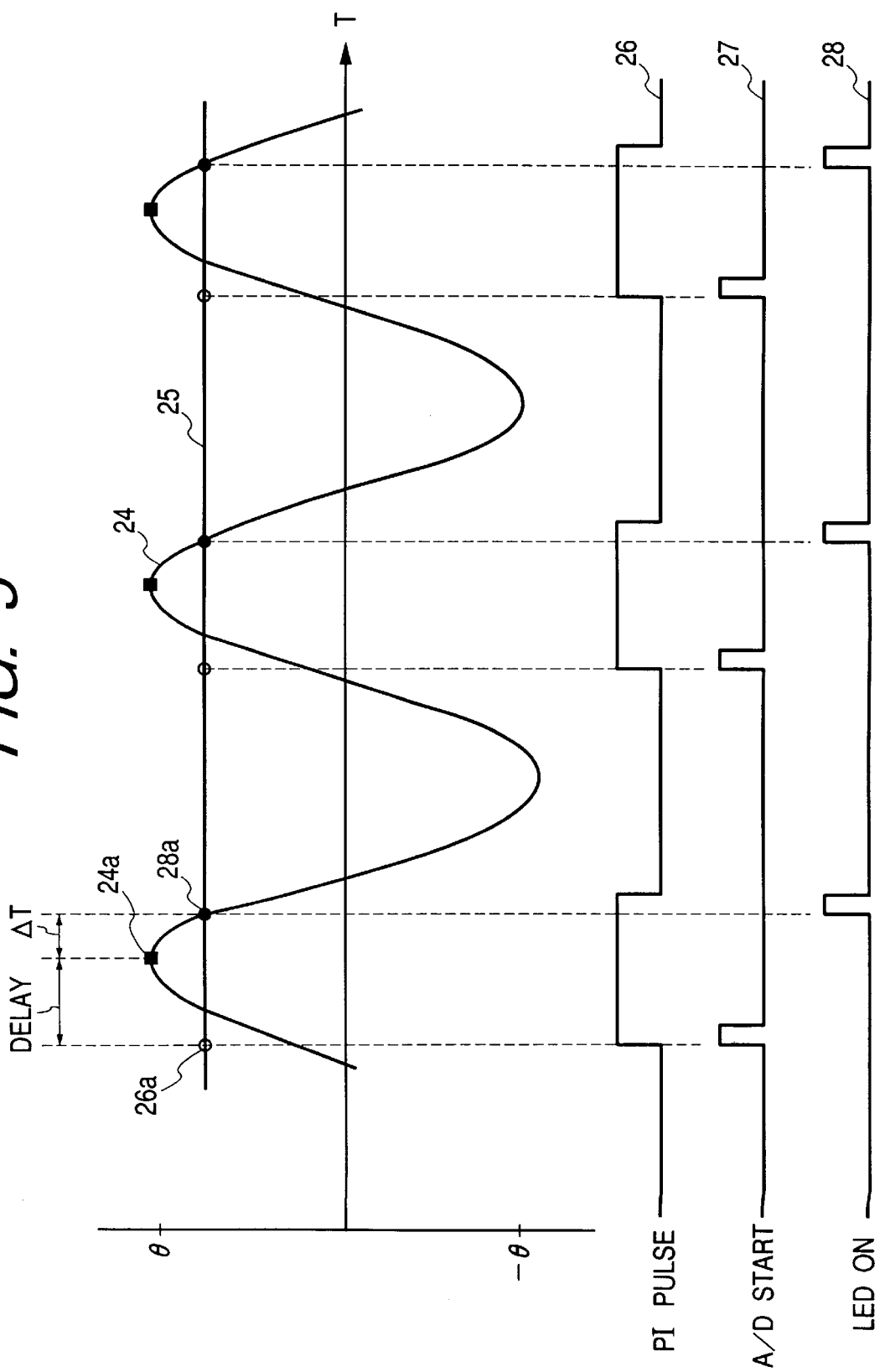

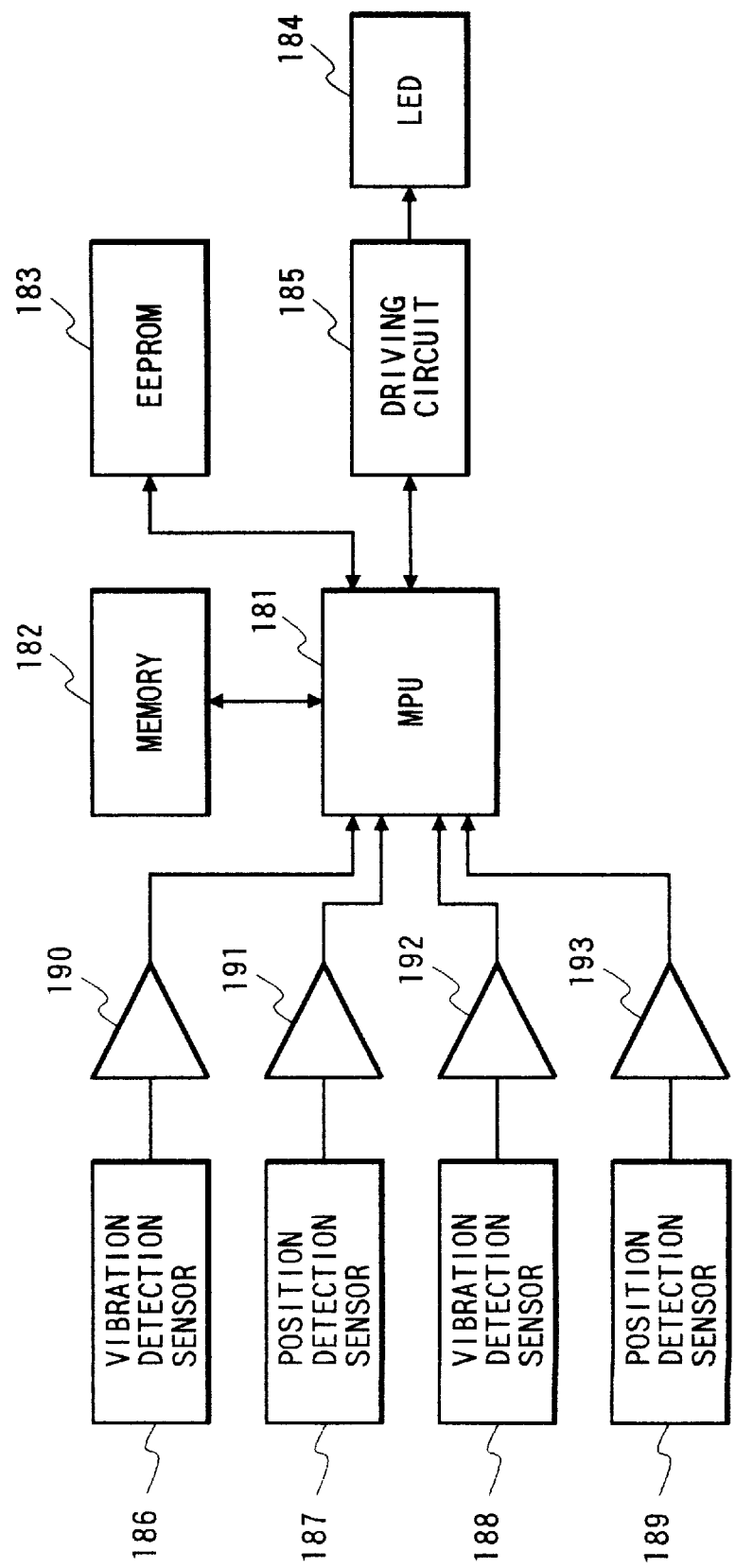

FIG. 29

|  | MAIN SWITCH ON | RELEASE OPERATION ELEMENT IN HALF SWITCHING ON (s1) | RELEASE OPERATION ELEMENT IN FULL SWITCHING ON (s2) | DURING EXPOSURE | MAIN SWITCH OFF |
|---|---|---|---|---|---|
| VIBRATION DETECTION SENSOR | ON |  | ON | ON | OFF |
| BLUR PREVENTION DISPLAY | OFF | ON AFTER DISTANCE MEASURING COMPLETION | ON | OFF AFTER EXPOSURE | OFF |
| BLUR CORRECTION | OFF | CENTERING | ON IN NEEDING BLUR CORRECTION | OFF AFTER EXPOSURE | OFF |

DISPLAY DEVICE

BACKGROUND OF THE INVENTION

1. Field of the Invention

The present invention relates to a display device for a display in a finder or the like of a camera or an optical apparatus.

2. Related Background Art

Recently, developments and researches have been eagerly advanced for a camera which can prevent a failure in photographing caused by a blurring from a hand vibration by a photographing person.

The camera is provided with a vibration sensor which accurately detects a vibration of the camera. Usually, by operating a correction mechanism for decentring a photographing optical axis based on detected information, an image blur is suppressed.

However, in a compact camera, since a finder is of an external type, not of a TTL system, the correction mechanism for decentring the photographing optical axis can correct a blur of an image being photographed, but cannot correct a blur in the finder while a photographing person aims at an object. Therefore, a finder mechanism also requires another image blur correction means.

To solve the problem, for example, the Japanese Patent Application Laid-open No. 5-204021 discloses a camera in which by restricting a periphery of a finder view field with an LCD (liquid crystal display), a blur quantity and a blur correction quantity are displayed.

Also, the Japanese Patent Application Laid-open No. 1-123219 discloses a camera in which a blurring from a hand vibration is optically displayed as a movement of a photo image.

On the other hand, recently, for the purpose of preventing a mistake of middle-off in automatic focusing (a phenomenon in which although a distance measuring region exists in a central point, a distance is measured by mistake in a case where main objects exist on the right and left sides in a finder view field or in other cases), a multipoint AF camera has become popular which is provided with plural distance measuring regions in a photographing screen.

In the finder view field of the camera, in many cases a distance measuring index exists only in a central portion. Therefore, it cannot be determined whether or not the middle-off can be prevented.

To solve the problem, a camera is increasingly manufactured and generalized in which only a distance measuring index of a selected distance measuring region is displayed by using an LCD incorporated in a finder optical system.

However, in the conventional camera disclosed in the aforementioned Japanese Patent Application Laid-open No. 5-204021, by restricting the display in the finder view field frame by the LCD, the blur quantity and the blur correction quantity are displayed, thereby resulting in following disadvantages.

(1) Since a resolution of a display pitch is determined by a divided pitch of an LCD segment, a blur is displayed remarkably roughly. A feeling of moving linearly in response to a blurring from a hand vibration cannot be grasped.

(2) Since the LCD needs to be incorporated in the finder optical system, the finder is made remarkably dark by the influence of an LCD transmittance and a polarizing plate.

(3) The LCD largely increases a cost.

Also, in the conventional camera disclosed in the aforementioned Japanese Patent Application Laid-open No. 1-123219, the blurring from the hand vibration is optically displayed as the movement of the photo image, but an effect of correction of the blurring is not displayed.

On the other hand, in the conventional multipoint AF camera, only the distance measuring index of the distance measuring region selected from plural distance measuring regions can be displayed. However, since the LCD is used, following defects are present: the finder becomes remarkably dark because of the influence of the LCD transmittance and the polarized plate; and the LCD largely increases a cost.

SUMMARY OF THE INVENTION

One aspect of the invention provides an arrangement which has a projection means for projecting a light, a display means for guiding the light projected by the projection means to a predetermined display portion to display an index in the display portion, a variable means for periodically changing a projecting direction of the light of the projection means, and a control means for determining a projection timing of the projection means in accordance with the projecting direction changed by the variable means to control a position of the index on the display portion. By controlling the projection timing of the projection means, the position of the index in the display portion is controlled. Thereby, without changing the projecting direction irregularly or complicatedly, the index can be variously displayed.

BRIEF DESCRIPTION OF THE DRAWINGS

FIG. 5 shows a control image of an LED light-on timing in the first embodiment of the invention.

FIG. 19 is a block diagram showing a signal processing system of the finder display device provided with a blur prevention display function of FIG. 16.

FIG. 29 shows a relationship between a sequence and a blur prevention system in the camera of FIG. 24.

DETAILED DESCRIPTION OF THE PREFERRED EMBODIMENTS

Embodiments of the present invention will be described in detail with reference to the accompanying drawings.

(First Embodiment)

Figure 1:
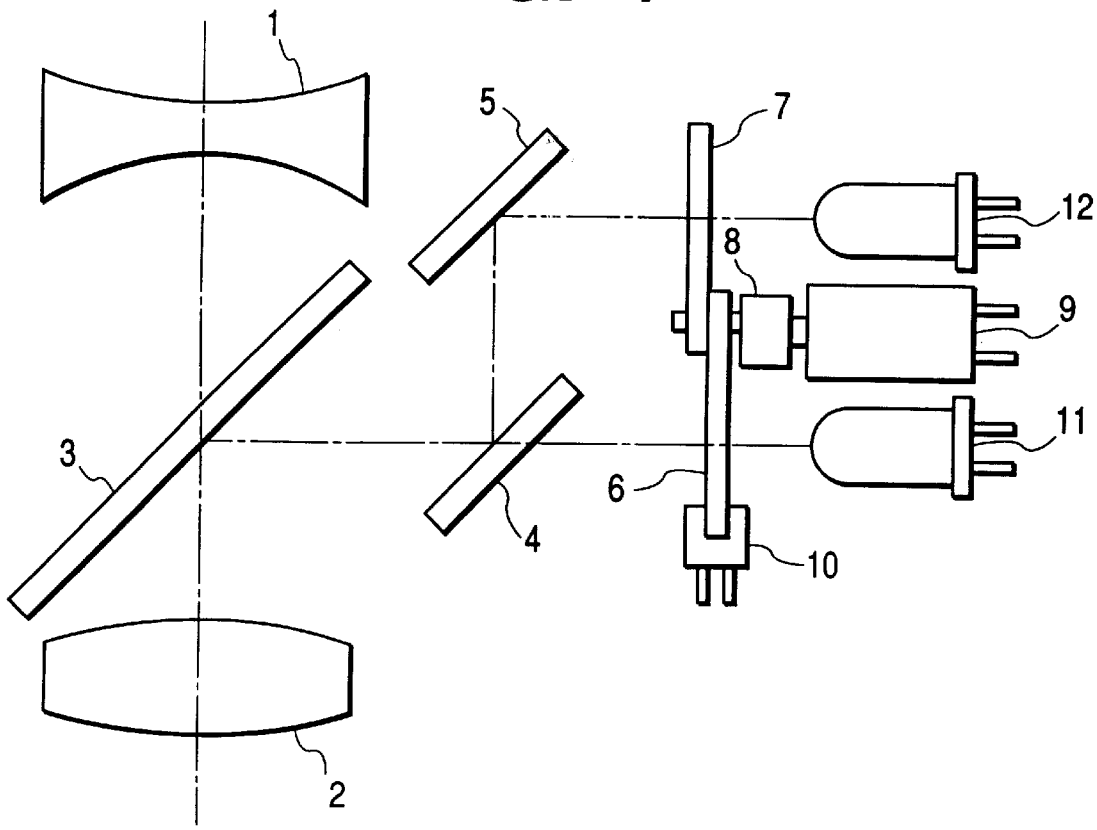
FIG. 1 is a top-face view of a finder display mechanism in a camera according to a first embodiment of the invention.

FIG. 1 is a top-face view of a camera finder display mechanism according to a first embodiment of the invention. In FIG. 1, numeral 1 denotes an objective lens, 2 denotes an eyepiece lens, 3 and 4 denote translucent mirrors, and 5 denotes a total reflection mirror. Numeral 6 denotes a mask for a blur correction display in a pitch direction (vertical direction of the camera), 7 denotes a mask for a blur correction display in a yaw direction (transverse direction of the camera), and these components are engaged with a decentring axis 8. The decentring axis 8 is inserted with pressure into a rotation axis of a motor 9. Numeral 10 denotes a photo interrupter which detects a position of the mask 6 for the blur correction display in the pitch direction, 11 denotes an LED for the blur correction display in the pitch direction, and 12 denotes an LED for the blur correction display in the yaw direction.

After a light of the LED 11 is restricted to a predetermined configuration by the mask 6, the light is passed through the translucent mirror 4 and reflected by the translucent mirror 3 in a direction of the eyepiece lens 2. Also, after a light of the LED 12 is restricted to a predetermined configuration by the mask 7, the light is reflected by the total reflection mirror 5 and the translucent mirror 4, and further reflected by the translucent mirror 3 in the direction of the eyepiece lens 2.

A photographing person can observe an object image formed by the objective lens 1 and the eyepiece lens 2, and can additionally observe photo images of the LEDs 11 and 12 simultaneously on the translucent mirror 3.

Figure 2:
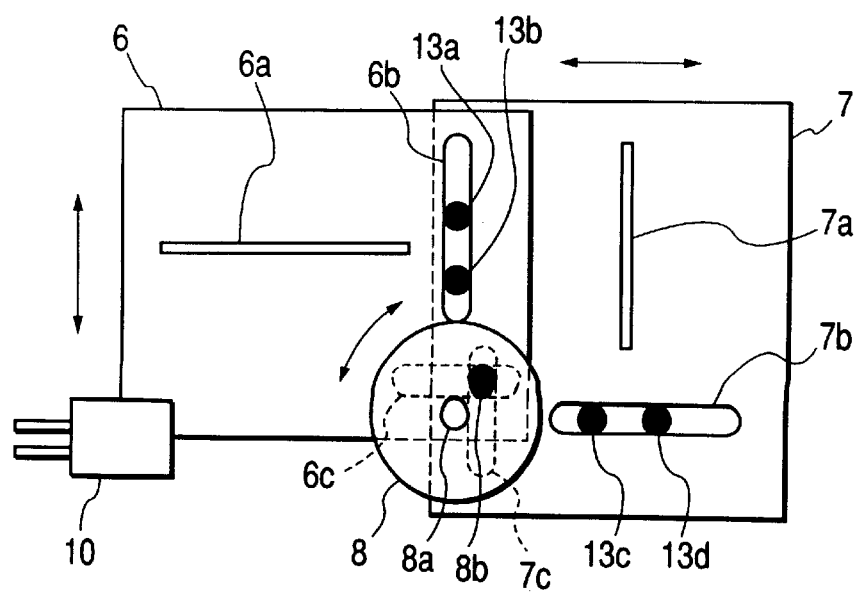
FIG. 2 is an enlarged partial view of FIG. 1.

FIG. 2 is an enlarged view of the masks 6 and 7, the decentring axis 8 and the photo interrupter 10 in FIG. 1, and an enlarged partial view of FIG. 1 as seen from the right side.

As shown in FIG. 2, an opening 6a and elongated holes 6b and 6c are formed in the mask 6, while an opening 7a and elongated holes 7b and 7c are formed in the mask 7.

The mask 6 can move vertically in the figure with the elongated hole 6b engaged with protrusions 13a and 13b of a bottom board 13 (not shown). The mask 7 can move in a transverse direction in the figure with the elongated hole 7b engaged with protrusions 13c and 13d of the bottom board 13.

The decentring axis 8 is rotated about the rotation axis 8a inserted with pressure in the motor 9. A protrusion 8b provided in a position decentring by a predetermined distance from the rotation axis 8a is engaged in the elongated hole 6c of the mask 6 and the elongated hole 7c of the mask 7. Thereby, the mask 6 is reciprocated vertically in the figure, while the mask 7 is reciprocated laterally in the figure.

Therefore, when the opening 6a of the mask 6 is positioned above, the opening 7a of the mask 7 is positioned on the left side. When the opening 6a of the mask 6 is positioned below, the opening 7a of the mask 7 is positioned on the right side.

The photo interrupter 10 is fixed to the bottom board 13 (not shown) for detecting a position of the mask 6 reciprocated vertically.

Figure 3:
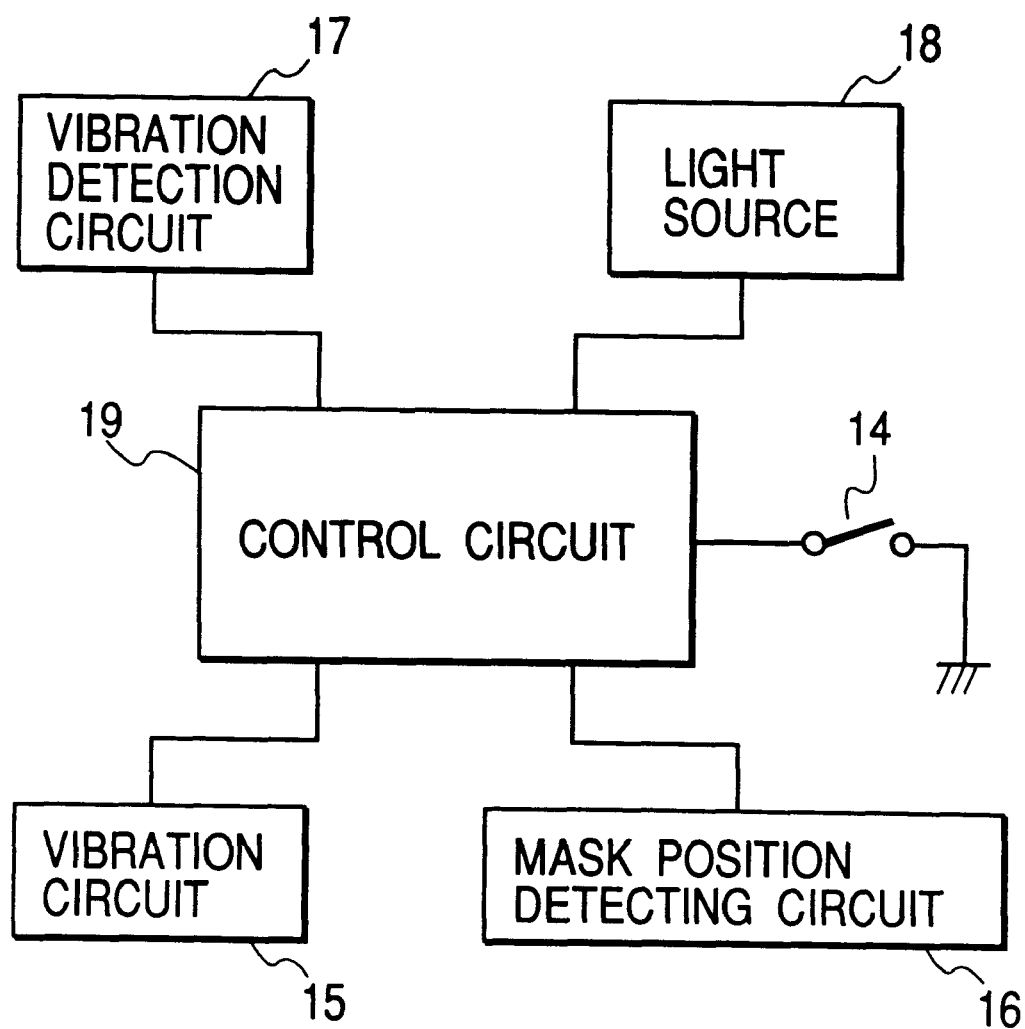
FIG. 3 is a block diagram showing a main portion of the camera according to the first embodiment of the invention.

FIG. 3 is a block diagram showing a main portion of a camera electric arrangement according to the first embodiment of the invention.

In FIG. 3, numeral 15 denotes a vibration circuit, 16 denotes a mask position detecting circuit, 17 denotes a vibration detection circuit, 18 denotes a light source, and these components are connected to and controlled by a microcomputer or another control circuit 19. Numeral 14 denotes a blur prevention switch. Only when the switch is turned on, a finder display mechanism is operated.

The vibration circuit 15 is provided for vibrating the masks 6 and 7 in FIG. 1, and constituted of the motor 9 for operating the decentring axis 8 and its drive circuit. The mask position detecting circuit 16 detects the position of the mask 6 with the photo interrupter 10 in FIG. 1. When the mask 6 reaches a predetermined position, a signal is transmitted to the control circuit 19.

The vibration detection circuit 17 is constituted of a vibration detection sensor for detecting an angular velocity of a vibration gyroscope or the like and a sensor output arithmetic operation circuit which cuts a DC component from an output of the vibration detection sensor to obtain an angular displacement through integration. The hand vibration by the photographing person is detected, and its angular displacement information is transmitted to the control circuit 19. Additionally, the vibration detection sensor is constituted of two sensors: a sensor for detecting a vibration in the pitch direction; and a sensor for detecting a vibration in the yaw direction.

The light source 18 includes the LEDs 11 and 12 of FIG. 1. The control circuit 19 controls a light-on timing of the light source 18 in accordance with the signal from the mask position detecting circuit 16 and the angular displacement information from the vibration detection circuit 17.

Figure 4A:
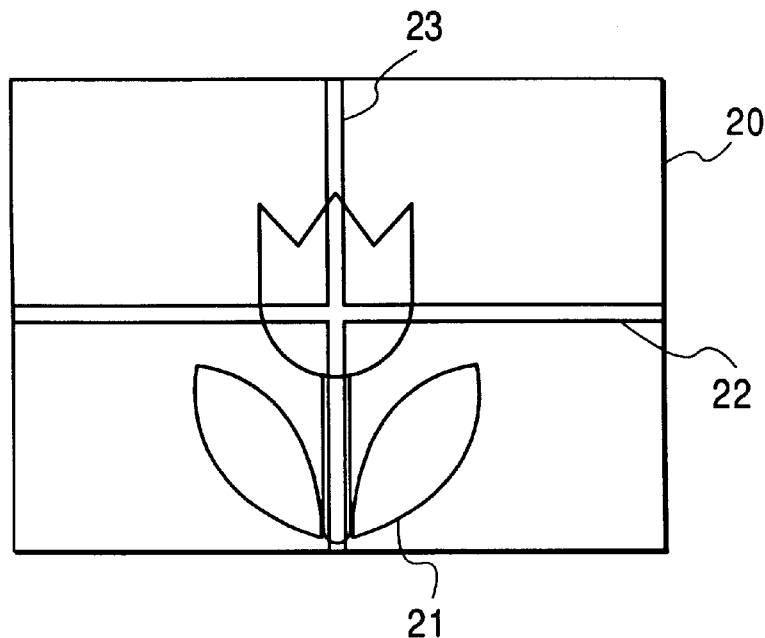
FIGS. 4A and 4B show finder view fields of the camera according to the first embodiment of the invention.
Figure 4B:
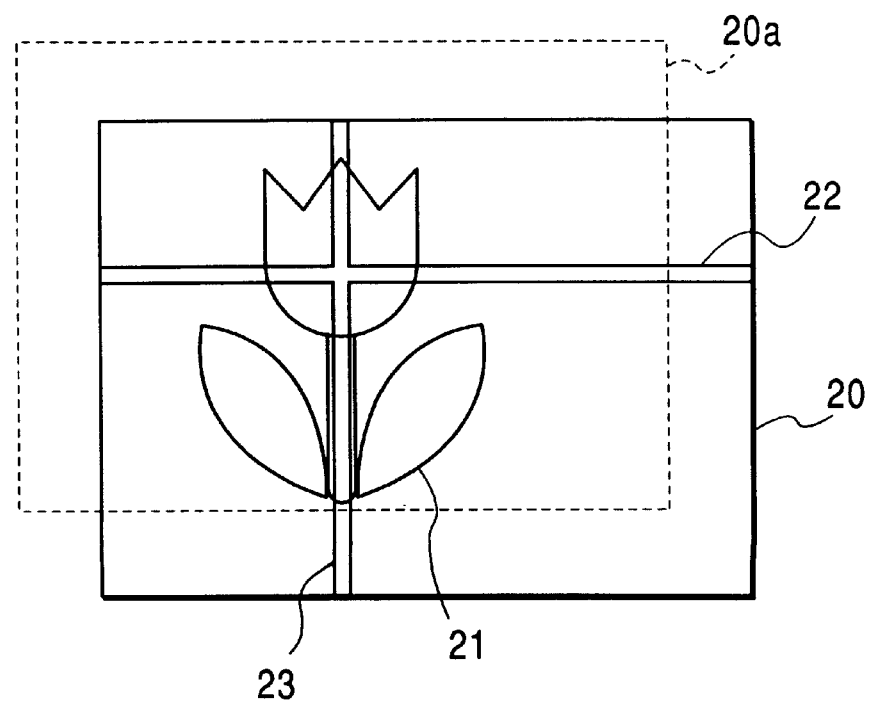

FIGS. 4A and 4B show camera finder view fields in the arrangement described above. FIG. 4A shows an initial condition when the blur prevention switch 14 is turned on, and FIG. 4B shows a subsequent condition in which a camera is vibrated toward a lower right side in the figure.

In FIGS. 4A and 4B, numeral 20 denotes a finder view field range, and 20a denotes a finder view field before the vibration. Numeral 21 denotes an object, 22 denotes a blur correction display in the pitch direction, and 23 denotes a blur correction display in the yaw direction. The blur correction displays 22 and 23 are photo images of the LEDs 11 and 12, respectively.

As shown in FIG. 4B, when the camera is vibrated toward the lower right direction in the figure, the blur correction display 22 are moved in reverse or upper left direction, and the blur correction display 23 is moved toward the left. Then, a positional relationship between the object 21 and the blur correction displays 22, 23 is held.

FIG. 5 is a timing chart showing a control image of an LED light-on timing in the camera constituted as aforementioned.

In FIG. 5, numeral 24 denotes a waveform which is constituted by converting to an angular displacement a stroke of the mask 6 which is reciprocated when the motor 9 is rotated at a constant rate. Numeral 25 denotes an output waveform of the vibration detection circuit 17. Additionally, an angle θ with the center is represented on the axis of ordinate, and a time T is represented on the axis of abscissa.

Numeral 26 denotes a PI pulse waveform which is formed after A/D conversion of an output from the photo interrupter 10. Numeral 27 denotes a waveform which indicates a timing of A/D conversion of an output from the vibration detection circuit 17. In synchronization with a pulse rising of the PI pulse waveform 26, the A/D conversion is started. Numeral 28 denotes a waveform indicative of an LED on timing.

Numeral 26a denotes a pulse rising point of the PI pulse waveform 26, and numeral 24a denotes a stroke maximum point of the mask stroke waveform 24. A period of time from the pulse rising point 26a to the stroke maximum point 24a is a delay time. Additionally, the delay time is in proportion to the rotation speed of the motor 9. Therefore, when the rotation speed is constant, the delay time is constant. However, the pitch mask 6 is different in delay time from the yaw mask 7.

Numeral 28a denotes an LED on timing. A period of time from the stroke maximum point 24a to the LED on timing 28a is represented by ΔT, which is obtained as described later with reference to FIG. 6.

Also, in the embodiment, the vibration in the pitch direction and the vibration in the yaw direction have been described without being separated. Both the directions are operated with the aforementioned control image.

Figure 6:
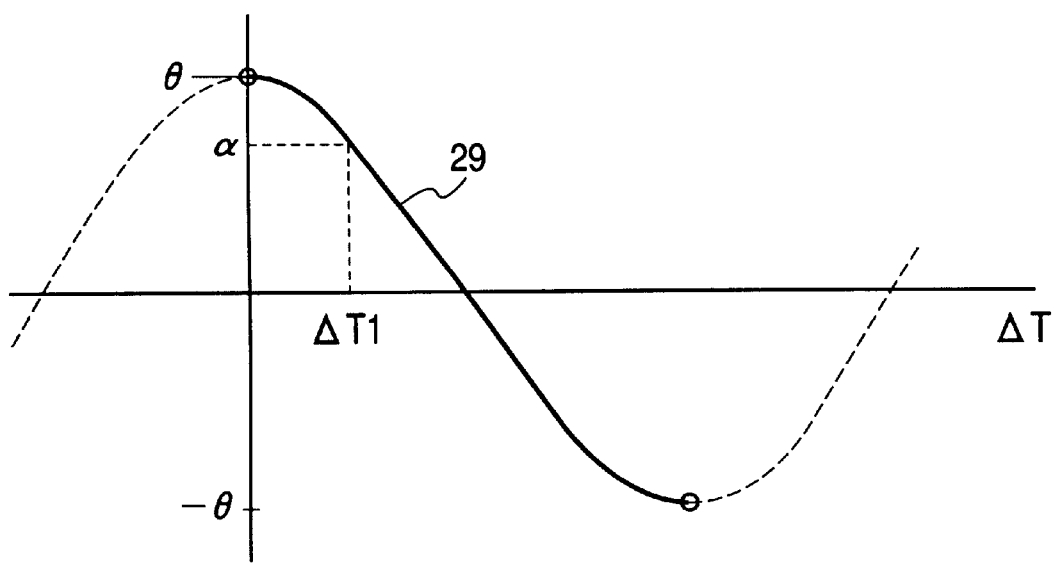
FIG. 6 is an explanatory view for obtaining an LED light-on delay time in the first embodiment of the invention.

FIG. 6 is an explanatory view for obtaining an LED light-on delay time ΔT. Numeral 29 denotes a waveform indicative of a table which shows a relationship between an output angle of the vibration detection circuit 17 and the LED light-on delay time ΔT. An angle θ is represented on the axis of ordinate, and a time T is represented on the axis of abscissa.

For example, when the output angle of the vibration detection circuit 17, i.e., a blur quantity is represented by α, as seen from the table waveform 29, the LED light-on delay time ΔT becomes ΔT1. Additionally, for the table, two tables are prepared in the control circuit 19 for the pitch and the yaw, respectively.

Figure 7:
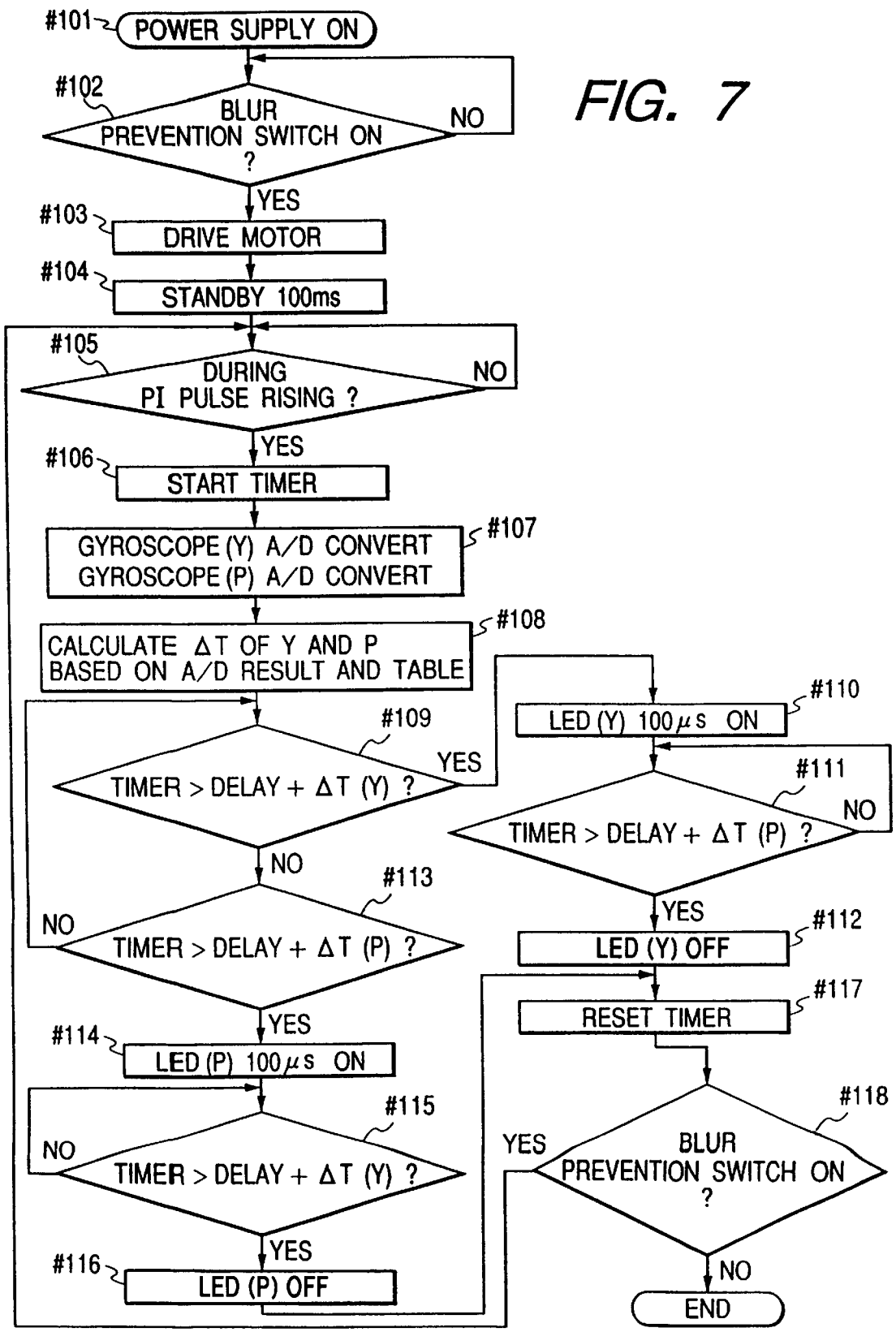
FIG. 7 is a flowchart showing an operation of the main portion of the camera according to the first embodiment of the invention.

Operation of a main portion of the camera constituted as aforementioned will be described with reference to the flowchart of FIG. 7.

First, at step #101 power supply is turned on. The process then goes to step #102, at which a condition of the blur prevention switch 14 is determined. When the blur prevention switch 14 is turned on, the process goes to step #103 for driving the motor 9.

When the motor 9 is rotated, the decentring axis 8 is also rotated, and the masks 6 and 7 start vibrating (reciprocating). In this case, the rotation speed of the motor 9 is determined in such a manner that the vibration of the mask 6 or 7 exceeds 60 Hz.

At the subsequent step #104, a standby time of 100 ms elapses until the rotation of the motor 9 is stabilized. At the next step #105, a condition of the PI pulse is determined. When the PI pulse rises, the process goes to step #106 for starting a timer. Additionally, at the next step #107, outputs of the pitch-direction vibration detection sensor and the yaw-direction vibration detection sensor are A/D converted. At the next step #108, based on a result of the step #107 and the table 29 shown in FIG. 6, pitch-direction and yaw-direction LED light-on delay times ΔT(P) and ΔT(Y) are calculated, respectively.

At step #109, it is determined whether or not the timer started at the step #106 exceeds "delay+ΔT(Y)". If it is not exceeded, the process goes to step #113. Then, at the step #113, it is determined whether or not the timer started at the step #106 exceeds "delay+ΔT(P)". If it is not exceeded, the process returns to the step #109. It is again determined whether or not "delay+ΔT(Y)" is exceeded. In this case, if it is determined that "delay+ΔT(Y)" is exceeded, the process advances to step #110.

At the step #110, the yaw-direction LED 12 is turned on for 100 μs. This condition equals, for example, the yaw-direction blur correction display 23 shown in FIG. 4B. The process then advances to step #111, where a standby condition is continued until the timer exceeds "delay+ΔT(Y)". Thereafter, when the timer exceeds "delay+ΔT(Y)", the process advances to step #112, where the yaw-direction LED 12 is turned off.

Also, when it is determined at the step #113 that the timer exceeds "delay+ΔT(P)", the process goes to step #114, where the pitch-direction LED 11 is turned on for 100 μs. The condition equals, for example, the pitch-direction blur correction display 22 shown in FIG. 4B. Subsequently, the process goes to step #115, and is on standby until the timer exceeds "delay+ΔT(P)". Thereafter, when the timer exceeds "delay+ΔT(P), the process advances to step #116 for turning off the pitch-direction LED 11.

At the subsequent step #117, the timer is reset. At the next step #118, the condition of the blur prevention switch 14 is again determined. When the blur prevention switch 14 is turned on, the process returns to step #105. Specifically, the operation of the steps #105 to #118 is repeated until the blur prevention switch 14 is turned off.

In the first embodiment described above, at 30 Hz or more the LED appears to be lit because of an afterimage effect. Here, at 60 Hz or more the masks 6 and 7 are vibrated vertically and laterally. At every vibration cycle of the masks 6 and 7, the LEDs 11 and 12 are momentarily turned on in synchronization with the vibration output of the vibration detection circuit 17. Therefore, mask images (blur correction displays) lit by the LEDs 11 and 12 look as if they move smoothly in a direction in which blur is corrected. (The images do not appear to flicker or blur.)

Specifically, the blur correction display can be moved and displayed in a direction reverse to a blur direction in a finder image plane. A blur prevention effect can be recognized intuitively.

Additionally, light is projected by the LED in a finder optical path through the opening in the mask. The photo image is thus formed as the blur correction display in the finder image plane. Therefore, as compared with the conventional arrangement using the LCD, the embodiment provides a better visibility and a cost effectiveness.

(Second Embodiment)

Figure 8:
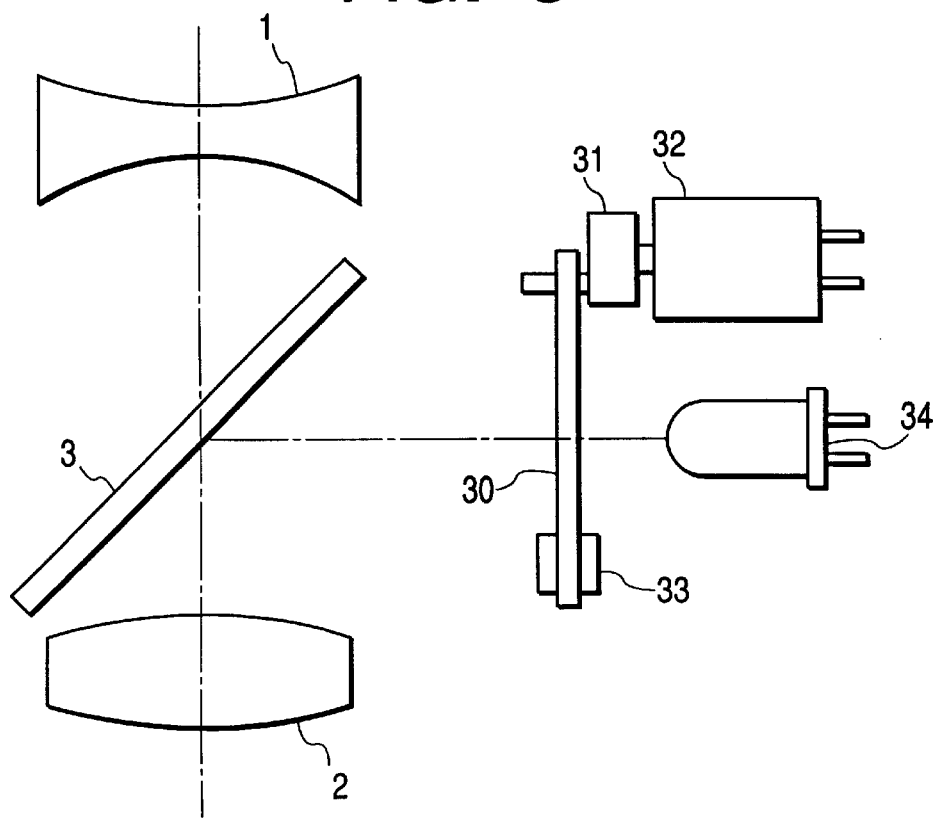
FIG. 8 is a top-face view of a finder display mechanism in a camera according to a second embodiment of the invention.

FIG. 8 is a top-face view of a finder display mechanism in a camera according to a second embodiment of the invention. In FIG. 8, the same components as those in FIG. 1 are denoted by the same numerals, and the description thereof is omitted.

In FIG. 8, numeral 30 denotes a mask for displaying a distance measuring index. The mask 30 is engaged with a decentring axis 31. The decentring axis 31 is inserted with pressure into a rotation axis of a motor 32. Numeral 33 denotes a photo interrupter for detecting a position of the mask 30, and 34 denotes an LED for displaying a distance measuring index.

A light of the LED 34 is restricted by the mask 30 into a distance measuring index configuration. The light is then reflected by the translucent mirror 3 toward the eyepiece lens 2.

A photographing person can observe an object formed by the objective lens 1 and the eyepiece lens 2, and can simultaneously observe a photo image of the LED 34 on the translucent mirror 3.

Figure 9:
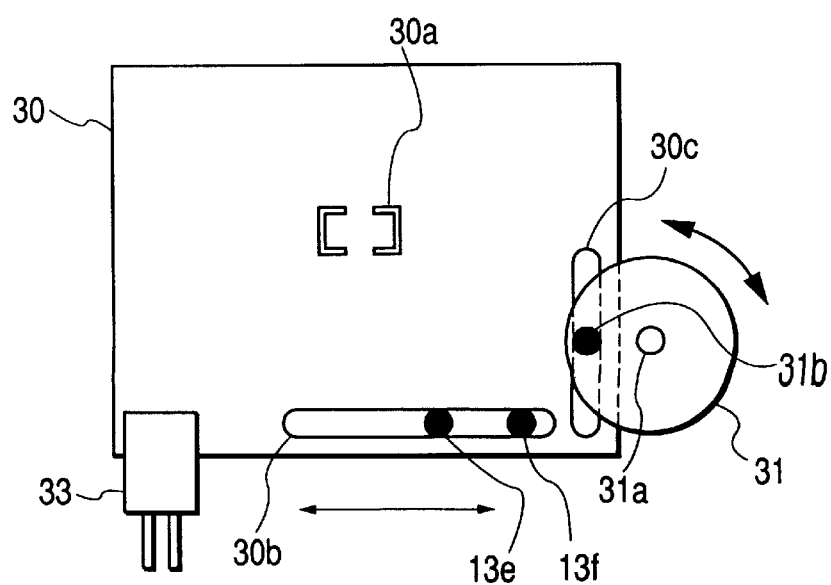
FIG. 9 is an enlarged partial view of FIG. 8.

FIG. 9 is an enlarged view of the mask 30, the decentring axis 31 and the photo interrupter 33 in FIG. 8, and an enlarged partial view of FIG. 8 as seen from the right side.

In FIG. 9, the mask 30 is provided with an opening 30a and elongated holes 30b and 30c. The mask 30 can move laterally in the figure with the elongated hole 30b engaged with protrusions 13e and 13f of the bottom board 13 (not shown).

The decentring axis 31 is rotated about a rotation axis 31a inserted with pressure in the motor 32. A protrusion 31b provided in a position decentring by a predetermined distance from the rotation axis 31a is engaged in the elongated hole 30c of the mask 30. Thereby, the mask 30 is reciprocated laterally in the figure.

Figure 10:
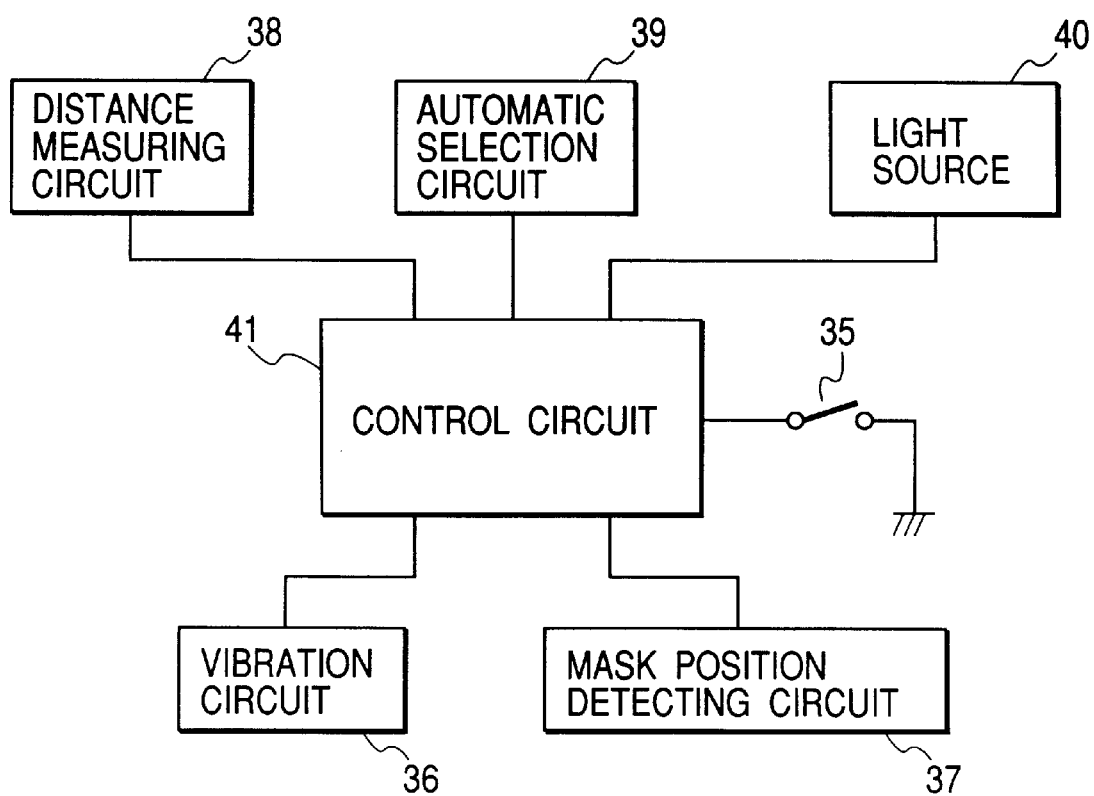
FIG. 10 is a block diagram showing a main portion of the camera according to the second embodiment of the invention.

FIG. 10 is a block diagram showing an electric arrangement of the camera according to the second embodiment of the invention.

In FIG. 10, numeral 36 denotes a vibration circuit, 37 denotes a mask position detecting circuit, 38 denotes a distance measuring circuit, 39 denotes an automatic selection circuit, 40 denotes a light source, and these components are connected to and controlled by a control circuit 41. Numeral 35 denotes an AF switch. Only when the AF switch is turned on, a finder display mechanism is operated.

The vibration circuit 36 is provided for vibrating the mask 30 in FIG. 8, and constituted of the motor 32 for operating the decentring axis 31 and its drive circuit. The mask position detecting circuit 37 detects the position of the mask 30 with the photo interrupter 33 in FIG. 8. When the mask 30 reaches a predetermined position, a signal is transmitted to the control circuit 41. The distance measuring circuit 38 measures distances in plural measurement distance regions in a photographed image plane. In the automatic selection circuit 39, a position of a main subject is determined based on each distance measuring information obtained from the distance measuring circuit 38, and relevant distance measuring region and distance measuring information are automatically selected. The luminous source 40 corresponds to the LED 34 in FIG. 8. The control circuit 41 controls a light-on timing of the light source 40 based on the signal from the mask position detecting circuit 37 and the selected distance measuring information from the automatic selection circuit 39.

FIGS. 11A to 11D show finder view fields of the camera constituted as aforementioned in the case in which there are three distance measuring regions (middle, right and left) of the distance measuring circuit 38 in a lateral direction.

Figure 11A:
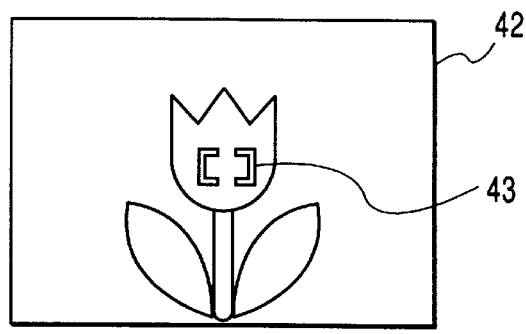
FIGS. 11A, 11B, 11C and 11D show finder view fields of the camera according to the second embodiment of the invention.
Figure 11B:
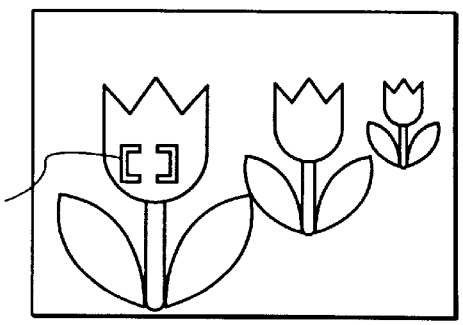
Figure 11C:
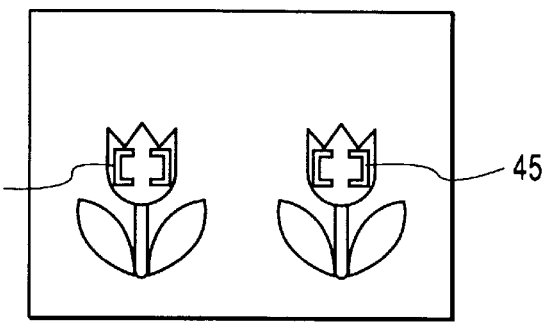
Figure 11D:
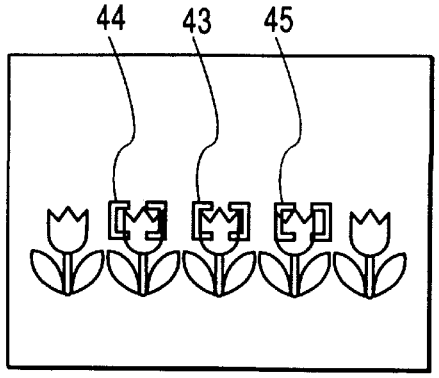

FIG. 11A shows the case where the "middle" distance measuring region is selected by the automatic selection circuit 39, FIG. 11B shows the case where the "left" distance measuring region is selected by the automatic selection circuit 39, FIG. 11C shows the case where the "right and left" distance measuring regions are selected by the automatic selection circuit 39, and FIG. 11D shows the case where the "right, middle and left" distance measuring regions are selected by the automatic selection circuit 39.

In FIGS. 11A to 11D, numeral 42 denotes a finder view field range, 43 denotes a distance measuring index of the middle distance measuring region, 44 denotes a distance measuring index of the left distance measuring region, and 45 denotes a distance measuring index of the right distance measuring region.

The distance measuring indexes 43, 44 and 45 are photo images of the LED 34. Display positions of the images are determined by the light-on timing of the LED 34 in the control circuit 41.

Figure 12:
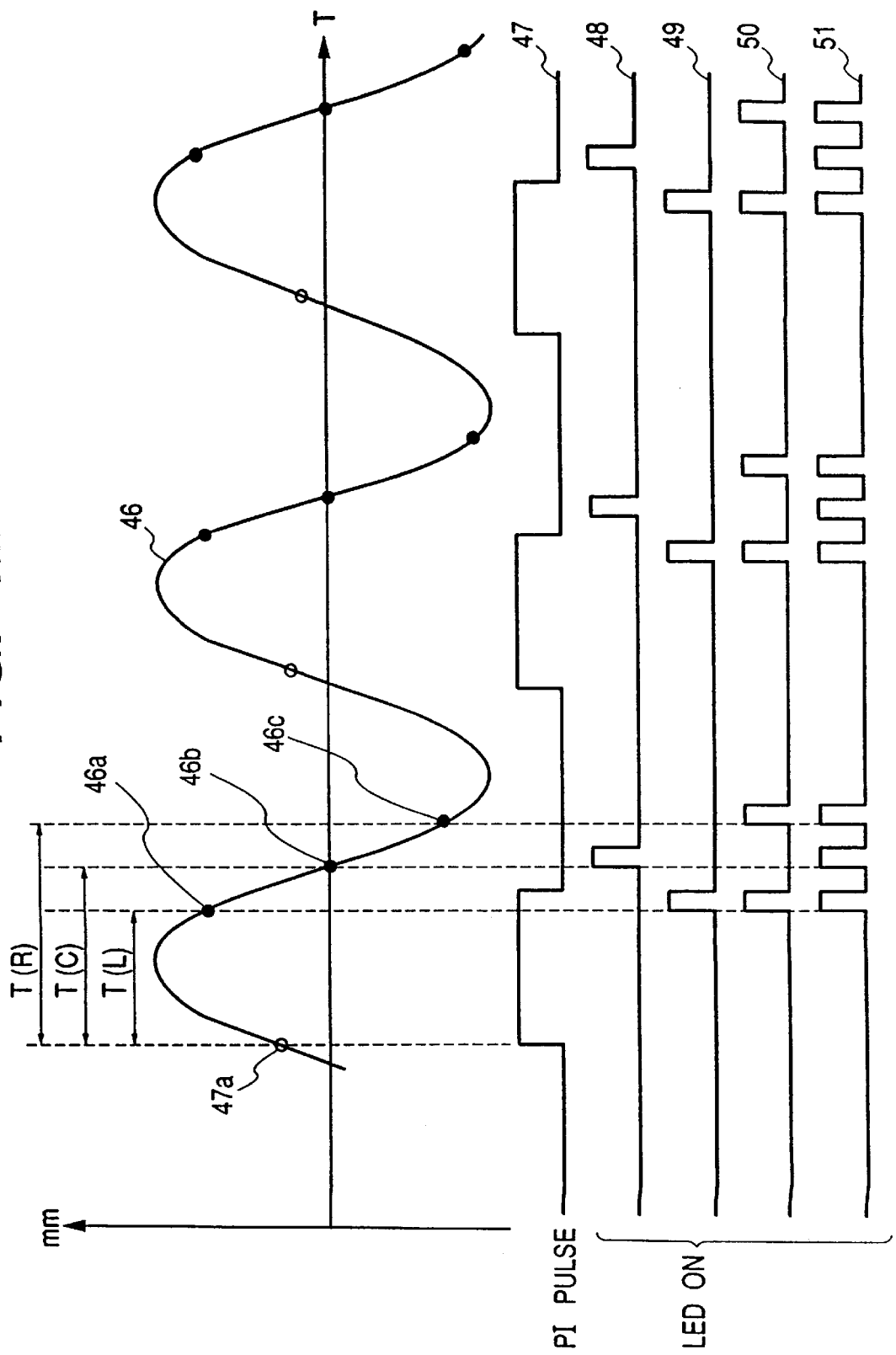
FIG. 12 shows a control image of an LED light-on timing in the second embodiment of the invention.

FIG. 12 is a timing chart showing a control image of the LED light-on timing in the camera constituted as aforementioned.

In FIG. 12, numeral 46 denotes a waveform indicative of a position of the mask 30 which is reciprocated when the motor 32 is rotated at a constant speed. The axis of ordinate represents a distance from a middle position, and the axis of abscissa represents a time.

Numeral 47 denotes a PI pulse waveform after A/D conversion of an output from the photo interrupter 33, and numerals 48 to 51 denote waveforms indicative of light-on timings of the LED 34. The waveform 48 is formed when the "middle" distance measuring region is selected by the automatic selection circuit 39. The waveform 49 is formed when the "left" distance measuring region is selected by the automatic selection circuit 39. The waveform 50 is formed when the "right and left" distance measuring regions are selected by the automatic selection circuit 39. The waveform 51 is formed when the "left, middle and right" distance measuring regions are selected by the automatic selection circuit 39.

Numeral 47*a* denotes a moment at which the PI pulse waveform 47 has a pulse rising, 46*a* denotes a moment at which the opening 30*a* of the mask 30 is in the "left" distance measuring region, 46*b* denotes a moment at which the opening 30*a* of the mask 30 is in the "middle" distance measuring region, and 46*c* denotes a moment at which the opening 30*a* of the mask 30 is in the "right" distance measuring region. A time from the moment 47*a* till 46*a* is represented by T(L), a time from the moment 47*a* till 46*b* is represented by T(C), and a time from the moment 47*a* till 46*c* is represented by T(R). Additionally, T(L), T(C) and T(R) are in proportion to the rotation speed of the motor 32, and are constant when the rotation speed is constant.

Figure 13:
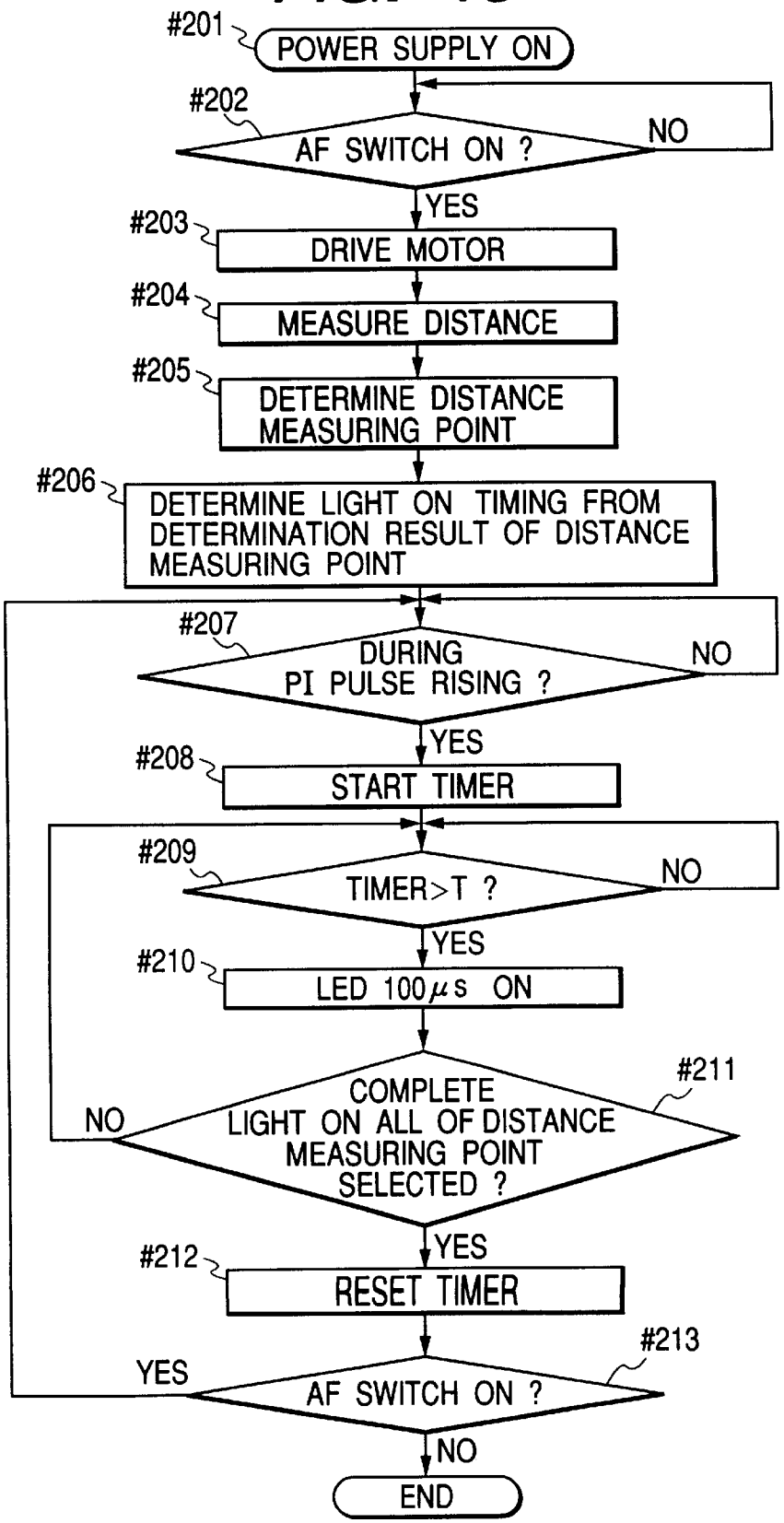
FIG. 13 is a flowchart showing an operation of the main portion of the camera according to the second embodiment of the invention.

Operation of the main portion of the camera constituted as aforementioned will be described with reference to the flowchart of FIG. 13.

First, when at step #201 power supply is turned on, the process advances to step #202 which determines a condition of the AF switch 35. For example, when a release button (not shown) is depressed to a first stage, the AF switch 35 is turned on. When the AF switch 35 is turned on, the process goes to step #203 for driving the motor 32.

When the motor 32 is rotated, the decentring axis 31 is also rotated and the mask 30 starts vibrating (reciprocating). At this time, the rotation speed of the motor 32 is determined in such a manner that the vibration of the mask 30 exceeds 60 Hz.

At the subsequent step #204, the distance measuring circuit 38 measures plural distance measuring regions in a photographed image plane. Then, at step #205, based on each distance measuring information obtained at the step #204, a position of the main subject is determined by the automatic selection circuit 39 (for example, the distance measuring point of the latest distance is regarded as the position of the main subject). The relevant distance measuring region and information are automatically selected. At the subsequent step #206, from the distance measuring region selected at the step #205, a light-on timing T of the LED 34 is determined based on FIG. 12.

At the subsequent step #207, a condition of the PI pulse waveform is determined. When the pulse rises, the process advances to step #208 for starting a timer. It is determined at the subsequent step #209 whether or not the timer started at the step #208 exceeds the light-on timing T determined at the step #206. When it is exceeded, the process advances to step #210 for turning on the LED 34 for 100 $\mu$s. Then, it is determined at the subsequent step #211 whether or not the lighting of the LED 34 is completed in the distance measuring region selected at the step #205. As a result, when the lighting of all the selected distance measuring regions is finished, the process advances to step #212. When it is not finished, the process returns to the step #209. Specifically, when plural distance measuring regions are selected, the operation of the steps #209 to #211 is repeated in accordance with the number of regions. Consequently, as shown in FIGS. 11C and 11D, the distance measuring indexes can be displayed.

At the step #212, the timer is reset. At the subsequent step #213, the condition of the AF switch 35 is again determined. Here, when the AF switch 35 is turned on, the process returns to the step #207. Specifically, by repeating the operation of the steps #207 to #213 until the AF switch 35 is turned off, the distance measuring indexes continue to be displayed.

In the second embodiment described above, at 60 Hz or more the mask is vibrated. The LED is momentarily turned on in synchronization with the distance measuring region selected at every vibration cycle of the mask. Therefore, a mask image (distance measuring index) can be lit and displayed by the LED in a predetermined position in the finder view field. It becomes quite obvious which of plural distance measuring regions is focused on. (The distance measuring index does not appear to flicker or blur.)

Specifically, since the distance measuring index is displayed in the selected distance measuring region in the finder image plane, the selected distance measuring region can be easily determined. Additionally, since the distance measuring index is lit, the visibility is enhanced.

Also, as compared with the conventional arrangement in which the LCD is used, the embodiment is more cost-effective.

In the first embodiment, the blurs in the pitch and yaw directions are displayed, but this is not restricted. Either one direction may be displayed.

Also, in the second embodiment, three distance measuring regions are selected. In the invention, more distance measuring regions may be selected. Further, by applying the same arrangement to plural photometry regions, instead of the distance measuring regions, a selected photometry region can be clearly informed.

Also, even when the distance measuring region is varied in the finder view field following a change in a focal length in a zoom camera, the invention can be applied. (With changes in focal length, an LED light-on timing may be adjusted.)

In the embodiments, the mask member and the light source are separately arranged, and the mask member is reciprocated. These may be integrally formed and integrally reciprocated. The movement is not restricted to reciprocation. Possible is a circular movement or another movement by which a photo image having a predetermined configuration can be projected in a finder.

The invention is not limited to the aforementioned embodiments, and can be constituted in any manner as long as functions recited in claims and described in the embodiments can be attained.

(Third Embodiment)

Figure 14:
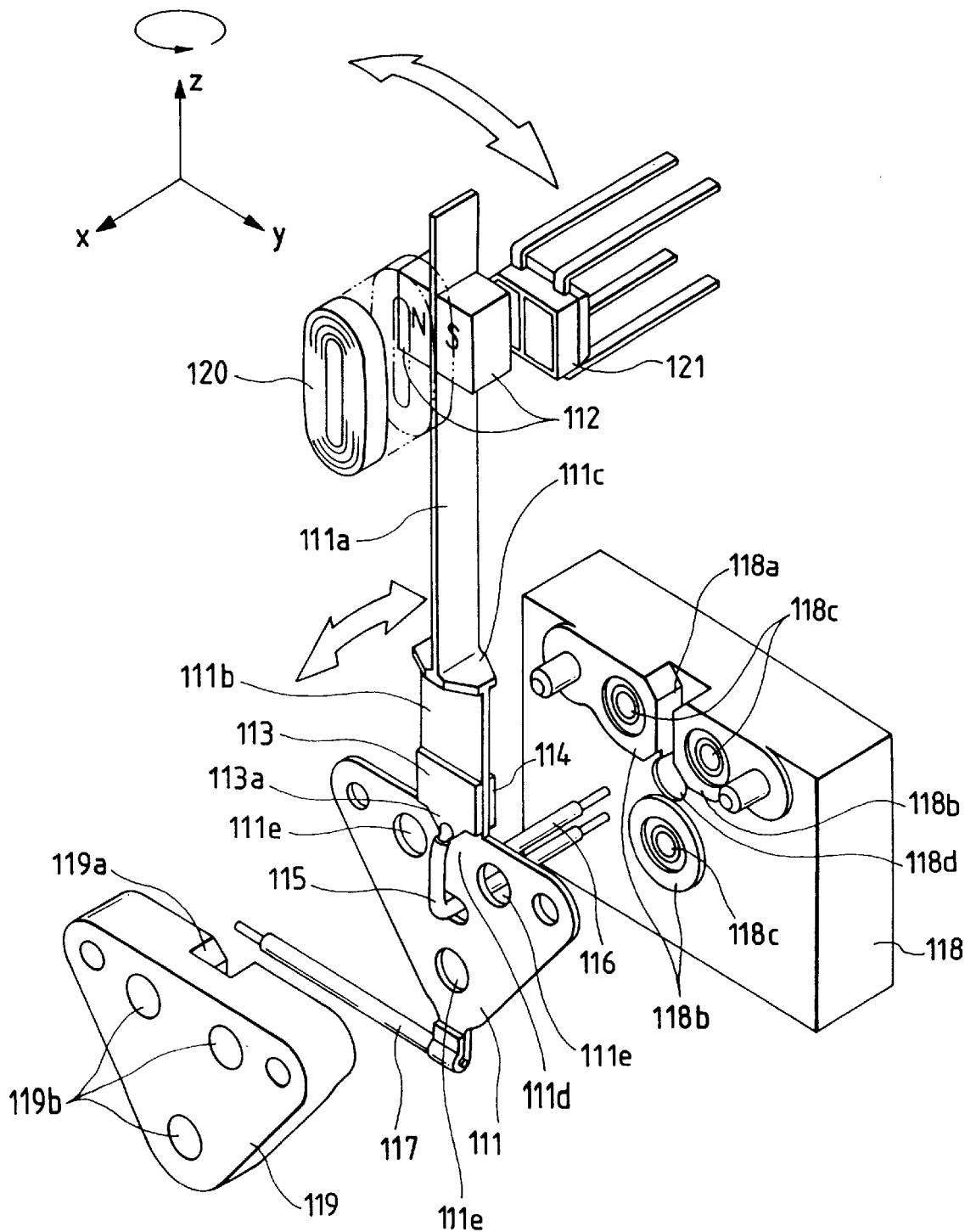
FIG. 14 is a perspective view showing an example of a mechanical arrangement of a vibration detection sensor incorporated in a compact camera according to a third embodiment of the invention.

FIG. 14 shows a structure of a vibrating body of a vibration gyroscope as a vibration detection sensor according to a third embodiment of the invention.

In FIG. 14, numeral 111 denotes a metallic vibrator; 112 denotes a permanent magnet provided in a vicinity of a tip end of the vibrator 111; 113 and 114 denote piezoelectric elements provided in a vicinity of a fixed end of the vibrator 111; 115 and 116 denote lead wires for taking out electric charges arising on surface electrodes; 117 denotes a lead wire for grounding the vibrator 111; 118 denotes a base mounted on a bottom board (not shown) to which the vibrator 111 is fixed; 119 denotes a press member for holding the vibrator 111 together with the base 118; 120 denotes a coil for generating a drive force on the permanent magnet 112 by means of Lorentz force; and 121 denotes a photo reflector for optically detecting vibration displacements of the vibrator 111 and the permanent magnet 112 excited by the coil 120. A normal position of the coil 120 is shown by two-dot chain line in FIG. 14.

An excitation piece 111*a* and a detection piece 111*b* of the vibrator 111 are orthogonally interconnected by a flange 111*c*, and integrally formed. The pieces are altogether worked with a forging press, but may be formed through a metal injection or a cutting.

Mounting of the vibrator 111 onto the base 118 will be described.

On the piezoelectric element 113 formed is an attachment portion 113*a* of the lead wire 115 which is exposed onto a fixed portion 111d of the vibrator 111. In the same manner, on the piezoelectric element 114 formed is an attachment portion 114a (not shown) of the lead wire 116 which is exposed onto the fixed portion 111d of the vibrator 111. To clear the attachment portions 113a, 114a and the lead wires 115, 116, a groove 118a is formed in the base 118 and a groove 119a is formed in the press member 119.

On opposite sides of the groove 118a of the base 118 formed are pressing faces 118b which abut on the fixed portion 111d of the vibrator 111. The press member 119 also has on a side face opposed to the vibrator 111 pressing faces (not shown) having the same configurations as the pressing faces 118b.

In FIG. 14, three screws are inserted from the side of the press member 119 and fastened through holes 119b and 111e into screw holes 118c. Then, the fixing portion 111d of the vibrator 111 is held. The lead wires 115 and 116 are drawn through a hole 118d toward a rear side of the base 118. The vibrator 111 is thus integrally constituted.

As aforementioned, the attachment portions 113a and 114a of the piezoelectric elements 113 and 114 and the lead wires 115 and 116 are attached inside the fixed end. Therefore, the vibration of the vibrator 111 is prevented from being adversely affected by tensions of the lead wires 115 and 116.

Operation principle of the aforementioned vibration detection sensor will be described.

Figure 15:
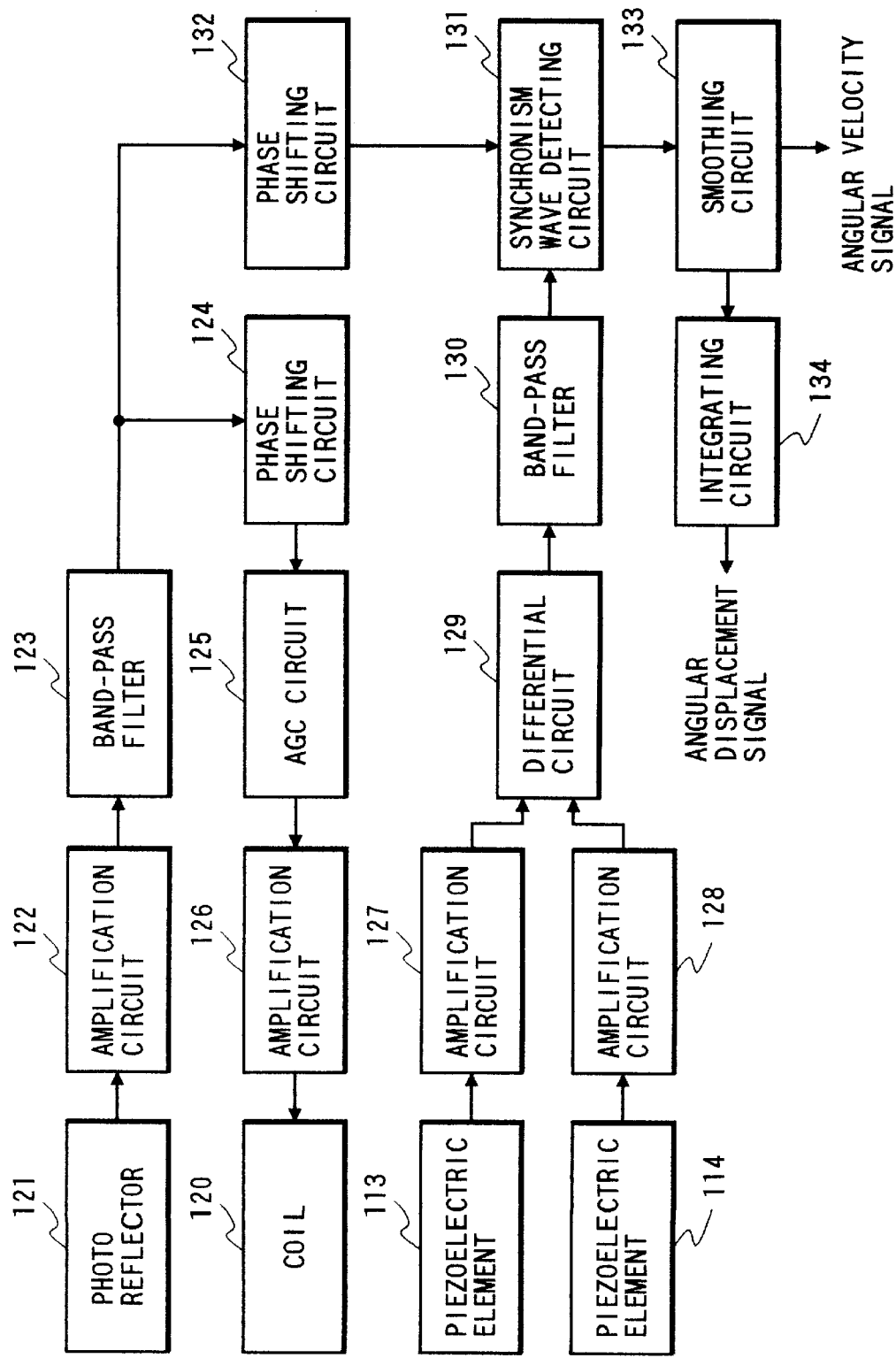
FIG. 15 is a block diagram showing a signal processing system of the vibration detection sensor of FIG. 14.

FIG. 15 is a block diagram showing an arrangement of a circuit which controls excitation of the vibrator and processes detection signals, i.e., a circuit of the vibration gyroscope. In FIG. 15, the same portion as FIG. 14 is denoted by the same numerals.

In FIG. 15, a vibration displacement signal in a y-direction (excitation direction) as seen in FIG. 14 of the excitation piece 111a of the vibrator 111 is detected by the photo reflector 121, and transmitted to and amplified by an amplification circuit 122. The signal is passed through a next-stage band-pass filter 123. Then, a signal in a vicinity of a resonance frequency of the excitation piece 111a is taken out. The signal is adjusted by a phase shifting circuit 124 to have a phase of an input signal of the coil 120. Thereafter, an output signal of the phase shifting circuit 124 has its excitation amplitude adjusted by an AGC circuit 125 to form an input signal which generates Lorentz force to perform a stable excitation with a constant amplitude. While an electric current is supplied by a drive circuit 126, an input signal is supplied to the coil 120. The electric current flowing through the coil 120 has a direction in reverse to a z-axis direction in opposite winding coils as seen from a front side in an x-axis direction in FIG. 14. Therefore, when magnetic directions of the opposite permanent magnets 112 are in reverse to each other relative to the x-axis direction, excitation forces generated by Lorentz force act on both the permanent magnets 112 in the same directions relative to the y-axis direction. Therefore, the excitation amplitude is enlarged.

In this manner, a positive feedback loop is formed. The excitation piece 111a performs a self-oscillation at a constant amplitude in the y-axis direction.

In the condition, as shown in FIG. 14, when a vibration with an angular velocity $\Omega$ is applied about the z-axis via the base 118 to the vibrator 111, on the excitation piece 111a and especially on the magnets 112 to which a mass is concentrated, Coriolis force is generated in the x-axis direction (detecting direction) in proportion to the mass, the excitation rate and the angular velocity $\Omega$. The Coriolis force is transmitted via the flange 111c to the detection piece 111b.

Then, the detection piece 111b is deflected in the x-axis direction. In this case, a bending deflection applied to the piezoelectric elements 113 and 114 provided in the vicinity of the fixed end of the detection piece 111b generates on the surface electrodes electric charges in proportion to the bending deflection. The charges are taken out as signals. Then, the angular velocity $\Omega$ applied about the z-axis is obtained.

A signal processing process will be described in which the angular velocity $\Omega$ applied about the z-axis is obtained from the electric charges (voltages) generated on the surface electrodes of the piezoelectric elements 113 and 114.

For the bending deflection received by the piezoelectric elements 113 and 114, one deflecting force acts in a compressing direction, while the other acts in a tensile direction. Therefore, the voltages generated on the surface electrodes are reverse to each other in phase. As shown in FIG. 15, the voltages are amplified by amplification circuits 127 and 128, and then differentiated by a differential circuit 129. An output can thus be doubled. The output signal has a excitation frequency, and is constituted of an AM wave which has an amplitude modulated by the Coriolis force (angular velocity). After a noise component with a band other than that of the signal in the vicinity of the excitation frequency is cut by a band-pass filter 130, an output signal (excitation detecting signal) of the photo reflector 121 passed via the amplification circuit 122 and the band-pass filter 123 has its phase adjusted by a phase shifting circuit 132 to form a reference signal. Subsequently, a synchronism wave is detected by a synchronism wave detecting circuit 131, and smoothed by a smoothing circuit 133. Thereby, a demodulated signal with the angular velocity $\Omega$ applied about the z-axis can be obtained.

In this case, a phase shift quantity of the phase shifting circuit 132 is adjusted with a variable resistance or the like in such a manner that waves are detected at a timing at which an excited null signal superimposed on an output signal of the band-pass filter 130 is maximized or minimized. Then, positive and negative areas of the null signal in one division of the wave detection usually become equal. Therefore, even if an amplitude of the null signal is varied, an output signal of the smoothing circuit 133 is not influenced. Specifically, a highly precise and stable angular velocity signal can be obtained. Also, by integrating the output signal of the smoothing circuit 133 with an integrating circuit 134, an angular displacement signal (vibration angle) can be obtained.

Figure 16:
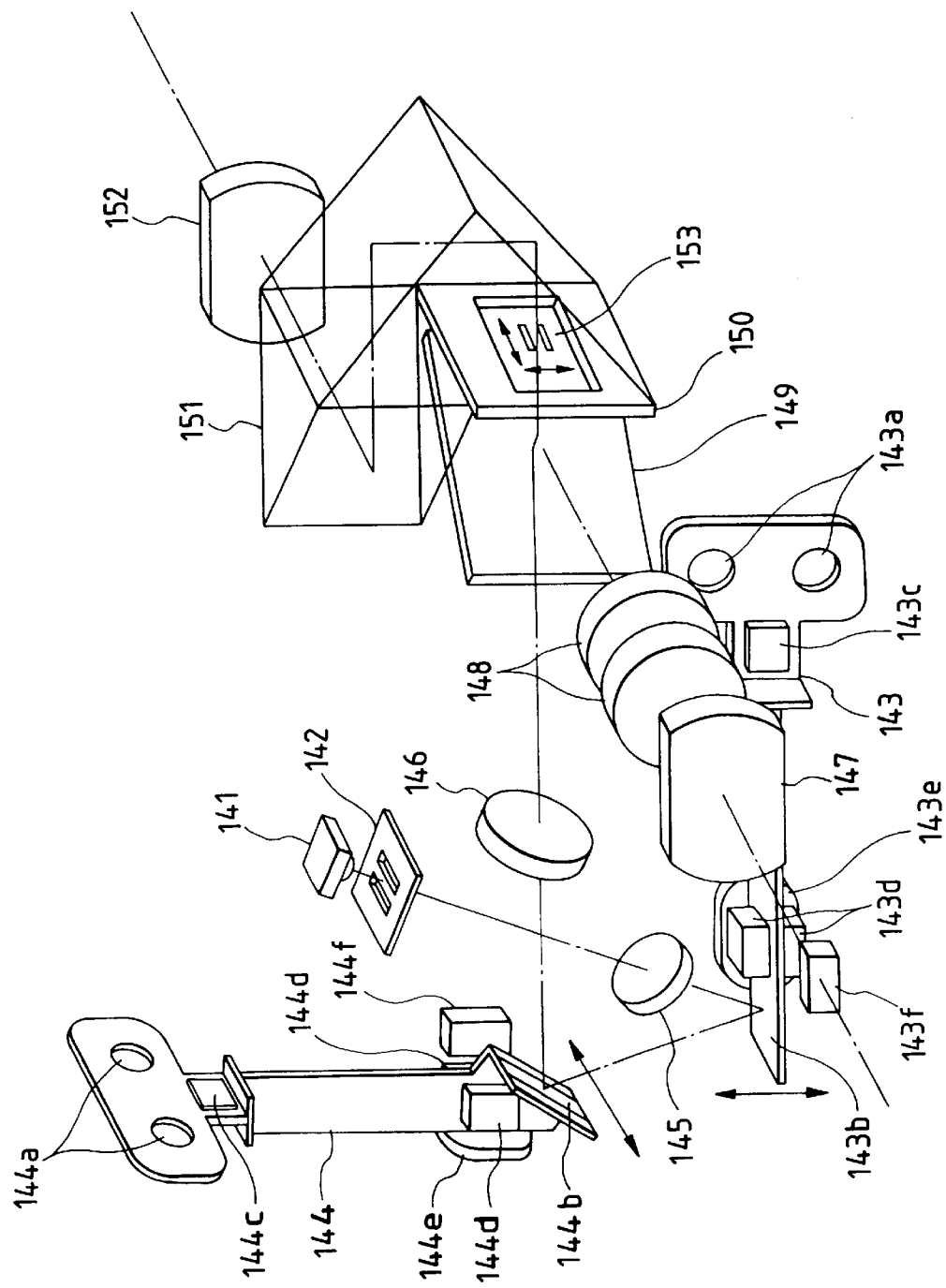
FIG. 16 is a perspective view showing a finder display device of the compact camera according to the third embodiment of the invention.

FIG. 16 is a perspective view showing an arrangement of a finder display device of the camera according to the third embodiment. The finder display device is provided with the vibration gyroscope shown in FIGS. 14 and 15 as one constitutional element for realizing the blur prevention display.

In FIG. 16, numeral 141 denotes an LED or another light source; 142 denotes a mask which has two parallel and thin transmitting portions formed substantially on its middle; and 143 denotes a pitch vibration detection sensor for detecting a vibration in a pitch direction (in a perpendicular direction when a camera is held in a positive position) which has substantially the same structure as shown in FIG. 14. The pitch vibration detection sensor 143 is constituted of fixing portions 143a to be fixed with screws or the like onto a bottom board (not shown), a reflecting portion 143b which is formed by specularly finishing a vicinity of a tip end of a vibrator, a piezoelectric element 143c placed adjacent to a root of the vibrator for detecting Coriolis force (a pitch-direction vibration signal obtained here is used as one of control signals for correcting blurs with a correction optical device described later), magnets 143*d* placed on both faces of the vibrator, a coil 143*e* fixed to the bottom board (not shown) in a vicinity of the magnets 143*d* and a photo reflector or another position detection sensor 143*f* for detecting a vibration position of the vibrator. When a predetermined electric current is passed through the coil 143*e*, the vibrator with the magnets 143*d* placed thereon is vibrated at a predetermined frequency along the vertical direction of the camera. Additionally, the mask 142 is disposed in such a manner that the longitudinal direction of the transmitting portions is perpendicular to the longitudinal direction of the vibrator of the pitch vibration detection sensor 143.

Numeral 144 denotes a yaw vibration detection sensor for detecting a vibration in a yaw direction of the camera (in a horizontal direction when the camera is held in the positive position) which has substantially the same structure as shown in FIG. 14. The yaw vibration detection sensor 144 is constituted of fixing portions 144*a* to be fixed with screws or the like onto the bottom board (not shown), and a reflecting portion 144*b*. The portion 144*b* is formed by bending and raising a face adjacent to a tip end of a vibrator at a predetermined angle, specularly finishing a middle of the face in a linear strip with a predetermined width and shutting light off opposite side edges. The sensor 144 is further constituted of a piezoelectric element 144*c* placed adjacent to a root of the vibrator for detecting Coriolis force (a yaw-direction vibration signal obtained here is used as one of the control signals for correcting blurs with the correction optical device described later), magnets 144*d* placed on both faces of the vibrator, a coil 144*e* fixed to the bottom board (not shown) in a vicinity of the magnets 144*d* and a photo reflector or another position detection sensor 144*f* for detecting a vibration position of the vibrator. When a predetermined electric current is passed through the coil 144*e*, the vibrator with the magnets 144*d* placed thereon is vibrated at a predetermined frequency along an optical-axis direction of the camera. Additionally, the longitudinal direction of the reflecting portion 144*b* is set perpendicular to the longitudinal direction of the transmitting portion of the mask 142.

Numeral 145 denotes an image forming lens for forming an image formed by the light source 141 and the mask 142 via the reflecting portion 143*b* of the pitch vibration detection sensor 143 onto a vicinity of the reflecting portion 144*b* of the yaw vibration detection sensor 144. Numeral 146 denotes an image forming lens for forming a photo image of the luminous source reflected by the reflecting portion 144*b* onto a vicinity of a finder image forming face. Numeral 147 denotes an objective lens; 148 denotes variable power lenses; 149 denotes a half mirror; 150 denotes a view field frame provided in a vicinity of the finder image forming face; 151 denotes a prism; 152 denotes an eyepiece lens; and these components 147 to 152 form a real-image zoom finder system.

When a light from the light source 141 is passed through the mask 142, two thin parallel linear images are formed. The photo images of the light source 141 are passed through the image forming lens 145 and reflected by the reflecting portion 143*b* of the pitch vibration detection sensor 143. Then, the images are formed on the vicinity of the reflecting portion 144*b* of the yaw vibration detection sensor 144. Here, the two thin parallel linear images have their lengths restricted to predetermined lengths by the specularly finished width of the reflective portion 144*b*. The images are thus reflected by the reflecting portion 144*b*, passed through the image forming lens 146 and the half mirror 149 and formed onto the vicinity of the finder image forming face. The images form a blur prevention index 153 described later.

The photographing person can observe an object overlapping the blur prevention index 153 by the half mirror 149.

When the pitch vibration detection sensor 143 is excited, the position and angle of the reflecting portion 143*b* in the pitch direction are changed. Therefore, when the light source 141 is allowed to continuously emit lights, the photo image of the light source (parallel linear images) varies in image formed position on the reflecting portion 144*b* and the finder image forming face. The blur prevention index 153 is vibrated in the pitch direction (vertically).

Additionally, the angle of the raised and bent face of the reflecting portion 144*b* is set in such a manner that even when the pitch vibration detection sensor 143 is excited, the photo image of the light source is constantly formed on the vicinity of the face of the reflecting portion 144*b*.

When the yaw vibration detection sensor 144 is excited, the position of the reflecting portion 144*b* in the yaw direction is changed (vibrated along the lengths of the parallel linear images). Therefore, when the light source 141 is allowed to continuously emit lights, the reflecting range of the photo image (parallel linear images) of the light source is varied. The blur prevention index 153 appears to vibrate in the yaw direction (laterally).

Figure 17:
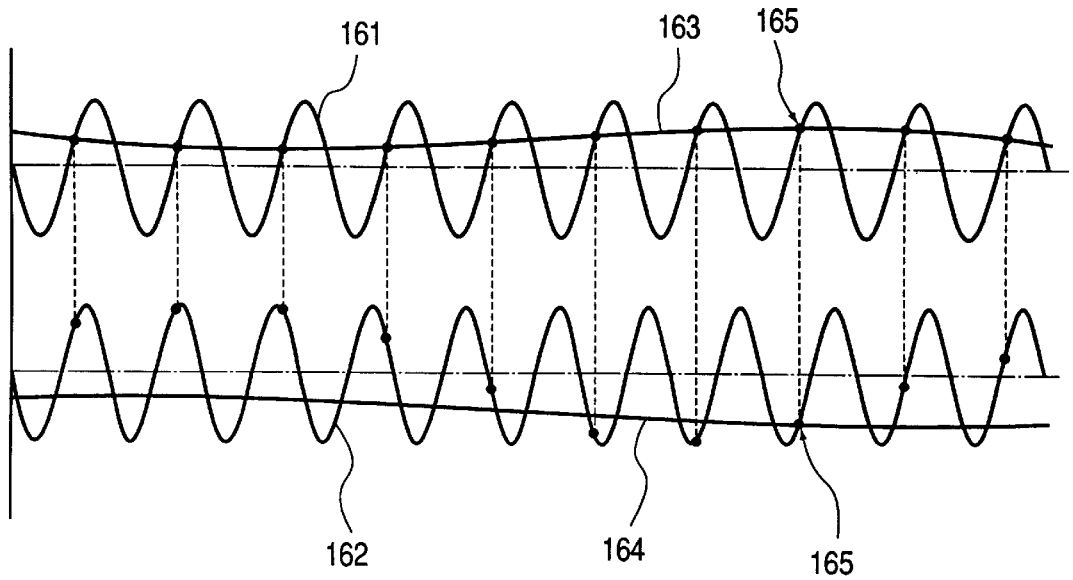
FIG. 17 is an explanatory view of an LED light-on timing for realizing a blur prevention display in the finder display device of FIG. 16.

FIG. 17 is an explanatory view of a flickering timing of the light source 141 shown in FIG. 16.

In FIG. 17, numeral 161 denotes a pitch index position output which is calculated by converting an output of the position detection sensor 143*f* for detecting the position of the vibrator of the pitch vibration detection sensor 143 into a pitch-direction vibration angle based on the relationship with a display position of the blur prevention index 153. Numeral 162 denotes a yaw index position output which is calculated by converting an output of the position detection sensor 144*f* for detecting the position of the vibrator of the yaw vibration detection sensor 144 into a yaw-direction vibration angle based on the relationship with the display position of the blur prevention index 153. Numeral 163 denotes a pitch-direction vibration angle output which is calculated from an output of the pitch vibration detection sensor 143. Numeral 164 denotes a yaw-direction vibration angle output which is calculated from an output of the yaw vibration detection sensor 144. Numeral 165 denotes a light emitting timing of the light source 141.

FIG. 17 shows that the pitch vibration detection sensor 143 and the yaw vibration detection sensor 144 are excited at frequencies of 300 Hz and 330 Hz, respectively, for a 1/30 second. As shown in FIG. 17, while the pitch index position output 161 vibrates ten times, the yaw index position output 162 vibrates eleven times.

Here, the pitch index position output 161 intersects the pitch-direction vibration angle output 163 at ten points, when the pitch index position output 161 is tilted positively. (The output may be tilted negatively, but if the output is not tilted only positively or negatively, the display position of the blur prevention index 153 is deviated by a response delay of the light emitting timing of the light source 141, and the display improperly blurs.) At the moment of the intersection, when the light source 141 emits a light, in accordance with only the pitch-direction vibration, the blur prevention display 153 is moved (in the direction reverse to the direction of the vibration) and displayed. However, the yaw-direction is not necessarily adjusted.

To solve the problem, at the moment of each intersection (at each point at which the pitch index position output 161 and the pitch-direction vibration angle output 163 intersects), when the yaw index position output 162 and the yaw-direction vibration angle output 164 are within predetermined values, the light source 141 is allowed to emit a light (at the light emitting timing 165). Then, in accordance with the vibration in both the pitch and yaw directions, the blur prevention index 153 is moved (in the direction reverse to the direction of the vibration) and displayed.

In this manner, the pitch index position output 161 and the yaw index position output 162 are deviated from each other in frequency at a rate of 10:11. At least one light emitting timing occurs for ten vibrations in the pitch direction. At least one light emitting timing occurs for eleven vibrations in the yaw direction. Also, the blur prevention index 153 is positioned two-dimensionally in accordance with a blur in the finder image plane. Therefore, the light source 141 is lit once for $\frac{1}{30}$ second. By repeating the operation described above, because of the afterimage effect, the photographing person sees the blur prevention index 153 continuously moving in response to the vibration in the direction reverse to the vibration direction. With human eyes, the light flickering for $\frac{1}{30}$ second or more looks as if it is continuously lit, because of its afterimage.

Figure 18A:
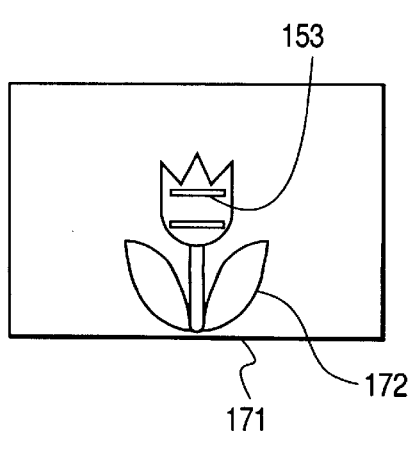
FIGS. 18A and 18B show examples of display in a finder of the finder display device of FIG. 16.
Figure 18B:
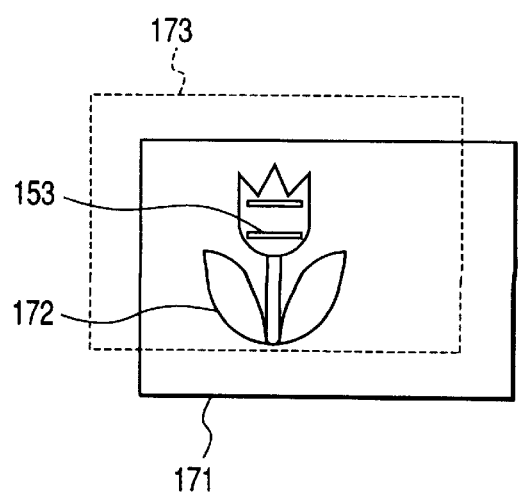

FIGS. 18A and 18B show finder view fields of the camera provided with the finder display device shown in FIG. 16. FIG. 18A shows an initial condition when the blur prevention system turns on. FIG. 18B shows that the camera is then vibrated or moved toward the lower right side in the figure, and the blur prevention index 153 is moved in the reverse direction (toward the upper left side) and displayed.

In FIGS. 18A and 18B, numeral 171 denotes a finder view field range, 172 denotes an image of an object on a finder, and 173 denotes a finder view field range before the camera is vibrated.

As shown in FIG. 18A, the blur prevention index 153 is first displayed substantially in the middle of the finder view field range 171. As shown in FIG. 18B, when the camera is vibrated toward the lower right side as seen in the figure, the blur prevention index 153 is moved in reverse or toward the upper left side, and displayed in substantially the middle of the finer view field range 173 before the camera is vibrated. The blur prevention effect is thus represented.

As aforementioned, the blur prevention index 153 in the finder view field is continuously moved and displayed to correct blurs. Therefore, the photographing person can recognize the blur prevention effect intuitively. Further, the vibration detection sensor also serves as the actuator for the blur prevention display in the finder. Consequently, the finder display device with an inexpensive and space saving blur prevention display function can be provided.

FIG. 19 is a block diagram showing a circuit arrangement of the finder display device shown in FIG. 16.

In FIG. 19, numeral 181 denotes MPU (micro-processing unit); 182 denotes a memory; 183 denotes an EEPROM; 184 denotes an LED for displaying an index on a finder (corresponding to the light source 141 in FIG. 16); 185 denotes a driving circuit for driving the LED 184; 186 denotes a vibration detection sensor for detecting a vibration in a pitch direction (corresponding to the pitch vibration detection sensor 143 in FIG. 16); 187 denotes a position detection sensor for detecting a position of a vibrator of the pitch-direction vibration detection sensor 186 (corresponding to the position detection sensor 143$f$ in FIG. 16); 188 denotes a vibration detection sensor for detecting a vibration in a yaw direction (corresponding to the yaw vibration detection sensor 144 in FIG. 16); 189 denotes a position detection sensor for detecting a position of a vibrator of the yaw-direction vibration detection sensor 188 (corresponding to the position detection sensor 144$f$ in FIG. 16); and 190, 191, 192 and 193 denote amplification circuits.

In FIG. 19, the vibration detection sensors 186 and 188 and the position detection sensors 187 and 189 are connected to an A/D conversion input terminal of the MPU 181.

Figure 20:
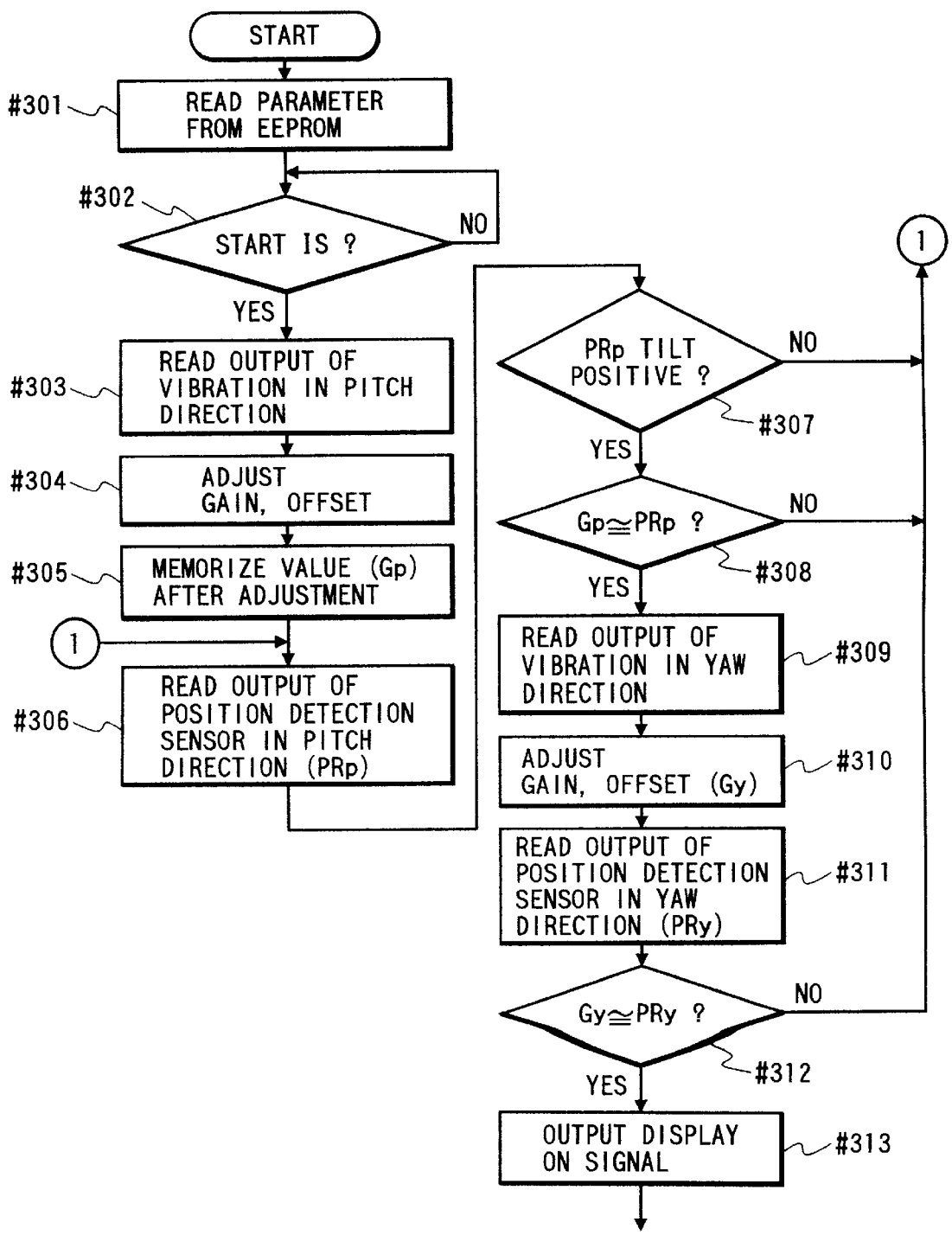
FIG. 20 is a flowchart showing an operation when a blur prevention display is performed by using the signal processing system of FIG. 19.

Operation sequence of the MPU 181 for recognizing the blur prevention effect by the display on the finder will be described with reference to a flowchart of FIG. 20.

When a main sequence of the camera is started, for example, by turning on a main switch of the camera, in a series of operations for an initial process, the MPU 181 reads from the EEPROM 183 a parameter regarding the display of the blur prevention index 153 on the finder, and stores the parameter into a predetermined address of the memory 182 (#301).

When IS (blur prevention) is started, for example, by half depressing a release operation element (YES at #302), a variable for use in processing is initialized. The MPU 181 thus reads from the A/D conversion input terminal an output of the vibration detection sensor 186 for detecting the vibration in the pitch direction (#303).

Thereafter, an offset and a gain are adjusted (#304). For the offset adjustment, deviations in offsets of the vibration detection sensor 186 and the position detection sensor 187 passed through the amplification circuits 190 and 191 are corrected when the vibration detection sensor 186 for detecting the vibration and the position detection sensor 187 for detecting the position of the vibrator of the vibration detection sensor 186 are unoperated (the vibrator of the vibration detection sensor 186 is stopped and outputs of the vibration detection sensor 186 and the position detection sensor 187 are set to zero).

Also, if signals of the vibration detection sensor 186 and the position detection sensor 187 obtained from the amplification circuits 190 and 191 are compared as they are, even after the offset adjustment, the actually visible blur prevention effect is deviated from an observer's sense. To correct the deviation, the gain adjustment is performed. Specifically, even if the signals of the vibration detection sensor 186 and the position detection sensor 187 obtained from the amplification circuits 190 and 191 have equal values, the actual blur quantity on the finder is not necessarily equal to the position of the vibrator of the vibration detection sensor 186 at the moment. Therefore, through the gain adjustment, the output of the vibration detection sensor 186 is converted to the blur quantity on the finder. Then, the blur prevention index is displayed on the position of the vibrator of the vibration detection sensor 186 which is equal to the blur quantity.

In the actual processing of the MPU 181, the offset and gain are adjusted in a following equation:

$$Gp=AMPp(Gp'-OFFSETp)$$

In the equation, Gp is an output of the vibration detection sensor 186 after the adjustment, and Gp' is an output of the vibration detection sensor 186 before the adjustment. Constants for the offset and gain adjustments are represented by OFFSETp and AMPp, which are both prestored in the EEPROM 183. A value of OFFSETp is obtained as a difference in output between the vibration detection sensor 186 and the position detection sensor 187 when they are unoperated, and stored in the EEPROM 183. The constant AMPp is used when the output of the vibration detection sensor 186 is converted to the blur quantity on the finder, so that the blur prevention index is displayed on the vibrator position of the vibration detection sensor 186 which is equal to the quantity. The constant is experimentally obtained and stored in the EEPROM 183.

If a value of Gp is larger than the vibration width of the vibrator of the vibration detection sensor 186, the value of Gp is substituted for values on its opposite ends. Specifically, the output value of the position detection sensor 187 for detecting the position of the vibrator is set in a range from PRpmin to PRpmax. When the value of Gp is less than PRpmin:

$$Gp=PRpmin$$

Also, when the value of Gp exceeds PRpmax:

$$Gp=PRpmax$$

Needless to say, this is performed to display the blur prevention index 153 based on the output relationship shown in FIG. 17. This prevents the problem that the blur prevention index 153 is not displayed in the finder image plane when the value of Gp is larger than the vibration width of the vibrator of the vibration detection sensor 186.

The output Gp of the vibration detection sensor 186 after the offset and gain adjustments is obtained in this manner, and stored in the memory 182 (#305).

Subsequently, the output PRp of the position detection sensor 187 for detecting the position of the vibrator of the vibration detection sensor 186 in the pitch direction is read from the A/D conversion input terminal (#306). Then, it is determined whether or not a tilt of an output signal from the position detection sensor 187 is positive (#307). This is performed by comparing the previous output from the position detection sensor 187 stored in the memory 182 with the presently read output value PRp. If the value stored in the memory 182 is an initialized value, it is determined that the tilt of the output from the position detection sensor 187 is not positive. In this manner, when the tilt of the output from the position detection sensor 187 is not positive (NO at #307), the process returns to the #306 to again read the output from the position detection sensor 187 for detecting the vibrator position of the vibration detection sensor 186 in the pitch direction from the A/D conversion input terminal. Again in the step #307, it is again determined whether or not the tilt of the output from the position detection sensor 187 is positive. The process is repeated until the tilt of the output from the position detection sensor 187 becomes positive.

Subsequently, when the tilt of the output from the position detection sensor 187 becomes positive, (YES at #307), the output PRp from the position detection sensor 187 at the moment is compared with the output Gp of the vibration detection sensor 186 after the offset and gain adjustments which is stored in the memory 182 (#308). As a result, when the difference is equal to or less than a value of the parameter which is read from the EEPROM 183 into the memory 182 in a series of initial process, the outputs are regarded as substantially equal. In other words, the vibrator of the pitch vibration detection sensor 186 is regarded to be in a vibrating condition in which the blur prevention index 153 can be displayed in positions of the case where the vibration in the pitch direction at the moment is displayed in the image plane (corresponding to positions of the outputs 161 and 163 shown by black dots in FIG. 17). Then, the process advances to the next step #309. On the other hand, when both output values are not regarded as substantially equal (NO at #308), the process returns to the step #306 to again read from the A/D conversion input terminal the output of the position detection sensor 187 for detecting the vibrator position of the vibration detection sensor 186 in the pitch direction. The same operation is repeated.

At the next step #309, the MPU 181 reads from the A/D conversion input terminal an output of the vibration detection sensor 188 for detecting the vibration in the yaw direction. Thereafter, in the same manner as the output of the vibration detection sensor 186 for detecting the vibration in the pitch direction, the offset and gain are adjusted (#310). In the actual processing of the MPU 181, the offset and gain are adjusted in a following equation:

$$Gy=AMPy(Gy'-OFFSETy)$$

In the equation, Gy is an output of the vibration detection sensor 186 after the adjustment, and Gy' is an output of the vibration detection sensor 186 before the adjustment. Constants for the offset and gain adjustments are represented by OFFSETy and AMPy, respectively, which are both prestored in the EEPROM 183. A value of OFFSETy is obtained as a difference in output between the vibration detection sensor 188 and the position detection sensor 189 when they are unoperated, and stored in the EEPROM 183. The constant AMPy is used when the output of the vibration detection sensor 188 is converted to the blur quantity on the finder, so that the index is displayed on the vibrator position of the vibration detection sensor 188 which is equal to the quantity. The constant is experimentally obtained and stored in the EEPROM 183.

If a value of Gy is larger than the vibration width of the vibrator of the vibration detection sensor 188, the value of Gy is substituted for values on its opposite ends. Specifically, the output value of the position detection sensor 189 for detecting the position of the vibrator is set in a range from PRymin to PRymax. When the value of Gy is less than PRymin:

$$Gy=PRymin$$

Also, when the value of Gy exceeds PRymax:

$$Gy=PRymax$$

The output Gy of the vibration detection sensor 188 after the offset and gain adjustments is obtained in this manner, and stored in the memory 182 (#310).

Subsequently, the MPU 181 reads from the A/D conversion input terminal the output PRy of the position detection sensor 189 for detecting the position of the vibrator of the vibration detection sensor 188 in the yaw direction (#311). Then, the output from the position detection sensor 189 at the moment is compared with the output Gy of the vibration detection sensor 188 after the offset and gain adjustments which is stored in the memory 182 (#312). As a result, when the difference is equal to or less than the value of the parameter which is read from the EEPROM 183 into the memory 182 in a series of initial process, the outputs are regarded as substantially equal. In other words, the vibrator of the yaw vibration detection sensor 188 is regarded to be in a vibrating condition in which the blur prevention index 153 can be displayed in the positions of the case where the vibration in the yaw direction at the moment is displayed in the image plane. Then, the process advances to step #313 for displaying the blur prevention index 153. On the other hand, when both output values are not regarded as substantially equal, the process returns to the step #306 to again read from the A/D conversion input terminal the output of the position detection sensor 187 for detecting the vibrator position of the vibration detection sensor 186 in the pitch direction.

At the step #313 for displaying the blur prevention index 153, the MPU 181 outputs a display on signal to the driving circuit 185 (the timing corresponds to the light emitting timing 165 shown in FIG. 17). During the output of the display on signal, the driving circuit 185 turns on the LED 184. While the LED 184 is turned on, the blur prevention index 153 is displayed on the finder as shown in FIGS. 18A and 18B.

As aforementioned, the output of the position detection sensor 187 for detecting the position of the vibrator in the pitch direction substantially equals the output of the vibration detection sensor 186. Also, the tilt of the output signal from the position detection sensor 187 is positive (or negative). Then, the output of the position detection sensor 189 for detecting the position of the vibrator in the yaw direction substantially equals the output of the vibration detection sensor 188. In this case, by displaying the blur prevention index 153, the index displayed on the finder constantly follows up an object which is observed through the finder. Therefore, the blur prevention effect can be confirmed.

Figure 21:
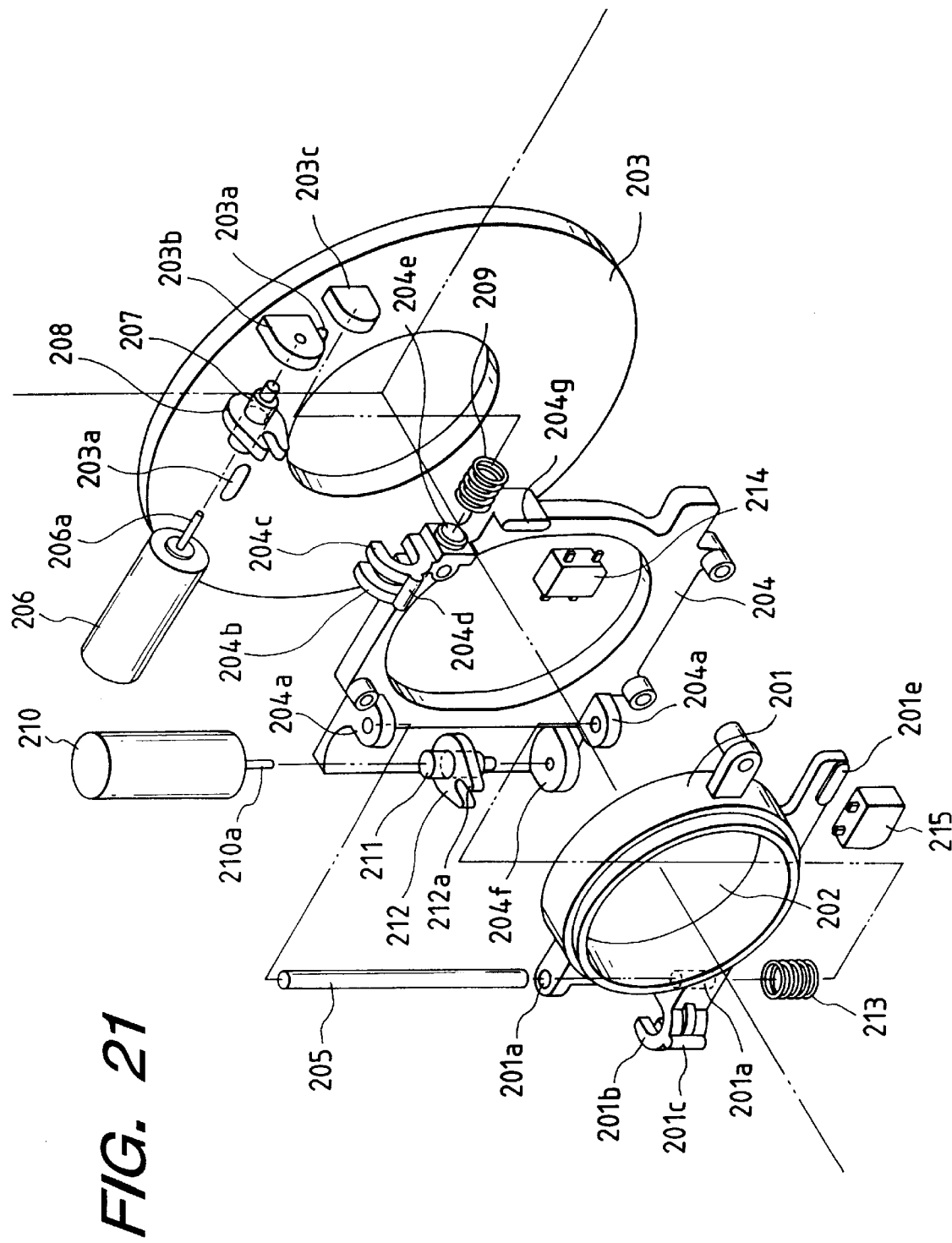
FIG. 21 is a perspective view showing an example of a mechanical arrangement of a correction optical device incorporated in a compact camera according to a fourth embodiment of the invention.
Figure 22A:
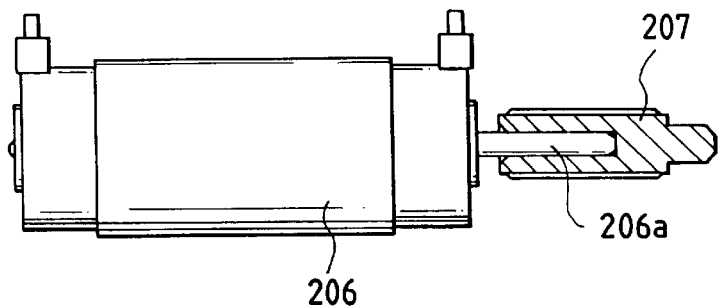
FIGS. 22A and 22B are enlarged side views showing a detail of a feed screw portion fixed to an output axis of a motor of FIG. 21 and a modification thereof.
Figure 22B:
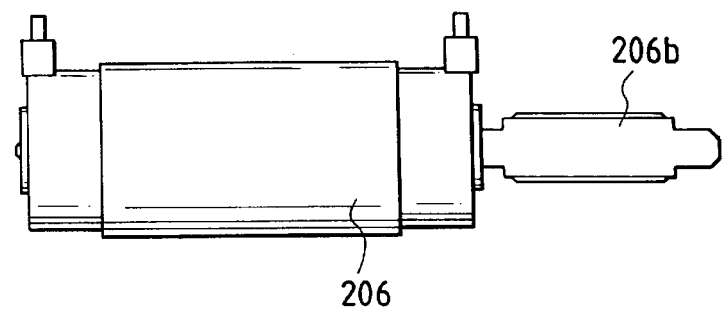
Figure 23:
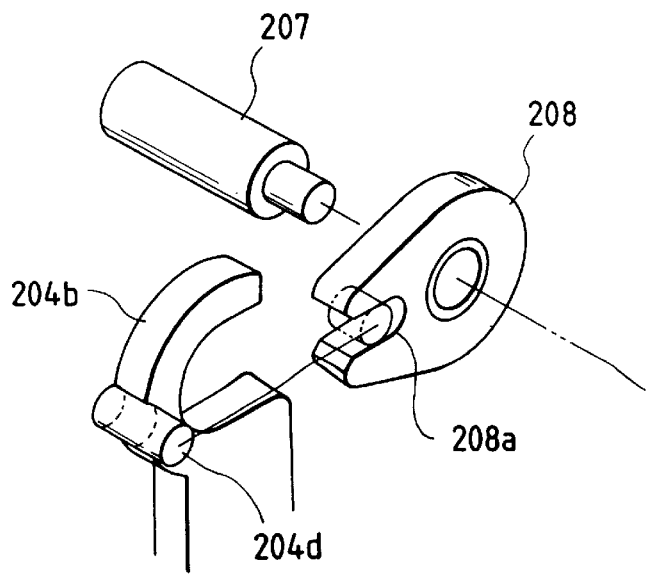
FIG. 23 is an enlarged perspective view showing a mechanical portion for moving a lens holder with the motor of FIG. 21.

FIGS. 21 to 23 are perspective views showing an arrangement of a correction optical device mounted on the camera of the embodiment.

In FIG. 21, numeral 201 denotes a lens holder for holding a correction lens 202 in its middle. By displacing the correction lens 202 via the lens holder 201 in a plane which is orthogonal to an optical axis, an incident light beam can be polarized. Therefore, by detecting a camera vibration and displacing the correction lens 202 in such a manner that the light beam is polarized in the direction reverse to the camera vibration, the camera vibration can be corrected. Numeral 203 denotes a bottom board disposed in a lens mirror tube for forming a base to support a lens shift mechanism. Numeral 204 denotes a yaw holder which has a protrusion (not shown) engaged in an elongated hole 203a of the bottom board 203 and can be displaced only in the yaw direction.

Numeral 205 denotes a guide bar inserted through a guide hole 201a formed in the lens holder 201. Both ends of the guide bar 205 are supported by bearing portions 204a of the yaw holder 204 in such a manner its axial direction coincides with a pitch direction. In the arrangement, the lens holder 201 can be displaced only in the pitch direction relative to the bottom board 203. The yaw holder 204 can be displaced only in the yaw direction relative to the bottom board 203. Therefore, as a result of both displacements, the correction lens 202 can be displaced in both the pitch and yaw directions.

Numeral 206 denotes a yaw motor which is constituted of a step motor and disposed in such a manner that its rotation axis 206a is perpendicular to the optical axis. Also, a male-threaded feed screw 207 is fixed on an outer periphery of the rotation axis 206a. FIG. 22A shows a detail of a fixing portion. As shown in FIG. 22A, the feed screw 207 is inserted onto the rotation axis 206a and fixed with an adhesive. Alternatively, as shown in FIG. 22B, the rotation axis may be directly threaded like 206b.

Numeral 208 denotes a female-threaded nut which is engaged with the feed screw 207 and has a U-shaped portion 208a into which a vibration stopper member described later is inserted. A tip end of the feed screw 207 is engaged with a bearing portion 203b of the bottom board 203. The yaw motor 206 is fixed with an adhesive or the like to the bottom board 203 in such a manner that its axis coincides with the yaw direction. The yaw holder 204 has nut receiving portions 204b and 204c with the nut 208 inserted therebetween and a vibration stopper portion 204d for stopping rotation of the nut 208.

The relationship among the feed screw 207, the nut 208 and the yaw holder 204 will be described with reference to FIGS. 21 and 23.

The nut 208 is engaged with the feed screw 207, and additionally inserted between the nut receiving portions 204b and 204c of the yaw holder 204. With the vibration stopper portion 204d inserted in the U-shaped portion 208a, the nut 208 is prevented from rotating. When the yaw motor 206 is rotated, the feed screw 207 fixed to the motor axis 206a is rotated. When the feed screw 207 is rotated, the nut 208 also tries to rotate. However, the U-shaped portion 208a of the nut 208 is prevented from rotating by the vibration stopper portion 204d. Therefore, the nut 208 fails to rotate, and moves in its axial direction by one pitch while the yaw motor 206 is rotated once.

Subsequently, when the nut 208 is moved in the axial direction of the thread, the nut 208 abuts on the yaw holder 204 to integrally move the yaw holder 204. A yaw spring 209 is disposed between a spring receiving portion 204e of the yaw holder 204 and a spring receiving portion 203c of the bottom board 203 to give a biasing force to the yaw holder 204 in the yaw direction (toward the left in FIG. 21). In this manner, the yaw holder 204 is biased toward the left. Therefore, a right-side face of the nut 208 constantly abuts on a left-side face of the nut receiving portion 204c of the yaw holder 204. Then, the nut 208 and the yaw holder 204 are integrally displaced. Additionally, the feed screw 207 and the nut 208 are threaded and finely pitched. The feed screw 207 is never rotated by the axial biasing force applied from the nut 208 to the feed screw 207. Specifically, the nut 208 moves when the yaw motor 206 is rotated. When electricity is cut off to stop the yaw motor 206, however, the nut 208 stays in a position where it is stopped.

Numeral 210 is a pitch motor which is constituted of a step motor and fixed on the yaw holder 204 in such a manner that a rotation axis 210a is perpendicular to the optical axis and coincides with the pitch direction. In the same manner as the yaw motor 206, a feed screw 211 with its outer periphery male-threaded is fixed to the rotation axis 210a. The feed screw 211 is engaged with a nut 212, and has its tip end engaged with an axis receiving portion 204f of the yaw holder 204. The nut 212 is inserted between nut receiving portions 201b and 201c of the lens holder 201. With a vibration stopper portion 201d in an U-shaped portion 212a, the nut 212 is inhibited from rotating. The lens holder 201 is biased upward as seen in the figure on the yaw holder 204 by a pitch spring 213 which is disposed between the axis receiving portion 204a of the yaw holder 204 and the lens holder 201 itself. In the same manner as in the yaw direction, when the pitch motor 210 is rotated, the feed screw 211 fixed to the rotation axis 210a is rotated. The nut 212 is prevented from rotating by the vibration stopper portion 201d of the lens holder 201. Therefore, the nut 212 moves in its axial direction by one thread pitch while the feed screw 211 is rotated once. Then, the nut 212 abuts on the receiving portion 201c of the lens holder 201 to move the lens holder 201. Since the lens holder 201 is biased upward by the pitch spring 213, the lens holder 201 is displaced when a lower face of the nut 212 abuts on a top face of the receiving portion 201c of the lens holder 201.

In the arrangement described above, as the pitch motor 210 rotates, the lens holder 201 is displaced in the pitch direction on the yaw holder 204.

The yaw spring 209 and the pitch spring 213 are disposed to push vicinities of guide axes when the yaw holder 204 and the lens holder 201 are displaced, respectively. Specifically, the pitch spring 213 pushes the lens holder 201 along the axis of the guide bar 205. The yaw spring 209 pushes a vicinity of a longitudinal axis of the elongated hole 203a. An angular moment produced by the spring pushing force is prevented from being exerted on the lens holder 201. Therefore, the lens holder 201 can be displaced smoothly. Further, the pitch spring 213 exerts a biasing force to the lens holder 201 in the direction reverse to a direction of a gravity (upward in FIG. 21). The gravity and the spring force are thus prevented from acting in the same direction.

Numeral 214 denotes a yaw displacement sensor which uses a known photo reflector in the embodiment. The yaw holder 204 has a sensor reflecting portion 204g which is painted white to increase a reflectivity. The yaw displacement sensor 214 is fixed to a cover member (not shown). When the yaw holder 204 is displaced in the yaw direction, a luminous energy of the photo reflector reflected by the reflecting portion 204g is changed, so that displacement can be detected. Numeral 215 denotes a pitch displacement sensor which uses a photo reflector in the same manner as in the yaw direction and is fixed to the cover member. The lens holder 201 also has a reflecting portion 201e which is painted white to enhance the reflectivity in the same manner as the reflecting portion 204g.

When the lens holder 201 is displaced in the pitch direction, a luminous energy of the photo reflector reflected by the reflecting portion 201e is changed, so that displacement can be detected. The reflecting portion 201e of the lens holder 201 is formed long in parallel with the yaw direction. Even when the lens holder 201 is displaced in the yaw direction as the yaw holder 204 is displaced, the luminous energy reflected by the light of the photo reflector is unchanged. The luminous energy is changed only by the displacement in the pitch direction.

In the arrangement described above, the displacement of the lens holder 201 which is displaced in both the pitch and yaw directions can be detected independently in the pitch direction and the yaw direction.

In the aforementioned arrangement, the pitch motor 210 fixed onto the yaw holder 204 displaces the lens holder 201 (the correction lens 202) in the pitch direction. The yaw motor 206 fixed to the bottom board 203 displaces the correction lens 202 integrally with the yaw holder 204 and the pitch motor 210. In this manner, the direction in which the motor and the correction lens 202 are integrally displaced is set as "the yaw direction or the horizontal direction". The direction in which only the correction lens 202 is displaced is set as "the pitch direction or the perpendicular direction". In the perpendicular direction in which the gravity acts, only the correction lens 202 is displaced. Therefore, no large load is applied.

Also, the aforementioned arrangement has a simple structure and provides a smooth movement as compared with a structure in which the pitch motor 210 is fixed on the bottom board 203 in such a manner that the correction lens 202 and the pitch motor 210 are integrally driven without causing a relative displacement therebetween when the correction lens 202 is displaced in the yaw direction. Specifically, in the structure where the pitch motor 210 is fixed to the bottom board 203, since a relative displacement occurs between the pitch motor 210 and the bottom board 203, a sliding member for sliding the lens holder 201 is used. Therefore, when the correction lens 202 is driven in the yaw direction, a friction occurs between the sliding member and the lens holder 201. Because of a frictional resistance, a drive load is increased. The structure necessarily becomes complicated. Further, a response delay is disadvantageously caused by a backlash. The problem can be solved by the aforementioned arrangement.

Also, the pitch motor 210 and the yaw motor 206 are disposed in such a manner that directions of the rotation axes 210a and 206a, i.e., longitudinal directions of the motors coincide with a direction perpendicular to the optical axis. Therefore, the correction optical device can be flattened. Specifically, the correction optical device is lengthened along the optical axis and fails to be enlarged. Also, when the correction optical device is incorporated in the camera, the motor can be disposed in a space necessary as a clearance for a shutter blade around the lens. A spatial efficiency or the like is enhanced when the correction optical device is incorporated in the camera.

Further, since the movement direction of the correction lens 202 (lens holder 201) coincides with the direction of the rotation axis of each motor, the correction lens 202 can be displaced by the feed screw as shown in FIG. 21. As compared with a conventional arrangement in which an output of a motor is transmitted to a cam to displace a correction lens, a sufficient force can be exerted without a speed reducer and a highly precise control is possible. Because the correction lens 202 is displaced by one thread pitch while the motor rotates once. In the case of the cam, the correction lens needs to be displaced by all the strokes within one rotation of the motor. The movement quantity of the lens per motor rotation angle is large, a large force is necessary, and a precision is deteriorated. Specifically, in the embodiment, when one thread pitch is 0.2 mm, the motor rotates five times relative to a stroke of 1 mm.

Operation of the correction optical device will be briefly described.

First, when the power supply of the camera is turned on, the yaw displacement sensor 214 and the pitch displacement sensor 215 detect the position of the lens holder 201 from the luminous energy from the reflecting portions 204g and 201e of the yaw holder 204 and the lens holder 201. The yaw motor 206 and the pitch motor 210 are then driven. The correction lens 202 is thus moved until the center of the correction lens 202 coincides with a center of an optical photographing system (optical axis). When the electricity to the motor is cut off, the correction lens 202 stays in a position where it is stopped. When no camera vibration correction is performed, photographing is performed while the correction lens 202 is in the central position. At the time of photographing, when the camera vibration correction is performed, based on the signals from the vibration detection sensors 186 and 188 shown in FIG. 19, the yaw motor 206 and the pitch motor 210 are operated to displace the yaw holder 204 and the lens holder 201 (correction lens 202) in a direction in which the camera vibration is set off.

Figure 24:
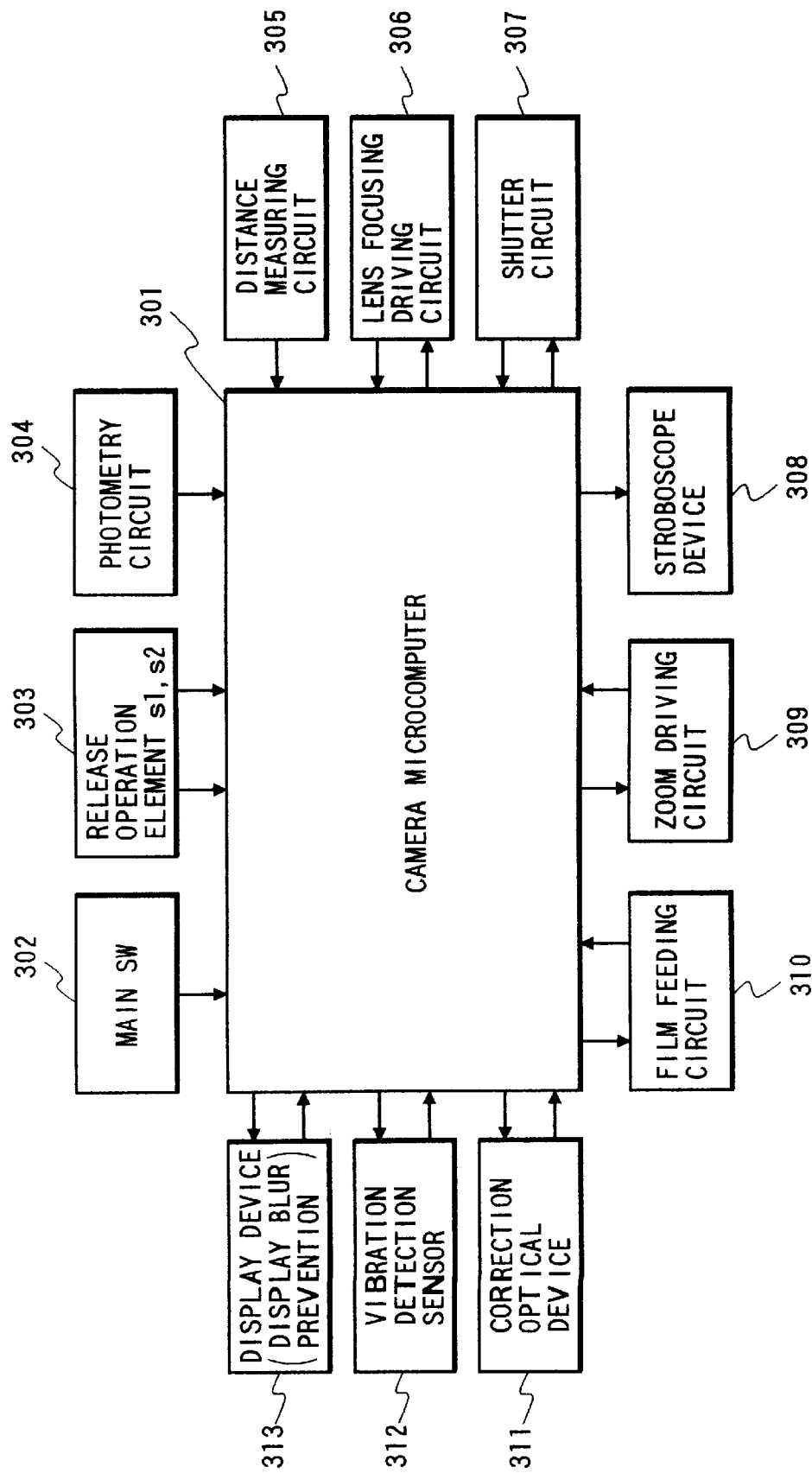
FIG. 24 is a block diagram showing a circuit arrangement of the compact camera according to the fourth embodiment of the invention.

FIG. 24 is a block diagram diagrammatically showing an electric arrangement of the camera which is provided with the blur prevention system having the aforementioned correction optical device, the vibration detection sensors and the like, the finder display device and the like. As the camera supposed is a compact camera in which a barrel of a photographing lens can be lowered.

In FIG. 24, numeral 301 denotes a camera microcomputer, and 302 denotes a camera main switch. Numeral 303 denotes a release operation element. By half pushing the release operation element 303, a signal s1 is generated to start a photographing preparatory operation, i.e., to start photometry and distance measuring. When the release operation element 303 is fully pushed, a signal s2 is generated to start a photographing operation (exposure). Numeral 304 denotes a photometry circuit for calculating photometry information; 305 denotes a distance measuring circuit for calculating distance measuring information; 306 denotes a lens focusing driving circuit for adjusting a focusing of a photographing lens; 307 denotes a shutter circuit for opening or closing a shutter; 308 denotes a stroboscope device; 309 denotes a zoom driving circuit for adjusting a focal length of the photographing lens; 310 denotes a film feeding circuit for winding or rewinding a film; 311 denotes the correction optical device shown in FIG. 21; and 312 denotes the vibration detection sensor shown in FIG. 16. The vibration detection sensor 312 also serves as an actuator for blur prevention display, and detects a vibration for use in the blur prevention display and the correction of blur in the correction optical device. Numeral 313 denotes a display device which includes the portion for the blur prevention display (the display of the blur prevention index) in the finder shown in FIGS. 18A and 18B.

The camera microcomputer 301 receives a signal from the main switch 302, the signals s1 and s2 from the release operation element 303, the photometry information from the photometry circuit 304 and the distance measuring information from the distance measuring circuit 305. Based on these signals, the camera microcomputer 301 controls operations of the lens focusing driving circuit 306, the shutter circuit 307, the stroboscope device 308, the zoom driving circuit 309, the film feeding circuit 310, the correction optical device 311, the vibration detection sensor 312 and the display device 313.

Also, the camera microcomputer 301 receives necessary information from the circuits and devices described above: for example, position information of the photographing lens and rotation information of a focusing-lens drive motor from the lens focusing driving circuit 306; an opening quantity of the shutter from the shutter circuit 307; a feeding quantity of the photographing lens from the zoom driving circuit 309; a feeding condition of the film and a load of a feeding motor from the film feeding circuit 310; position (displacement) information from the correction optical device 311; and a vibration applied to the camera from the vibration detection sensor 312.

Further, the camera microcomputer 301 makes the display device 313 display conditions of the aforementioned plural circuits and devices, further vibrating conditions thereof. If necessary, the stroboscope device 308 is made to emit a light and compensate for the luminous energy at the time of photographing.

Figure 25:
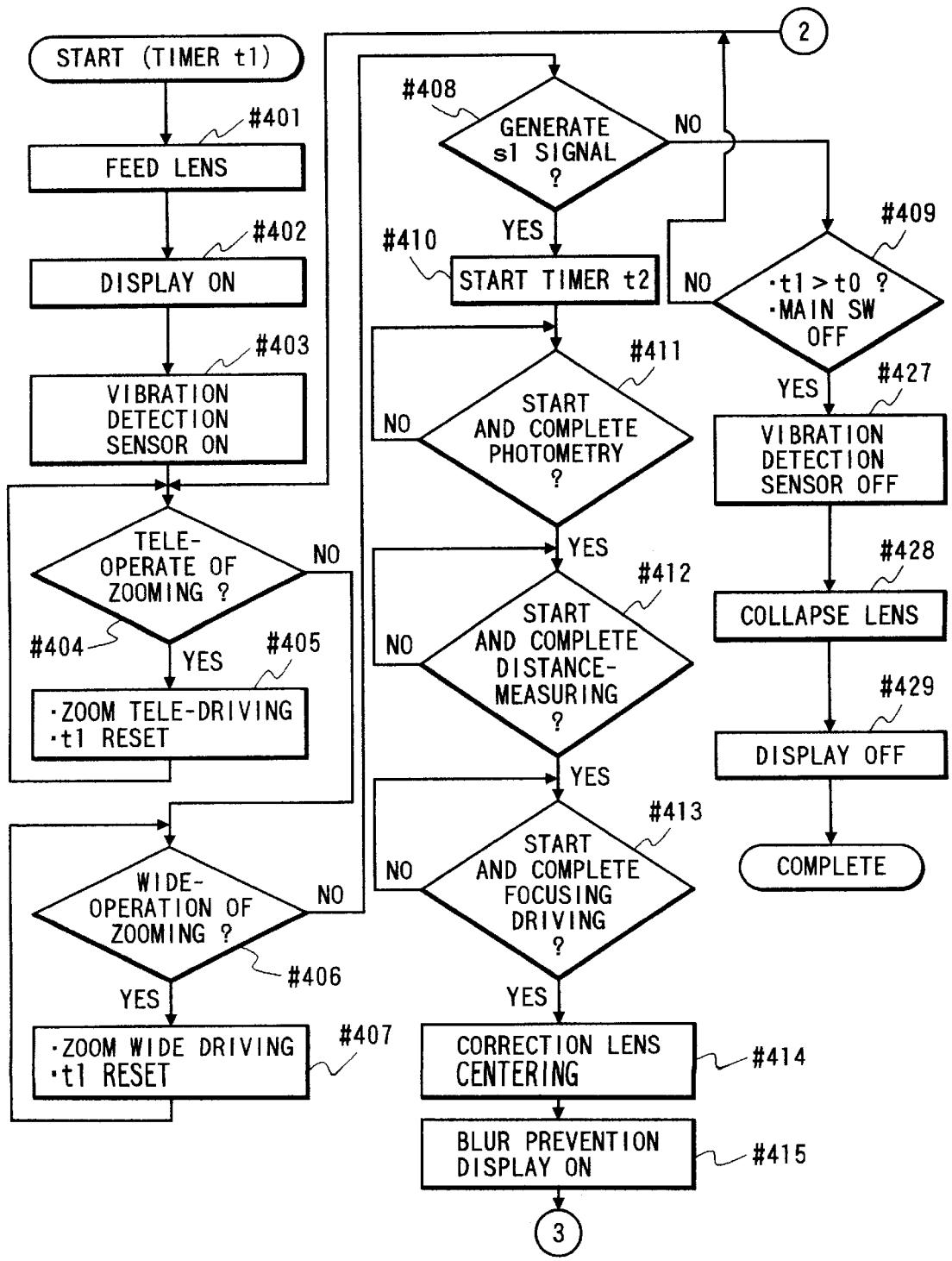
FIG. 25 is a flowchart showing a portion of a series of operations of the camera shown in FIG. 24.
Figure 26:
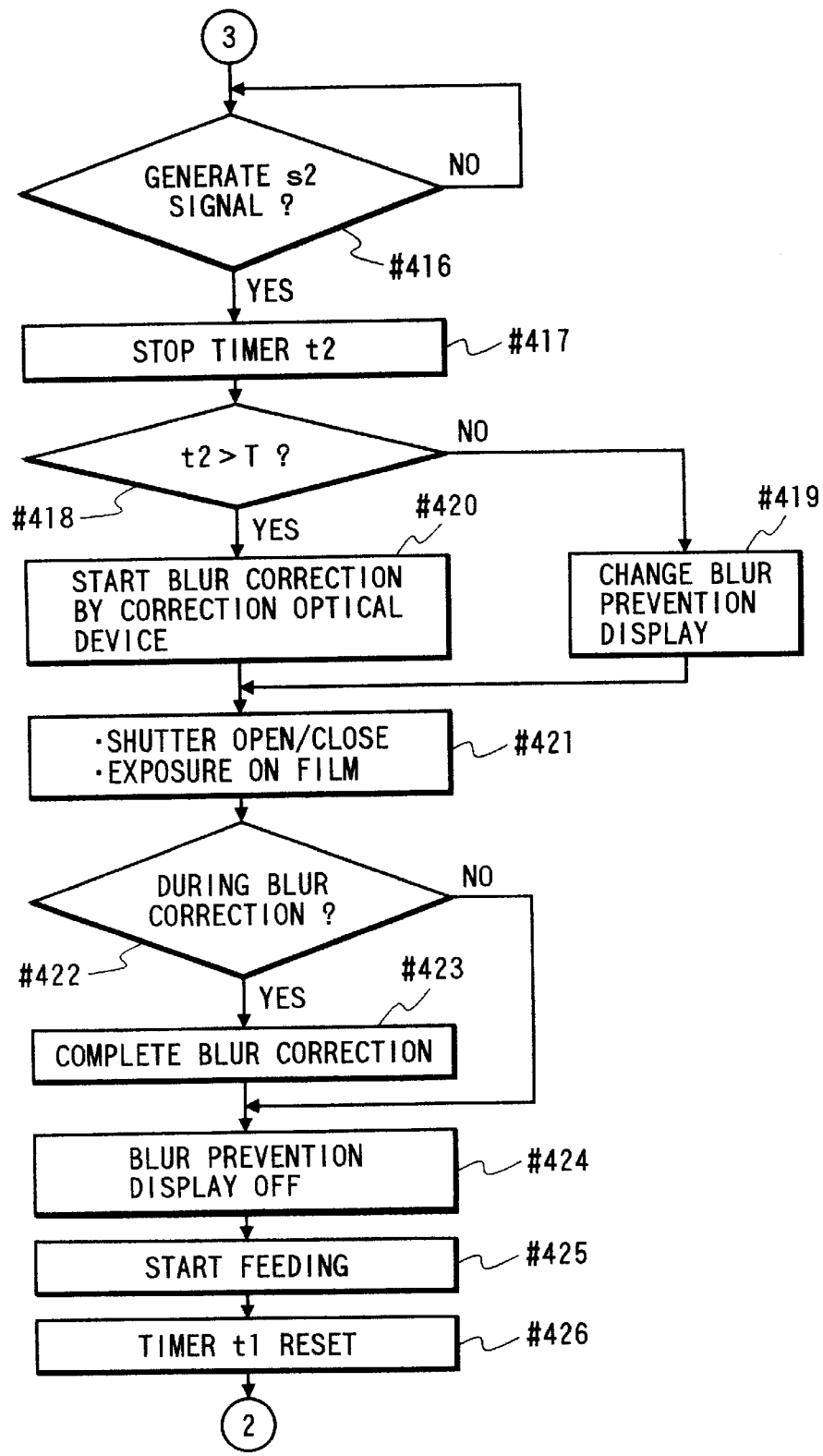
FIG. 26 is a flowchart showing an operation continued from FIG. 25.

FIGS. 25 and 26 show a flowchart of a sequence of operation in the camera microcomputer 301. When the main switch 302 is turned on, the flow of operation is started. Additionally, a timer in the camera microcomputer 301 is started to count time until time t1 is reached. The timer is hereinafter referred to as the timer t1, and other times are referred to in the same manner. The timer t1 is used for automatically turning off the main switch 302 when the camera is left unoperated with the main switch 302 kept on.

As aforementioned, after the main switch 302 is turned on, at step #401 the photographing lens whose barrel has been stored in a camera body is fed by the zoom driving circuit 309. At this time, a lens barrier for protecting the photographing lens is also opened. At the next step #402, the display device 313 is turned on to display each functional condition and photographing information of the camera (they are usually displayed on a surface of the camera body or in the camera finder). At the subsequent step #403, the vibration detection sensor 312 provided for detecting the blurring from the hand vibration on the camera is turned on to start the detection.

Subsequently, it is determined at step #404 whether or not zooming is tele-operated (to lengthen a focal length). As not shown in FIG. 23, a condition of a zoom switch for zooming is also transmitted to the camera microcomputer 301. If the tele-operation of zooming is performed, the process advances to step #405, where the photographing lens is tele-driven via the zoom driving circuit 309. Also, at this time the timer t1 is reset. Not only during the zoom operation, but also every time another operation switch provided on the camera is operated, the timer t1 is reset. Specifically, every time the operation is performed, the timer t1 for turning off the main switch 302 is reset. As long as the operation is continued, however, the main switch 302 of the camera is not turned off.

When at the step #404 the zooming tele-operation is not performed, the process advances to step #406, where it is determined whether or not a wide-operation of zooming is performed (to shorten the focal length). If the zooming wide-operation is performed, the process advances to step #407, where the photographing lens is driven in a zoom-wide direction via the zoom driving circuit 309. Also, in the same manner as aforementioned, the timer t1 is reset. Needless to say, the photographing lens is protected in such a manner that the photographing lens is prevented from being driven when the photographing lens already positioned in a zoom wide driving end or a zooming tele-driving end is further driven toward the end.

At the next step #408, it is determined whether or not the signal s1 is generated by half pushing the release operation element 303. If the signal s1 is not generated, the process advances to step #409, where it is determined whether or not a value of the timer t1 reaches t0 or more or the main switch 302 is turned off. When it is determined that the photographing person will not use the camera, i.e., when the main switch 302 is turned off or the camera is not operated for t0, e.g., four minutes and it is determined that the camera is left unoperated, then the process goes to step #427.

At the step #427, the vibration detection sensor 312 is turned off. Then at step #428, in reverse to the step #401, the barrel of the photographing lens is collapsed and stored in the camera body, and simultaneously the lens barrier is closed. At the next step #429, the display on the display device 313 is turned off, thereby completing a series of operation.

Also, when at the step #409 the timer t1 does not reach t0 or the main switch 302 is on, the process returns to the step #404. The operation of the steps #405 to #409 is repeated.

Additionally, the flowchart of FIG. 25 show only the conditions of the zoom operation switch (not shown), the main switch 302 and the release operation element 303. However, needless to say, the actual flow of operation is interrupted by conditions of the other operation elements, for example, an operation switch for changing a stroboscope mode and the display thereof.

When it is determined at the step #408 that the signal s1 is generated by half pushing the release operation element 303, the process goes to step #410. At the step #410, a timer t2 for counting time (independent of the timer t1) until time t2 is reached is started. At the next step #411, the photometry of an object is started by the photometry circuit 304. When the photometry is completed, the process advances to step #412, where a distance to the object is measured (distance measuring is started) by the distance measuring circuit 305. When the distance measuring is completed, the process goes to step #413. Then, at the step #413 the photographing lens is focused via the lens focusing driving circuit 306. When the focusing driving is completed, the process goes to step #414.

At the step #414, the correction lens of the correction optical device 311 is centered on the optical axis of the photographing lens. Usually, the optical axis of the correction lens coincides with the optical axis of the photographing lens. At this step when the optical axis of the correction lens is deviated from the optical axis of the photographing lens, they are aligned with each other to obtain a good image. Specifically, the position of the correction lens is detected by the position detection sensor. When the position is not a predetermined position (initial position), the correction lens is driven toward the predetermined position. Then, when the output of the position detection sensor is a predetermined value or reaches the predetermined value, the process goes to step #415. On the display device 313 the blur prevention display is turned on. Specifically, the blur prevention index 153 is displayed to inform the photographing person of the blur prevention condition. Then, the process goes to step #416 in FIG. 26.

At the step #416 of FIG. 26, the camera microcomputer 301 is on standby until the signal s2 is generated by fully pushing the release operation element 303. When to perform an exposure the release operation element 303 is fully pushed to generate the signal s2, the process goes to step #417 for stopping the timer t2. At the next step #418, the timer t2 is compared with a predetermined time T (e.g., 200 msec). When t2>T, the process goes to step #420. Subsequently, at the step #420 the correction optical device 311 is started for blur correction.

At the step #418, when it is determined that "t2<T" or "t2=T" (a generation interval between the signals s1 and s2 is shorter than the time T because the release operation element 303 is fully pushed at one stroke), the process advances to step #419. The blur prevention display is changed, for example, by flickering the blur prevention index 153 or otherwise, to give notice of the blurring from the hand vibration. In this case, specifically, when "t2<T" or "t2=T", the correction optical device 311 is inhibited from performing the blur correction. A reason why the blur correction is not performed when the release operation element 303 is fully pushed at one stroke will be described.

When the release operation element 303 is fully pressed at one stroke, the camera is largely vibrated to the pressing direction. A frequency component of the vibration is lower (e.g., 500 mHz) as compared with a frequency component of the vibration from the hand vibration on the camera. Therefore, in some case the vibration detection sensor 312 cannot precisely detect the vibration.

In this case, when an angular velocity is detected by the vibration detection sensor 312, its output is integrated through arithmetic operation. By using the output as a target value, the correction lens is driven. Alternatively, an angular velocity obtained from a mechanical property of the correction lens is mechanically integrated. The movement of the correction lens indicates an angle of the vibration from the hand vibration. The vibration and the vibration applied to the camera are counterbalanced. In this blur prevention system, because of its limitation of integrability, the vibration with an extremely low frequency is not precisely integrated. (Phase is deviated from the actual vibration from the hand vibration. For details, refer to the Japanese Patent Application Laid-open No. 63-275917).

If the blur correction is performed with the inferior blur correction precision (the blur correction is performed in the phase deviated from the actual blurring from the hand vibration), an image is in some case formed worse as compared with an image before the blur correction is performed. Therefore, by detecting an interval between the half pushing and the full pushing of the release operation element 303, i.e., the time interval between the signals s1 and s2, it is determined whether or not the aforementioned vibration different in property is generated by strongly pushing the release operation element 303. The blur correction is thus inhibited.

After the operation of the step #419 or #420 is completed, the process advances to step #421, where a shutter (not shown) is controlled to open or close via the shutter circuit 307, thereby performing an exposure on the film. As not detailed in the flowchart of FIG. 26, actually at the step #421, after the shutter is opened by the quantity and time which are determined from the photometry information obtained by the photometry circuit 304, the shutter is closed. The exposure on the film is then completed. Also, during the exposure on the film, the blur correction is not stopped even if an operation for turning off the blur prevention system (constituted of the correction optical device 311 and the vibration detection sensor 312) is performed (when the camera is provided with an operation element with which the photographing person turns off the blur prevention system). This function is provided for preventing the image from being deteriorated by the behavior of the correction lens when the blur correction is stopped during the exposure. This is also a countermeasure for the case in which the blur prevention system is turned off by mistake during the exposure.

At the next step #422 it is determined whether or not the blur correction is being performed. When the blur correction is not performed (the process goes to the step without passing the step #420), the process immediately advance to step #424. On the other hand, when the blur correction is performed, the process advances to the step #423. The blur correction by means of the correction optical device 311 is completed. Thereafter, the correction lens is centered (in the same manner as the step #414), and the process advances to step #424.

At the step #424 the blur prevention display on the display device 313 is turned off. Additionally, as aforementioned, the blur prevention is displayed in the finder as the blur prevention index in accordance with the actual vibration. The photographing person can confirm the blur prevention condition through the finder. At the subsequent step #425 a photographed frame is advanced via the film feeding circuit 310, so that the next frame to be photographed is placed in a photographing position. Then, the process advances to the step #426 to reset the timer t1, and then returns to the step #404. Additionally, at the step #426 the timer t1 is reset because the main switch 302 is prevented from being automatically turned off when the timer t1 counts up time.

In the aforementioned flow of operation, only at the step #409 of FIG. 25, the condition of the main switch 302 is observed. Actually, the main switch 302 is observed everywhere. For example, even when the main switch 302 is turned off for a long time during the exposure, the camera can accept that.

Here, in some case a slight time (about one second) is necessary from when the blur prevention system, especially the vibration detection sensor 312 is turned on till its output is stabilized. If photographing is performed during the time, blur correction cannot be properly performed. Additionally, the image is deteriorated in some case (because of a wrong signal from the vibration detection sensor 312). To prevent this, in the sequence of camera operation, the photographing is inhibited until the vibration detection sensor 312 is stabilized.

Figure 27:
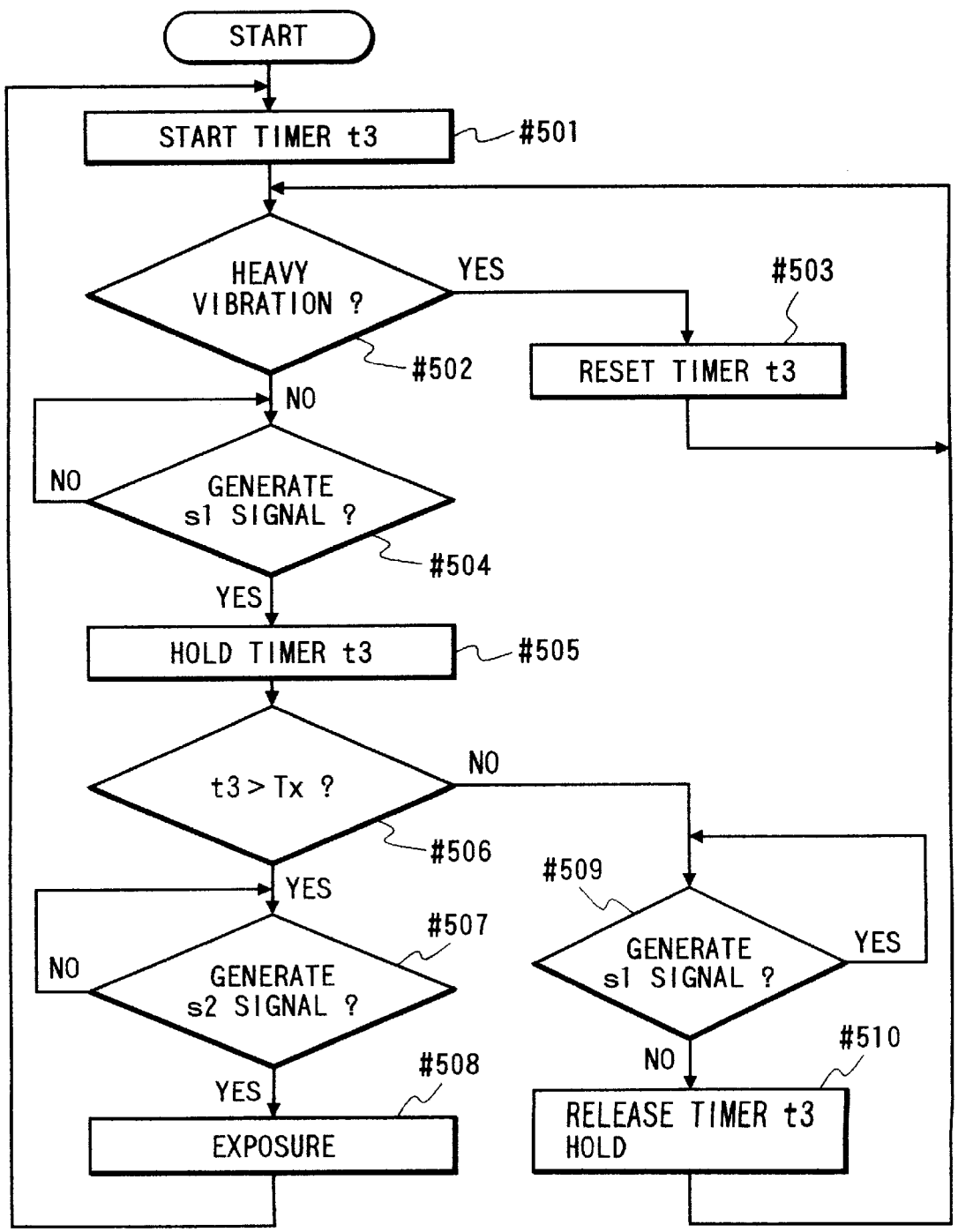
FIG. 27 is a flowchart for describing in detail a portion which locks a release operation until an output of a vibration detection sensor is stabilized in the camera of FIG. 24.

FIG. 27 is a flowchart only of a portion relating to the aforementioned countermeasure in the camera microcomputer 301. The flow of operation is started when the main switch 302 is turned on and the vibration detection sensor 312 starts operating. Specifically, the operation is started on and after the step #403 of FIG. 25.

First, at step #501 a timer t3 is started for counting a time t3 until the vibration detection sensor 312 is stabilized. At the next step #502 the output of the vibration detection sensor 312 is checked. If its output is smaller than a predetermined value, the process immediately advance to step #504, but its output exceeds the predetermined value. Specifically, when the vibration becomes heavy, the process advances to step #503 to reset the timer t3, then returns to the step #502. That is to say, it takes time until the vibration detection sensor 312 is again stabilized because the arithmetic operation in the vibration detection sensor 312 is saturated when the vibration becomes heavy to some degree.

At the next step #504, the process is on standby until the signal s1 is generated by half pushing the release operation element 303. When the signal s1 is generated, the process advances to step #505. Then, at the step #505 a time (hereinafter referred to as the time t3) from when the timer t3 starts counting till the release operation element 303 is half pushed is held. At the subsequent step #506 the time t3 is compared with a predetermined time Tx. Since a necessary blur prevention precision changes with a zooming or shutter speed, the time Tx is variable accordingly. For example, when zooming tele-operation or shutter speed is retarded, the blur prevention precision needs to be raised. Then, the time Tx is set longer as 1.5 seconds. When t3>Tx, the process advances to step #507, where the process is on standby until the signal s2 is generated by fully pushing the release operation element 303. When the signal s2 is generated, the process advances to step #508, thereby performing the exposure. At this time, the vibration detection sensor 312 is sufficiently stabilized (because t3>Tx). During the exposure, the correction optical device 311 is performing the blur correction.

Also, when it is determined at the step #506 that the relationship "t3>Tx" is not given, the vibration detection sensor 312 is not stabilized yet. Therefore, the exposure cannot be allowed. The process advances to step #509, where it is determined whether or not the signal s1 is again generated by the release operation element 303. As a result, if the signal s1 is generated, the process stays at the step. Specifically, as long as at the step #509 the signal s1 is generated by the release operation element 303, the photographing cannot be performed.

Thereafter, when it is determined at the step #509 that the signal s1 is not generated by the release operation element 303 (the photographing person releases the release operation element 303), the process advances to step #510 to release the held timer t3. Thereby, the timer t3 resumes the counting from the previously counted value. Thereafter, the process returns to the step #502. Specifically, when the vibration detection sensor 312 is not stabilized, the process does not advance from the step #506 to the step #507 of the exposure operation even if the release operation element 303 is fully pushed. The process is thus in a release lock condition. In the condition, even if the release operation element 303 continues to be pushed, the photographing cannot be started. To perform the photographing, the photographing person once releases the release operation element 303, then again tries to half (to generate the signal s1) or fully (to generate the signal s2) push the release operation element 303 (of course, on the condition that "t3>Tx"). Then, the photographing can be performed.

Specifically, the release lock condition cannot be canceled until the half pressed release operation element 303 is released.

The release operation element 303 is usually constituted of a known push switch. When the release operation element 303 is pushed by one stage, the signal s1 is generated. When it is further pressed (pushed by two stages), the signal s2 is generated. In this case, if the vibration detection sensor 312 is not stabilized (immediately after the main switch 302 is turned on or when the vibration detection sensor 312 receives a heavy vibration and again returns to its stabilized condition), then the release lock continues until the vibration detection sensor 312 is stabilized. If the release lock is canceled with the release operation element 303 being fully pushed, the photographing person has to perform photographing at an unintended timing in the same manner as the case in which a release time lag is lengthened. A photograph is taken at an undesirable photographing opportunity. Also, in the release lock condition, the photographing person tends to strongly depress the release operation element 303 without noticing the condition. This operation causes a heavy vibration to a degree which cannot be controlled in the blur prevention system. Additionally, if photographing is performed by canceling the release lock at such a timing, the image is largely deteriorated.

Considering from the aforementioned, the flow of operation in FIG. 27 is set in such a manner that the release lock condition cannot be canceled until the release operation element 303 is once released and the camera (vibration detection sensor 312) is stabilized.

The sequence of camera operation has been described on the condition that the blur prevention system is used. Depending on the condition of the camera, however, the blur prevention system is not operated in some case. A sequence of camera operation for this case is shown in FIG. 28.

Figure 28:
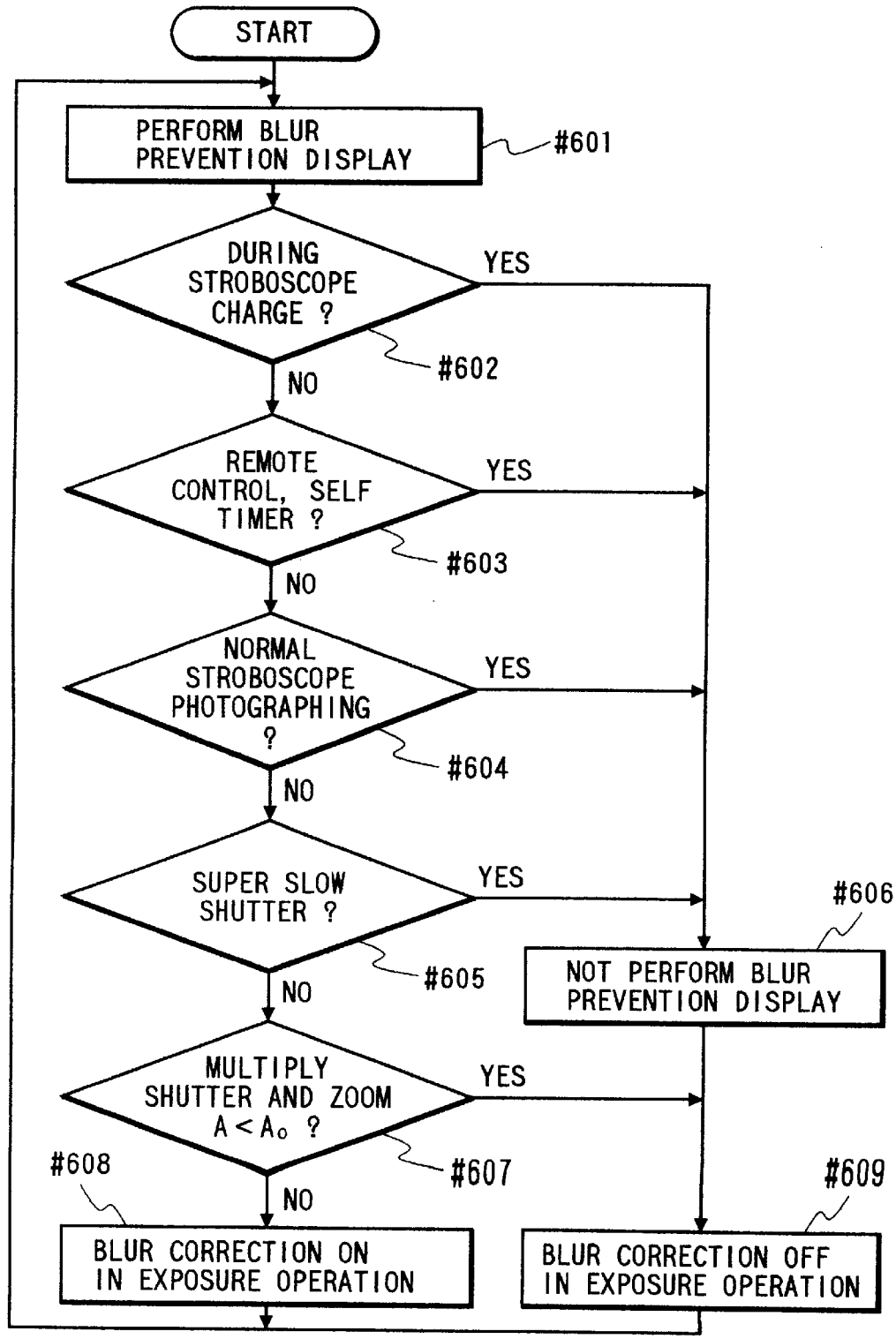
FIG. 28 is a flowchart for mainly describing an operational portion when a blur prevention system is not operated in the camera of FIG. 24.

The flow of operation in FIG. 28 is started when the main switch 302 is turned on. First at step #601 a setting is formed for performing a blur prevention display at the step #415 of FIG. 25. Here, the blur prevention display is not performed, but it is temporarily determined whether or not the blur prevention display is performed when the process goes to the step #415.

At the next step #602 it is determined whether or not the stroboscope device 308 is being electrically charged (referred to as the stroboscope charge). During the stroboscope charge, the process advances to step #606. When the stroboscope charge is completed, the process advances to step #603. At the step #603 it is determined whether or not a remote control or a self timer of the camera is being operated. During operation, the process advances to step #606. If it is not operated, the process advances to step #604.

It is determined at the step #604 whether or not a normal stroboscope photographing is performed (excluding a slow synchronous photographing or another case where the stroboscope device 308 is operated at a slow shutter speed). If the normal stroboscope photographing is performed, the process advances to step #606. If not, the process advances to step #605. At the step #605 it is determined whether or not a super slow (e.g., two seconds) shutter is operated. If the super slow shutter is operated, the process advances to step #606. If not, the process advances to step #607.

At the step #606, a setting is formed for not performing the blur prevention display at the step #415 of FIG. 25 (the setting of the step #601 is canceled).

At the step #607, it is determined whether or not a product A of shutter speed and zoom information (for example, when the shutter speed is 1/60 and a zoom focal length is 100 mm, A is 1.67) is smaller than $A_0$ (e.g., "1"). If $A<A_0$, e.g., the product A is smaller than "1", the process advances to step #609, where a setting is formed for turning off a blur correction driving of the correction optical device 311 at the step #420 of FIG. 26. On the other hand, if the product A is "1" or more, the process advances to step #608, where a setting is formed for turning on the blur correction driving of the correction optical device 311 at the step #420 of FIG. 26. Thereafter, the process returns to the step #601.

In the aforementioned flow of operation, during the stroboscope charge and when no allowance is left in the power supply, the correction optical device 311 is not operated. (In this case, functions other than the blur prevention cannot be used.)

Also, when the remote control or the self timer is used, the blur correction is not performed. Specifically, when the remote control or the self timer is operated, the camera is attached to a tripod or fixed otherwise. Since the camera is thus operated while no blurring from a hand vibration is caused, the blur correction is unnecessary. When the camera is firmly fixed to the tripod or the like, however, a shock of shutter driving at the time of camera operation or the like is transmitted to the vibration detection sensor 312, and the vibration detection sensor 312 is wrongly operated. Thereby, a blur correction precision is deteriorated. Also, there is a possibility that an image becomes worse as compared with an image when no blur correction is performed.

At the time of the normal stroboscope photographing, no blur correction is performed. Because a light emitting time of the stroboscope to the object is remarkably short, for example, 500 msec, and during such a short time the image is hardly influenced by the hand vibration on the camera.

Additionally, even during the stroboscope photographing, in the case of the slow synchronization the blur correction is performed to prevent the image from being deteriorated. Since the shutter speed is determined based on the photometry information of the object, in the case of a dark subject, a slow shutter results. In the condition, if a light is emitted from the stroboscope for photographing, the object is properly exposed to the stroboscope light. Even a background to which no stroboscope light reaches can be clearly photographed because of the slow shutter. However, in the case of the slow shutter, if no tripod is used, the photographing is usually influenced by the blurring from the hand vibration.

In the case of the super slow shutter, for example, when the focal length is 150 mm, the shutter speed is one second. When the focal length is 30 mm, the shutter speed is four seconds or longer. When the shutter speed is slow, no blur correction is performed. This is because in the super slow shutter a remarkably low frequency component is included, and, as aforementioned, the blur correction cannot be performed precisely because of the limitation in integrability of the vibration detection sensor 312. Also, the output of the vibration detection sensor 312 also includes an output drift with a remarkably low frequency. In the case of the super slow shutter, the output drift also influences and deteriorates the image.

As aforementioned, during the stroboscope charge, when the remote control or the self timer is used, during the normal stroboscope photographing, or when the super slow shutter is used, then no blur correction is performed (because the step #609 is passed). Additionally, as described in the step #606, the setting for not performing the blur prevention display is formed. Therefore, the photographing person is informed that no blur correction is performed, and is reminded that the camera needs to be securely held.

When the product of the shutter and the zoom is smaller than the predetermined value, no blur correction is performed, because the image is hardly influenced and deteriorated by the hand vibration on the camera. However, although no blur correction is performed, the blur prevention display is performed (because the step #606 is not passed). Specifically, the determination is automatically made at the step #607. Then, with a change in camera framing (this results in a change in brightness of the object and, therefore, the shutter speed changes), the blur correction function is frequently switched on or off. It is undesirable that the blur prevention display also frequently turns on or off. Also, different from the aforementioned four conditions in which no blur prevention display is performed, it is not important to let the photographing person informed that the blur correction is not performed. Even if the photographing person is not informed, the image is not deteriorated. In this case, however, if the blur prevention display is turned off, the photographing person cannot understand the reason and feel uncomfortable.

Additionally, when it is determined at the step #607 that the blur correction is unnecessary, the release lock shown in FIG. 27 is not performed unconditionally. Therefore, a quick photographing performance of the camera is improved. Specifically, at the time of the zooming wide-operation, at the time of the operation at a quick shutter speed or at the time of a combination of these operations, the blur correction is unnecessary. In this case, immediately after the main switch 302 is turned on, photographing can be performed. Even if there is a heavy vibration before the photographing, the release lock does not occur.

It is important in the flow of the operation to form the setting for not performing the blur correction at the step #609. The blur correction function is unoperated simply by not transmitting the blur correction target value to the correction optical device 311. The vibration detection sensor 312 remains operative, and all the other functions regarding the blur prevention (excluding the display) are operative.

Therefore, the blur correction can be immediately turned on or off, for example, at the determination step #607 or in another case where the blur prevention system is frequently switched to be necessary or unnecessary (because of the change in shutter speed or the like caused by the framing change). Specifically, if all the elements of the blur prevention system are turned on or off frequently, the stand-by time is necessary after each element is raised until the element is stabilized. The maneuverability of the blur prevention system is thus deteriorated. The correction optical device 311 can be immediately turned on because its constant at the time of operation is small. Therefore, when the blur prevention system is not used, instead of turning off all the elements of the system, only the correction optical device 311 is unoperated (simply by not transmitting the blur correction target value to the correction optical device 311).

As aforementioned, it is undesirable to turn off all the elements of the blur prevention system (especially the vibration detection sensor 312), because when the blur prevention system is again used, it takes time until the system is stabilized. For this, if possible, the constitutional elements of the blur prevention system except the correction optical device 311 are operated while the main switch 302 of the camera is turned on.

FIG. 29 shows a relationship between the sequence and the blur prevention system of the camera.

As aforementioned, in the conventional system, no countermeasure is taken against an unusual vibration at the time of the camera operation (for example, the release operation, the zoom operation and the like) except the vibration of the hand vibration on the camera. In the embodiment, however, based on a difference in operation time between the half switching on and the full switching on of the release operation element 303 (the value of the timer t2), the blur correction is controlled to be operated or unoperated. Specifically, when the operation time difference is within the predetermined time, no blur correction is performed or the blur correction is discontinued (at the steps #418 to #419 in FIG. 26). Therefore, when a heavy vibration with a low frequency is applied by switching on the release operation element 303 at one stroke, the blur prevention system is prevented from being wrongly operated. Further, no image deterioration arises.

Also, the display of the blur prevention system is controlled based on the operation time difference. That is to say, the notice of the blurring from the hand vibration is given when the operation time difference is within the predetermined time. Thereby, the photographing person can judge whether or not to perform the photographing again, and never misses a shutter release chance without knowing a failure in photographing.

Also, as shown in FIG. 27, in the arrangement of the embodiment, even when the release operation element 303 is not half switched on, the release lock is performed until the blur prevention system (vibration detection sensor) is properly operated. The release lock is continued until the half switching-on of the release operation element 303 is once canceled and the element is again operated. Therefore, the photographing is prevented from being performed at a photographing person's undesirable opportunity by canceling the release lock unintentionally. Further, the image is prevented from being deteriorated by a heavy vibration due to the release lock (the vibration results when to fully switch on the element, the element is strongly pressed).

As shown in FIG. 28, at the time of photographing, in the case of the fast shutter speed or in another case, the correction optical device 311 is brought in an unoperated condition, but the vibration detection sensor 312 remains operated. Therefore, a time loss resulting from the rising of the blur prevention system is eliminated at the time of operation. Further, the maneuverability of the camera can be enhanced.

Also, for example, even when the shutter speed is fast and the correction optical device 311 is unoperated, the blur prevention display is performed. Specifically, when the blur correction is automatically turned on or off in accordance with the shutter speed, the display device 313 for blur prevention is not controlled (although the blur correction is not performed, the blur prevention display is performed) at the steps #607 to #609 (#606 is not passed) in FIG. 28. Therefore, a discomfort resulting from an unnecessary change in display is not given to the photographing person.

Further, the conventional correction optical device is large-scaled. To mount the device onto the camera, the camera itself needs to be enlarged. For the compact camera, however, it is a critical defect to be large and heavy. Further, since the structure is complicated, both component cost and assembly cost are increased. The conventional correction optical device has a large number of defects and is undesirable as a household product. However, according to the correction optical device constituted as shown in FIG. 21, the aforementioned defects can be eliminated.

Further, in the conventional blur prevention system mounted on a single lens reflex camera, since in a TTL system the photographing person can point at the object through the photographing lens, it can be recognized through the finder that the blur correction is actually performed. In the compact camera, however, the photographing lens (for blur correction) and the finder lens with which the photographing person confirms the object are exclusively used, respectively. Therefore, the operation of the blur prevention system cannot be seen through the finder. (Of course, by mounting another correction optical device on the finder system, the condition of the blur correction can be known. In this case, the camera is enlarged and its cost is increased.) Therefore, in some case photographing is performed without confirming the operational condition of the blur prevention system. The photographing is performed while the blur correction is not sufficiently made. Further, a new function of the blur prevention system is mounted on the camera, but that is not satisfactorily persuasive for users. Also in this respect, by providing the camera with the finder optical device on which the blur prevention display is possible as shown in FIG. 16, the aforementioned problem can be solved while the camera is kept compact.

Further, the user is requested to operate the additional blur prevention system. Also, the blur prevention system transmits the blur prevention condition and another information to the user. Then, there is a possibility that the operation of the camera is complicated and difficult for the user. However, it is automatically determined whether or not to use the blur prevention system. Additionally, at the time of blur correction it is recognized by the display in which direction and how much there is caused a blurring. Therefore, the relevant problem can also be solved.

(Fourth Embodiment)

Figure 30:
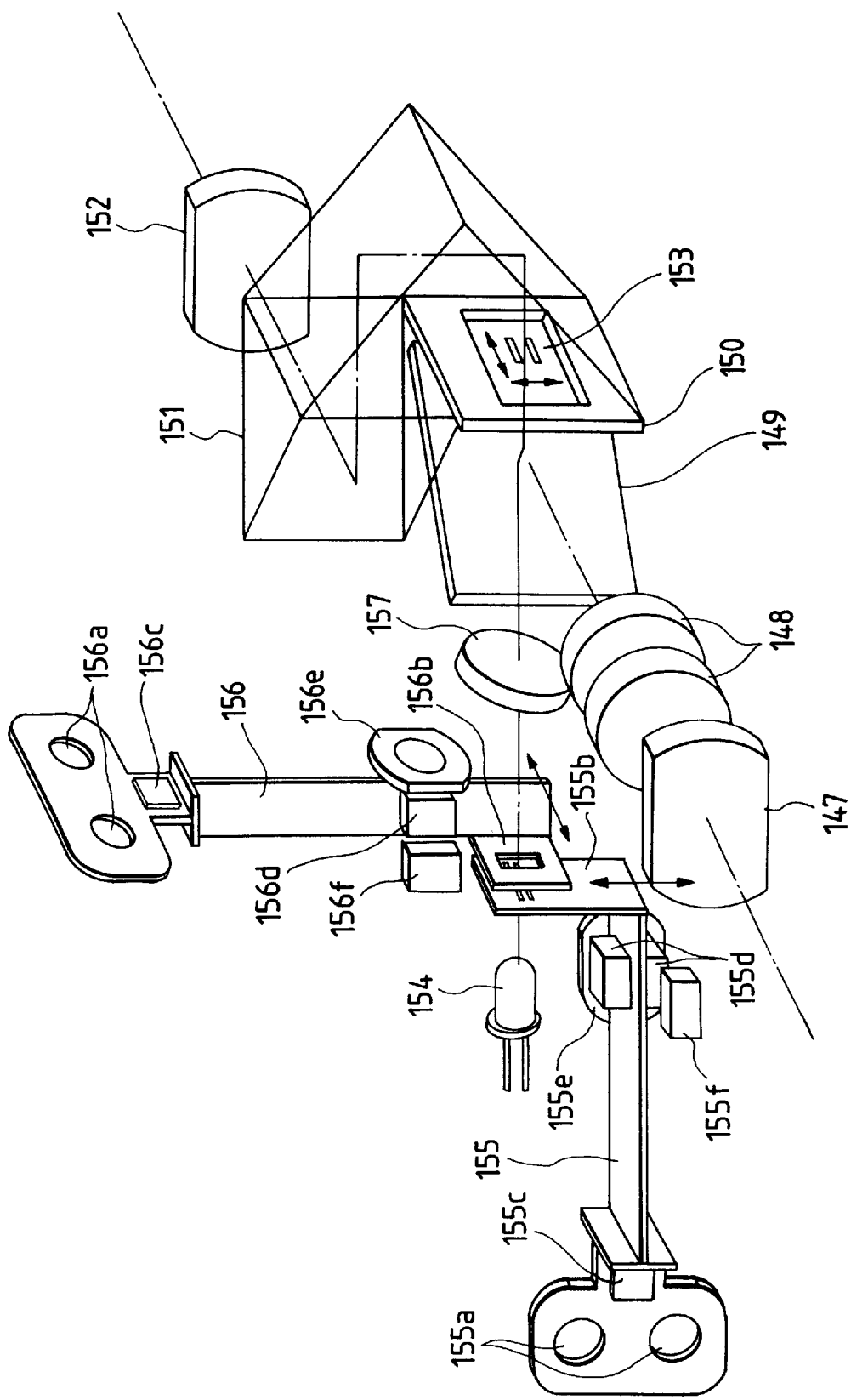
FIG. 30 is a perspective view showing a finder display device of the compact camera according to the fourth embodiment of the invention.

FIG. 30 is a perspective view showing a finder display device according to a fourth embodiment of the invention. In FIG. 30, the same portion as in FIG. 16 is denoted with the same numerals, and the description thereof is omitted.

In FIG. 30, numeral 154 denotes an LED or another light source, and 155 denotes a pitch vibration detection sensor (vibration gyroscope) for detecting a vibration in a pitch direction of the camera. The pitch vibration detection sensor 155 is constituted of fixing portions 155*a* to be fixed with screws or the like onto a bottom board (not shown), a mask portion 155*b* in which two parallel thin transmitting portions are formed on a perpendicularly bent and raised tip end of a vibrator, a piezoelectric element 155*c* placed adjacent to a root of the vibrator for detecting Coriolis force, magnets 155*d* placed on opposite faces of the vibrator, a coil 155*e* fixed to the bottom board (not shown) in a vicinity of the magnets 155*d* and a photo reflector or another position sensor 155*f* for detecting a vibration position of the vibrator.

When a predetermined electric current is passed through the coil 155*e*, the vibrator with the magnets 155*d* placed thereon is vibrated at a predetermined frequency along the vertical direction of the camera. Additionally, the mask portion 155*b* is disposed in such a manner that the longitudinal direction of the transmitting portions is perpendicular to the vibrating direction of the vibrator.

Numeral 156 denotes a yaw vibration detection sensor for detecting a vibration in a yaw direction of the camera. The yaw vibration detection sensor 156 is constituted of fixing portions 156*a* to be fixed with screws or the like onto the bottom board (not shown), a mask portion 156*b* which is formed by raising perpendicularly from a side and bending a tip end of a vibrator and forming a rectangular transmitting portion substantially in a middle of a face of the tip end, a piezoelectric element 156*c* placed adjacent to a root of the vibrator for detecting Coriolis force, magnets 156*d* placed on opposite faces of the vibrator, a coil 156*e* fixed to the bottom board (not shown) in a vicinity of the magnets 156*d* and a photo reflector or another position detection sensor 156*f* for detecting a vibration position of the vibrator.

When a predetermined electric current is passed through the coil 156*e*, the vibrator with the magnets 156*d* placed thereon is vibrated at a predetermined frequency along an optical-axis direction of the camera. Additionally, the longitudinal direction of the mask portion 156b is set perpendicular to the vibrating direction of the vibrator.

Numeral 157 denotes an image forming lens with which an image formed by the light source 154, the mask portion 155b of the pitch vibration detection sensor 155 and the mask portion 156b of the yaw vibration detection sensor 156 is formed onto a vicinity of a finder image forming face.

In the arrangement described above, when a light from the light source 154 is passed through the mask portion 155b of the pitch vibration detection sensor 155, two thin parallel photo images are formed. The two thin parallel photo images are further passed through the mask portion 156b of the yaw vibration detection sensor 156, and have their lengths restricted by short sides of the rectangular transmitting portion of the mask portion 156b. Then, the photo images are passed through the image forming lens 157 and the half mirror 149, and formed on the vicinity of the finder image forming face.

The photographing person can observe an object overlapping the blur prevention index 153 on the half mirror 149.

When the pitch vibration detection sensor 155 is vibrated, the mask portion 155b is vibrated vertically. Therefore, when the light source 154 is allowed to continuously emit lights, the blur prevention index 153 is vibrated in the pitch direction (vertically).

Additionally, when the yaw vibration detection sensor 156 is vibrated, the mask portion 156b is vibrated perpendicularly to the vibrating direction of the mask portion 155b of the pitch vibration detection sensor 155. Therefore, when the light source 154 is allowed to continuously emit lights, the transmitting position of the mask portion 156b is changed in the longitudinal direction of the two thin parallel photo images. The blur prevention index 153 appears to vibrate in the yaw direction (laterally).

Additionally, also in the fourth embodiment of the invention, in the same manner as in the third embodiment, by controlling the light source 154 at the light-on timing as shown in FIG. 17, the display in the finder image plane as shown in FIGS. 18A and 18B is possible.

The third and fourth embodiments provide following effects:

1) The vibrators of the pitch vibration detection sensor 143 or 155 and the yaw vibration detection sensor 144 or 156 are vibrated at different frequencies. In accordance with the vibrations, the light-on timing of the light source 141 or 154 is controlled. Therefore, the light from the light source 141 or 154 can be moved and displayed in the finder image plane. Additionally, the blur prevention index 153 can be displayed on an optional position of the finder image plane. The blur prevention index 153 can be continuously moved.

Also, the light-on timing of the light source 141 or 154 is controlled by the vibrations of the vibrators of the pitch vibration detection sensor 143 or 155 and the yaw vibration detection sensor 144 or 156 and additionally by vibration information obtained from these sensors. Therefore, in the finder image plane, the blur prevention index 153 can be moved and displayed in the direction reverse to the vibrating direction of the camera. Thereby, in the finder image plane, the blur prevention index 153 is continuously moved for the blur correction. Therefore, the blur prevention effect can be recognized intuitively.

Also, the pitch vibration detection sensor 143 or 155 and the yaw vibration detection sensor 144 or 156 transmit the vibration information to the correction optical device for correcting the vibration applied to the camera. As aforementioned, the actuators of these sensors also serve as actuators for the display of the blur prevention index 153. Consequently, an inexpensive and space-saving finder display device can be provided, and this can be easily applied to the compact camera.

As aforementioned, according to the third and fourth embodiments of the invention, the light projected by the light projecting means is directed in a two-dimensional direction in the finder image plane by using the excitation of the first and second vibrating means. Based on the excitation information of the first and second vibrating means which are excited at different frequencies, the light projection timing of the light projecting means is controlled, so that the index is displayed in the finder image plane. In an inexpensive and simple arrangement, the index with a good visibility can be moved and displayed on the optional position in the finder image plane.

Also, according to the third and fourth embodiments of the invention, the light projected by the light projecting means is guided in the two-dimensional direction in the finder image plane by the reflecting portions of the first and second vibrating means. Alternatively, the light from the light source is guided through the restricting portions of the first and second vibrating means in the two-dimensional direction in the finder image plane. Based on the excitation information of the first and second vibrating means which are vibrated at different frequencies and the vibration information obtained from the vibration detection means, the light projection timing of the light projecting means is controlled. Then, the index indicative of the vibrating condition is displayed in the finder image plane. Therefore, in the inexpensive and simple arrangement, the index indicative of the vibrating condition with a good visibility can be moved, displayed and recognized in the finder image plane.

Also, according to the third and fourth embodiments of the invention, by using the vibrators of the first and second vibration sensors for detecting the vibrations in the first and second directions of the optical device, the index can be moved and displayed in the finder image plane. Therefore, the vibrating condition can be recognized with a good visibility. The optical device having an inexpensive and simple arrangement can be provided.

(Fifth Embodiment)

Figure 31:
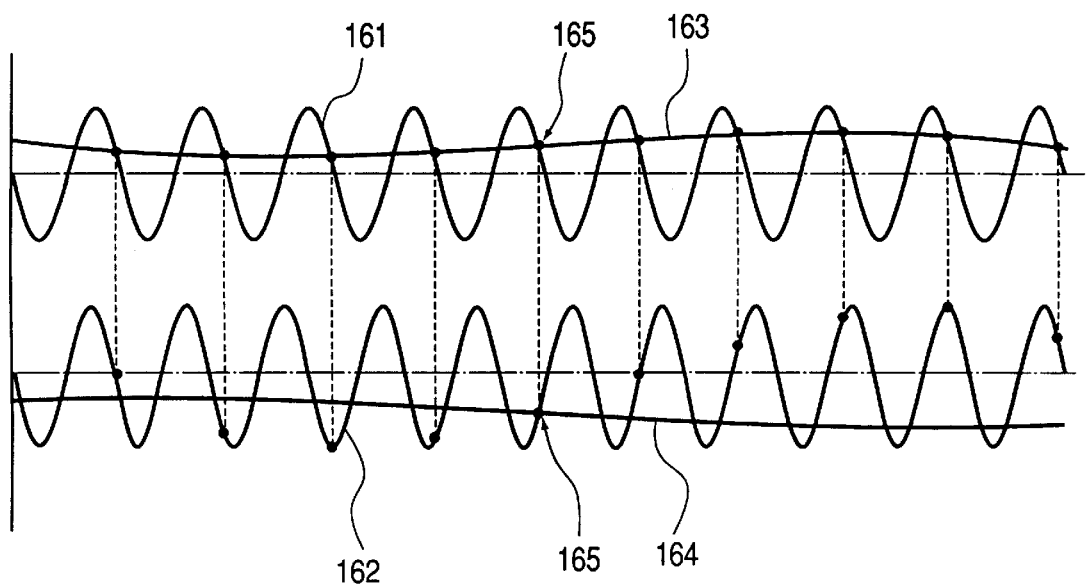
FIG. 31 is an explanatory view of a light-on timing of a light source for realizing a blur prevention display in a finder display device of a compact camera according to a fifth embodiment of the invention.

FIG. 31 is an explanatory view of a light-on timing of a light source for displaying a blur prevention index in a finder image plane of a finder display device which is mounted on a compact camera according to a fifth embodiment of the invention. This corresponds to FIG. 17 in the third embodiment. Additionally, numerals 161 to 165 denote the same components as in FIG. 17, and the description thereof is omitted.

Figure 32:
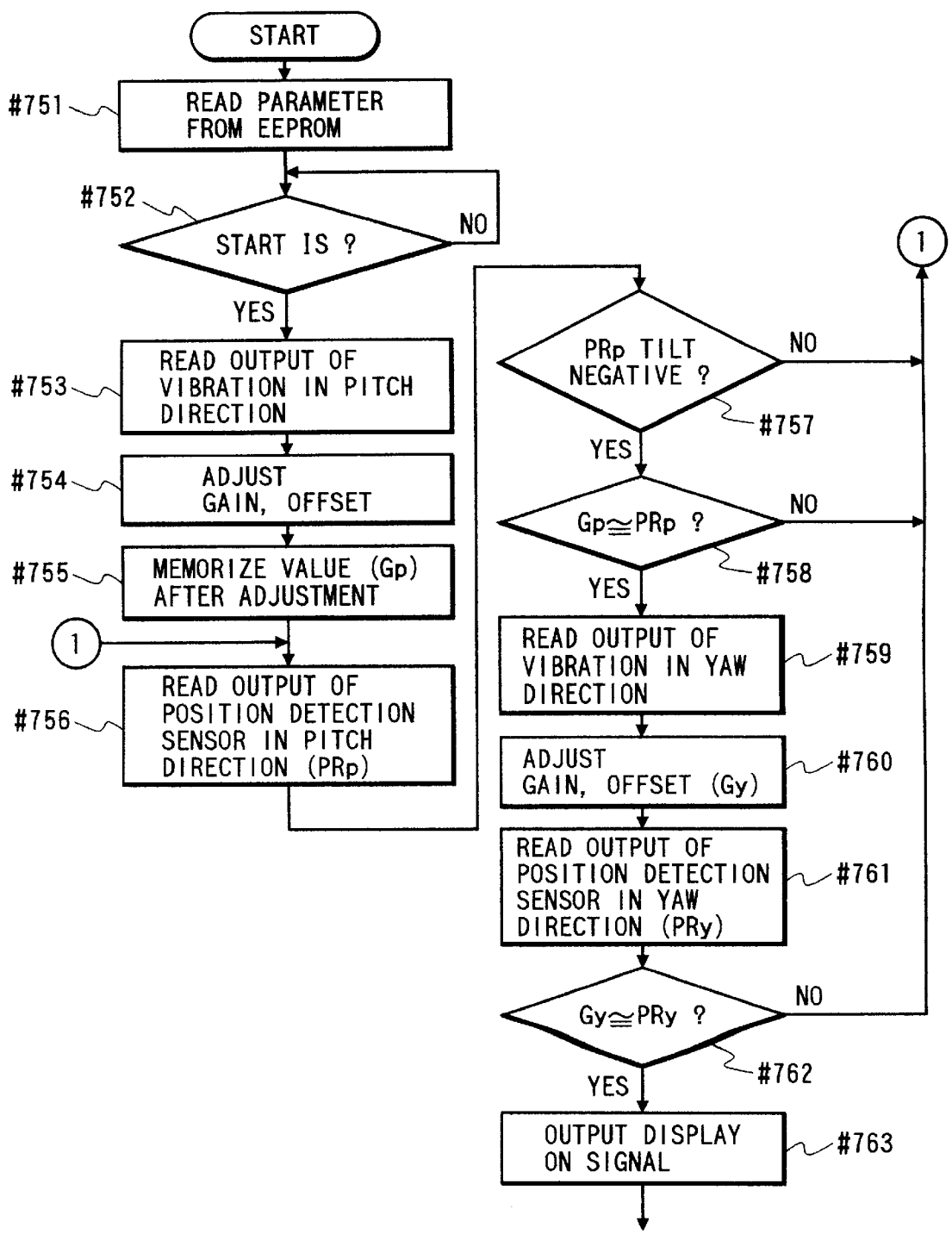
FIG. 32 is a flowchart showing an operation when a blur prevention display is performed in the finder display device of the compact camera according to the fifth embodiment of the invention.

FIG. 32 is a flowchart showing an operation sequence when a blur prevention effect is displayed in a finder image plane by the finder display device. Additionally, a circuit arrangement of the finder display device is the same as in FIG. 19.

When a main sequence of the camera is started by, for example, turning on a camera main switch, in a series of operations for an initial process, the MPU 181 shown in FIG. 19 reads from the EEPROM 183 a parameter regarding the display of the blur prevention index 153 on the finder, and stores the parameter into a predetermined address of the memory 182 (#751).

When IS (blur prevention) is started, for example, by half switching on a release operation element (YES at #752), a variable for use in processing is initialized. The MPU 181 thus reads from the A/D conversion input terminal an output of the vibration detection sensor 186 for detecting the vibration in the pitch direction (#753).

Thereafter, an offset and a gain are adjusted (#754). For the offset adjustment, deviations in offsets of the vibration detection sensor 186 and the position detection sensor 187 passed through the amplification circuits 190 and 191 are corrected when the vibration detection sensor 186 for detecting the vibration and the position detection sensor 187 for detecting the position of the vibrator of the vibration detection sensor 186 are unoperated (the vibrator of the vibration detection sensor 186 is stopped and outputs of the vibration detection sensor 186 and the position detection sensor 187 are set to zero).

Also, for the gain adjustment, if signals of the vibration detection sensor 186 and the position detection sensor 187 obtained from the amplification circuits 190 and 191 are compared as they are, even after the offset adjustment, the actually visible blur prevention effect is deviated from an observer's sense. To correct the deviation, the gain adjustment is performed. Specifically, even if the signals of the vibration detection sensor 186 and the position detection sensor 187 obtained from the amplification circuits 190 and 191 have equal values, the actual blur quantity on the finder is not necessarily equal to the position of the vibrator of the vibration detection sensor 186 at the moment. Therefore, through the gain adjustment, the output of the vibration detection sensor 186 is converted to the blur quantity on the finder. Then, the blur prevention index is displayed on the position of the vibrator of the vibration detection sensor 186 which is equal to the blur quantity.

In the actual processing of the MPU 181, the offset and gain are adjusted in a following equation:

$$Gp=AMPp(Gp'-OFFSETp)$$

In the equation, Gp is an output of the vibration detection sensor 186 after the adjustment, and Gp' is an output of the vibration detection sensor 186 before the adjustment. Constants for the offset and gain adjustments are represented by OFFSETp and AMPp, which are both prestored in the EEPROM 183. A value of OFFSETp is obtained as a difference in output between the vibration detection sensor 186 and the position detection sensor 187 when they are unoperated, and stored in the EEPROM 183. The constant AMPp is used when the output of the vibration detection sensor 186 is converted to the blur quantity on the finder, so that the blur prevention index is displayed on the vibrator position of the vibration detection sensor 186 which is equal to the quantity. The constant is experimentally obtained and stored in the EEPROM 183.

If a value of Gp is larger than the vibration width of the vibrator of the vibration detection sensor 186, the value of Gp is substituted for values on its opposite ends. Specifically, the output value of the position detection sensor 187 for detecting the position of the vibrator is set in a range from PRpmin to PRpmax. When the value of Gp is less than PRpmin:

$$Gp=PRpmin$$

Also, when the value of Gp exceeds PRpmax:

$$Gp=PRpmax$$

As shown in FIGS. 18A and 18B, the blur prevention index 153 is displayed based on the output relationship shown in FIG. 31. This prevents the problem that the blur prevention index 153 is not displayed in the finder image plane when the value of Gp is larger than the vibration width of the vibrator of the vibration detection sensor 186.

The output Gp of the vibration detection sensor 186 after the offset and gain adjustments is obtained in this manner, and stored in the memory 182 (#755).

Subsequently, the output PRp of the position detection sensor 187 for detecting the position of the vibrator of the vibration detection sensor 186 in the pitch direction is read from the A/D conversion input terminal (#756). Then, it is determined whether or not a tilt of an output signal from the position detection sensor 187 is negative (#757). This is performed by comparing the previous output from the position detection sensor 187 stored in the memory 182 with the presently read output value PRp. If the value stored in the memory 182 is an initialized value, it is determined that the tilt of the output from the position detection sensor 187 is not negative. In this manner, when the tilt of the output from the position detection sensor 187 is not negative (NO at #757), the process returns to the #756 to again read the output from the position detection sensor 187 for detecting the vibrator position of the vibration detection sensor 186 in the pitch direction from the A/D conversion input terminal. Again in the step #757, it is again determined whether or not the tilt of the output from the position detection sensor 187 is negative. The process is repeated until the tilt of the output from the position detection sensor 187 becomes negative.

Subsequently, when the tilt of the output from the position detection sensor 187 becomes negative (YES at #757), the output PRp from the position detection sensor 187 at the moment is compared with the output Gp of the vibration detection sensor 186 after the offset and gain adjustments which is stored in the memory 182 (#758). As a result, when the difference is equal to or less than a value of the parameter which is read from the EEPROM 183 into the memory 182 in a series of initial process, the outputs are regarded as substantially equal. In other words, the vibrator of the pitch vibration detection sensor 186 is regarded to be in a vibrating condition in which the blur prevention index 153 can be displayed in positions of the case where the vibration in the pitch direction at the moment is displayed in the image plane (corresponding to positions of the outputs 161 and 163 shown by black dots in FIG. 31). Then, the process advances to the next step #759. On the other hand, when both output values are not regarded as substantially equal (NO at #758), the process returns to the step #756 to again read from the A/D conversion input terminal the output of the position detection sensor 187 for detecting the vibrator position of the vibration detection sensor 186 in the pitch direction. The same operation is repeated.

At the next step #759, the MPU 181 reads from the A/D conversion input terminal an output of the vibration detection sensor 188 for detecting the vibration in the yaw direction. Thereafter, in the same manner as the output of the vibration detection sensor 186 for detecting the vibration in the pitch direction, the offset and gain are adjusted (#760). In the actual processing of the MPU 181, the offset and gain are adjusted in a following equation:

$$Gy=AMPy(Gy'-OFFSETy)$$

In the equation, Gy is an output of the vibration detection sensor 186 after the adjustment, and Gy' is an output of the vibration detection sensor 186 before the adjustment. Constants for the offset and gain adjustments are represented by OFFSETy and AMPy, respectively, which are both prestored in the EEPROM 183. A value of OFFSETy is obtained as a difference in output between the vibration detection sensor 188 and the position detection sensor 189 when they are unoperated, and stored in the EEPROM 183. The constant AMPy is used when the output of the vibration detection sensor 188 is converted to the blur quantity on the finder, so that the index is displayed on the vibrator position of the vibration detection sensor 188 which is equal to the quantity. The constant is experimentally obtained and stored in the EEPROM 183.

If a value of Gy is larger than the vibration width of the vibrator of the vibration detection sensor 188, the value of Gy is substituted for values on its opposite ends. Specifically, the output value of the position detection sensor 189 for detecting the position of the vibrator is set in a range from PRymin to PRymax. When the value of Gy is less than PRymin:

$$Gy=PRymin$$

Also, when the value of Gy exceeds PRymax:

$$Gy=PRymax$$

The output Gy of the vibration detection sensor 188 after the offset and gain adjustments is obtained in this manner, and stored in the memory 182 (#760).

Subsequently, the MPU 181 reads from the A/D conversion input terminal the output PRy of the position detection sensor 189 for detecting the position of the vibrator of the vibration detection sensor 188 in the yaw direction (#761). Then, the output from the position detection sensor 189 at the moment is compared with the output Gy of the vibration detection sensor 188 after the offset and gain adjustments which is stored in the memory 182 (#762). As a result, when the difference is equal to or less than the value of the parameter which is read from the EEPROM 183 into the memory 182 in a series of initial process, the outputs are regarded as substantially equal. In other words, the vibrator of the yaw vibration detection sensor 188 is regarded to be in a vibrating condition in which the blur prevention index 153 can be displayed in the positions of the case where the vibration in the yaw direction at the moment is displayed in the image plane. Then, the process advances to step #763 for displaying the blur prevention index 153. On the other hand, when both output values are not regarded as substantially equal, the process returns to the step #756 to again read from the A/D conversion input terminal the output of the position detection sensor 187 for detecting the vibrator position of the vibration detection sensor 186 in the pitch direction.

At the step #763 for displaying the blur prevention index 153, the MPU 181 outputs an display on signal to the driving circuit 185 (the timing corresponds to the light emitting timing 165 shown in FIG. 31). During the output of the display on signal, the driving circuit 185 turns on the LED 184. While the LED 184 is turned on, the blur prevention index 153 is displayed on the finder as shown in FIGS. 18A and 18B.

As aforementioned, the output of the position detection sensor 187 for detecting the position of the vibrator in the pitch direction substantially equals the output of the vibration detection sensor 186. Also, the tilt of the output signal from the position detection sensor 187 is negative. Then, the output of the position detection sensor 189 for detecting the position of the vibrator in the yaw direction substantially equals the output of the vibration detection sensor 188. In this case, by displaying the blur prevention index 153, the index displayed on the finder constantly follows up an object which is observed through the finder. Therefore, the blur prevention effect can be confirmed.

According to the fifth embodiment, the vibrators of the vibration detection sensors for detecting the vibrations in the pitch and yaw directions of the camera are used as optical path changing members for displaying the blur prevention index in the finder. In this case, when the vibrators are in the vibrating positions to which the light from the light source can be guided via the mask (when the outputs of the vibration detection sensor and the position detection sensor are substantially equal to each other), a display-on signal is emitted to turn on the light source. Therefore, the finder display device can be made inexpensive and compact. Additionally, the blur prevention index can be displayed in accordance with the vibration in the finder image plane. Consequently, since the blur prevention index constantly follows up the object which is observed through the finder, the blur prevention effect can be easily confirmed.

Also, after making the gain and offset adjustments of the outputs of the vibration detection sensor and the position detection sensor, the outputs are compared with each other to determined whether or not they are substantially equal to each other. Further, when the output range of the vibration detection sensor exceeds the output range of the position detection sensor, an output of an exceeded portion is substituted for a maximum or minimum value of the position detection output. Therefore, the blur prevention index can be displayed on the position substantially corresponding to the actual vibration in the finder image plane.

Further, for example, first, when the tilt of the output from the position detection sensor is positive, the output of the vibration sensor is compared with the output from the position detection means. Then, by emitting the display-on signal, the light source is turned on. Subsequently, when the tilt of the output from the position detection sensor is negative, the output of the vibration sensor is compared with the output from the position detection sensor. Then, by emitting the display-on signal, the light source is turned on. In this case, because of a response delay in the display-on signal and light projection timing, the display of the blur prevention index appears to be blurred (doubled). (When the tilt of the output is positive and negative, the direction of the response delay is reversed.) Therefore, only at the timing when the output of the position detection sensor has a positive (or negative) tilt, the output of the vibration sensor is compared with the output of the position detection sensor.

(Sixth Embodiment)

Figure 33:
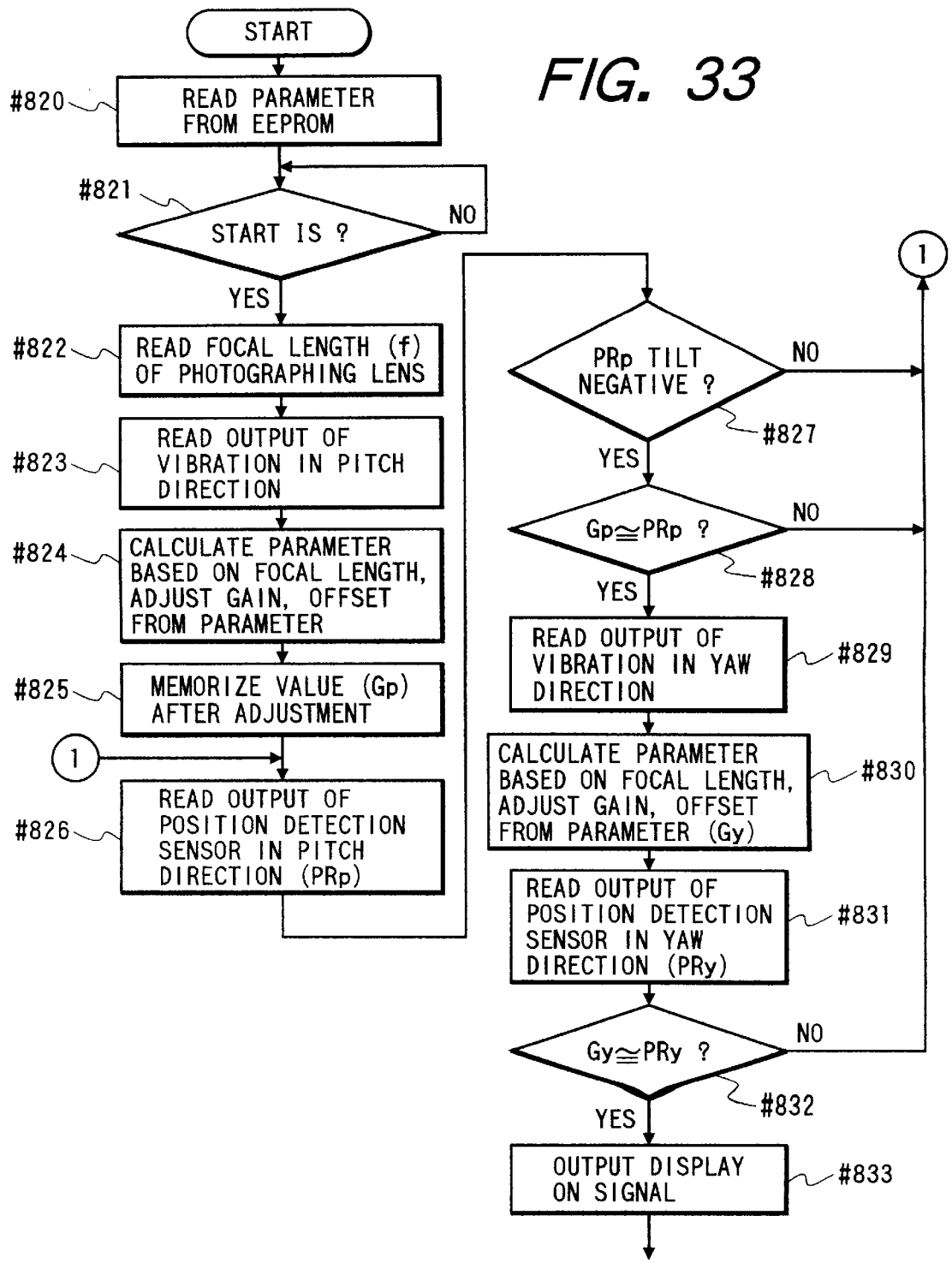
FIG. 33 is a flowchart showing an operation when a blur prevention display is performed in a finder display device of a compact camera according to a sixth embodiment of the invention.

FIG. 33 is a flowchart showing an operation sequence when a blur prevention effect is recognized by a display on a finder in a finder display device which is mounted on a compact camera according to a sixth embodiment. Additionally, a circuit arrangement of the finder display device is the same as in FIG. 19. In the following description, FIGS. 17 to 19 are used as required.

When a main sequence of the camera is started by, for example, turning on a camera main switch, in a series of operations for an initial process, the MPU 181 reads from the EEPROM 183 a parameter regarding the display of the blur prevention index 153 on the finder, and stores the parameter into a predetermined address of the memory 182 (#820).

When IS (blur prevention) is started, for example, by half switching on a release operation element (YES at #821), a variable for use in processing is initialized. Additionally, a focal length of the photographing lens at the moment is read and stored in a predetermined address of the memory 182 (#822). Thereafter, the MPU 181 thus reads from the A/D conversion input terminal an output of the vibration detection sensor 186 for detecting the vibration in the pitch direction (#823).

Subsequently, the MPU 181 makes offset and gain adjustments (#824). For the offset adjustment, deviations in offsets of the vibration detection sensor 186 and the position detection sensor 187 passed through the amplification circuits 190 and 191 are corrected when the vibration detection sensor 186 for detecting the vibration and the position detection sensor 187 for detecting the position of the vibrator of the vibration detection sensor 186 are unoperated (the vibrator of the vibration detection sensor 186 is stopped and outputs of the vibration detection sensor 186 and the position detection sensor 187 are set to zero).

Also, for the gain adjustment, if signals of the vibration detection sensor 186 and the position detection sensor 187 obtained from the amplification circuits 190 and 191 are compared as they are, even after the offset adjustment, the actually visible blur prevention effect is deviated from an observer's sense. To correct the deviation, the gain adjustment is performed. Specifically, even if the signals of the vibration detection sensor 186 and the position detection sensor 187 obtained from the amplification circuits 190 and 191 have equal values, the actual blur quantity on the finder is not necessarily equal to the position of the vibrator of the vibration detection sensor 186 at the moment. Therefore, through the gain adjustment, the output of the vibration detection sensor 186 is converted to the blur quantity on the finder. Then, the blur prevention index is displayed on the position of the vibrator of the vibration detection sensor 186 which is equal to the blur quantity.

The deviation quantity varies with a finder magnification which is linked with the focal distance of the photographing lens. Therefore, a parameter needs to be set for each focal length of the photographing lens and adjusted. As the focal length of the photographing lens is lengthened, the value becomes larger. Also, on a wide-angle side the blur quantity on the finder is small. Therefore, when the sensor output is small, in order to obtain a fine visibility on the finder, the blur prevention index had better not be moved. Therefore, a parameter on the wide-angle side is set smaller than that on a telephoto side. Specifically, originally the focal distance of the photographing lens is set in proportion to the gain parameter. In the embodiment, however, the parameter on the wide-angle side is set below a straight line indicative of the proportional relationship.

In the actual processing of the MPU 181, the offset and gain are adjusted in a following equation:

$$Gp = AMPp(Gp' - OFFSETp)$$

In the equation, Gp is an output of the vibration detection sensor 186 after the adjustment, and Gp' is an output of the vibration detection sensor 186 before the adjustment. Constants for the offset and gain adjustments are represented by OFFSETp and AMPp, which are both prestored in the EEPROM 183. A value of OFFSETp is obtained as a difference in output between the vibration detection sensor 186 and the position detection sensor 187 when they are unoperated, and stored in the EEPROM 183. The constant AMPp is used when the output of the vibration detection sensor 186 is converted to the blur quantity on the finder, so that the blur prevention index is displayed on the vibrator position of the vibration detection sensor 186 which is equal to the quantity. The constant is obtained in the following equation by using a focal length f stored in the memory 132.

$$AMPp = AMPpo \times f/fo$$

Here, AMPpo is a constant for the gain adjustment while a central focal length in a zoom range of the photographing lens is fo. The constant is experimentally obtained and stored in the EEPROM 133. Also, a parameter for the gain adjustment on the wide-angle side is set small. For this purpose, when the focal length f is shorter than a predetermined value fw, the parameter of the gain adjustment is obtained in the following equation.

$$AMPp = AMPpo/fo \times (a \times f + (1-a) \times fw)$$

If a value of Gp is larger than the vibration width of the vibrator of the vibration detection sensor 186, the value of Gp is substituted for values on its opposite ends. Specifically, the output value of the position detection sensor 187 for detecting the position of the vibrator is set in a range from PRpmin to PRpmax. When the value of Gp is less than PRpmin:

$$Gp = PRpmin$$

Also, when the value of Gp exceeds PRpmax:

$$Gp = PRpmax$$

The output Gp of the vibration detection sensor 186 after the offset and gain adjustments is obtained in this manner, and stored in the memory 182 (#825).

Subsequently, the output PRp of the position detection sensor 187 for detecting the position of the vibrator of the vibration detection sensor 186 in the pitch direction is read from the A/D conversion input terminal (#826). Then, it is determined whether or not a tilt of an output signal from the position detection sensor 187 is negative (#827). This is performed by comparing the previous output from the position detection sensor 187 stored in the memory 182 with the presently read output value PRp. If the value stored in the memory 182 is an initialized value, it is determined that the tilt of the output from the position detection sensor 187 is not negative. In this manner, when the tilt of the output from the position detection sensor 187 is not negative (NO at #827), the process returns to the #826 to again read the output from the position detection sensor 187 for detecting the vibrator position of the vibration detection sensor 186 in the pitch direction from the A/D conversion input terminal. Again in the step #827, it is again determined whether or not the tilt of the output from the position detection sensor 187 is negative. The process is repeated until the tilt of the output from the position detection sensor 187 becomes negative.

Subsequently, when the tilt of the output from the position detection sensor 187 becomes negative (YES at #827), the output PRp from the position detection sensor 187 at the moment is compared with the output Gp of the vibration detection sensor 186 after the offset and gain adjustment stored in the memory 182 (#828). As a result, when the difference is equal to or less than a value of the parameter which is read from the EEPROM 183 into the memory 182 in a series of initial process, the outputs are regarded as substantially equal. In other words, the vibrator of the pitch vibration detection sensor 186 is regarded to be in a vibrating condition in which the blur prevention index 153 can be displayed in positions of the case where the vibration in the pitch direction at the moment is displayed in the image plane (corresponding to positions of the outputs 161 and 163 shown by black dots in FIG. 17). Then, the process advances to the next step #759. On the other hand, when both output values are not regarded as substantially equal (NO at #828), the process returns to the step #826 to again read from the A/D conversion input terminal the output of the position detection sensor 187 for detecting the vibrator position of the vibration detection sensor 186 in the pitch direction. The same operation is repeated.

At the next step #829, the MPU 181 reads from the A/D conversion input terminal an output of the vibration detection sensor 188 for detecting the vibration in the yaw direction. Thereafter, in the same manner as the output of the vibration detection sensor 186 for detecting the vibration in the pitch direction, the offset and gain are adjusted (#830). In the actual processing of the MPU 181, the offset and gain are adjusted in a following equation:

$$Gy=AMPy(Gy'-OFFSETy)$$

In the equation, Gy is an output of the vibration detection sensor 186 after the adjustment, and Gy' is an output of the vibration detection sensor 186 before the adjustment. Constants for the offset and gain adjustments are represented by OFFSETy and AMPy, respectively, which are both prestored in the EEPROM 183. A value of OFFSETy is obtained as a difference in output between the vibration detection sensor 188 and the position detection sensor 189 when they are unoperated, and stored in the EEPROM 183. The constant AMPy is used when the output of the vibration detection sensor 188 is converted to the blur quantity on the finder, so that the index is displayed on the vibrator position of the vibration detection sensor 188 which is equal to the quantity. The constant is obtained in the following equation by using the focal length f stored in the memory 132.

$$AMPp=AMPpo \times f/fo$$

Here, AMPpo is a constant for the gain adjustment while a central focal length in a zoom range of the photographing lens is fo. The constant is experimentally obtained and stored in the EEPROM133. Also, a parameter for the gain adjustment on the wide-angle side is set small. For this purpose, when the focal length f is shorter than a predetermined value fw, the parameter of the gain adjustment is obtained in the following equation.

$$AMPp=AMPpo/fo \times (a \times f+(1-a) \times fw)$$

If a value of Gy is larger than the vibration width of the vibrator of the vibration detection sensor 188, the value of Gy is substituted for values on its opposite ends. Specifically, the output value of the position detection sensor 189 for detecting the position of the vibrator is set in a range from PRymin to PRymax. When the value of Gy is less than PRymin:

$$Gy=PRymin$$

Also, when the value of Gy exceeds PRymax:

$$Gy=PRymax$$

The output Gy of the vibration detection sensor 188 after the offset and gain adjustment is obtained in this manner, and stored in the memory 182.

Subsequently, the MPU 181 reads from the A/D conversion input terminal the output PRy of the position detection sensor 189 for detecting the position of the vibrator of the vibration detection sensor 188 in the yaw direction (#831). Then, the output from the position detection sensor 189 at the moment is compared with the output Gy of the vibration detection sensor 188 after the offset and gain adjustment stored in the memory 182 (#832). As a result, when the difference is equal to or less than the value of the parameter which is read from the EEPROM 183 into the memory 182 in a series of initial process, the outputs are regarded as substantially equal. In other words, the vibrator of the yaw vibration detection sensor 188 is regarded to be in a vibrating condition in which the blur prevention index 153 can be displayed in the positions of the case where the vibration in the yaw direction at the moment is displayed in the image plane. Then, the process advances to step #833 for displaying the blur prevention index 153. On the other hand, when both output values are not regarded as substantially equal, the process returns to the step #826 to again read from the A/D conversion input terminal the output of the position detection sensor 187 for detecting the vibrator position of the vibration detection sensor 186 in the pitch direction.

At the step #833 for displaying the blur prevention index 153, the MPU 181 outputs a display on signal to the driving circuit 185 (the timing corresponds to the light emitting timing 165 shown in FIG. 17). During the output of the display on signal, the driving circuit 185 turns on the LED 184. While the LED 184 is turned on, the blur prevention index 153 is displayed on the finder as shown in FIGS. 18A and 18B.

As aforementioned, the output of the position detection sensor 187 for detecting the position of the vibrator in the pitch direction substantially equals the output of the vibration detection sensor 186. Also, the tilt of the output signal from the position detection sensor 187 is positive. Then, the output of the position detection sensor 189 for detecting the position of the vibrator in the yaw direction substantially equals the output of the vibration detection sensor 188. In this case, by displaying the blur prevention index 153, the index displayed on the finder constantly follows up an object which is observed through the finder. Therefore, the blur prevention effect can be confirmed.

According to the first and sixth embodiments, when the display-on signal is generated for displaying the blur prevention index in the finder image plane, not only the outputs of the vibration detection sensors and the position detection outputs of the vibrators but also the focal length information of the photographing lens at the moment are used. Therefore, in accordance with a change in image angle which is caused by a change in focal length, the blur prevention index can be displayed on an accurate position (a position which is regarded as a position on which the actual vibration is displayed as the index in the finder image plane). Consequently, the blur prevention effect can be more precisely confirmed.

Also, as described in the first embodiment, the relationship of the focal distance for each of plural divided zones and the deviation quantity of the display position of the blur prevention index with a change in the finder magnification is prestored in the EEPROM. At the time of displaying the blur prevention index, the value corresponding to the focal distance at the moment is read from the EEPROM183. The value is used for the gain adjustment when the display-on signal is generated. Therefore, the processing in the MPU 181 is simplified.

Also, in the sixth embodiment, when the blur prevention index is displayed, the focal distance at the moment is read. Through arithmetic operation, the parameter for the gain adjustment is calculated. By using the parameter, the display-on signal is generated. Therefore, a storage region of the EEPROM can be reduced.

The case where the invention is applied to the compact camera has been described, but the invention can be applied to a single lens reflex camera, a digital camera and a video camera. Further, the invention can be applied to a device which can change focal distances and is provided with a blur correction function.

Also, the vibration gyroscope is used as the vibration sensor, but the vibration sensor is not limited to this as long as vibrations can be detected by vibrating vibrators. Further, a plate-like vibrating piece is used as the vibrator, but a columnar or another vibrator can be used.

Also in the embodiments, by reading the focal length of the photographing lens, using the prestored value or generating the display-on signal through arithmetic operation, the display position of the blur prevention index is changed to an optimum position. The invention is not thus limited. By controlling the light-on timing of the light source in accordance with the focal length, the display position of the blur prevention index may be changed. Alternatively, a member for changing the optical path is provided on any position between the light source and the finder optical path. In this case, by adjusting the optical path changing member in accordance with the focal length, the display position of the blur prevention index can be changed.

The individual components shown in schematic or block form in the Drawings are all well-known in the camera arts and their specific construction and operation are not critical to the operation or best mode for carrying out the invention.

While the present invention has been described with respect to what is presently considered to be the preferred embodiments, it is to be understood that the invention is not limited to the disclosed embodiments. To the contrary, the invention is intended to cover various modifications and equivalent arrangements included within the spirit and scope of the appended claims. The scope of the following claims is to be accorded the broadest interpretation so as to encompass all such modifications and equivalent structures and functions.

What is claimed is:

1. A display device comprising:
   a projection means for projecting a light;
   a display means for guiding said light projected by said projection means to a predetermined display portion to display an index in said display portion;
   a variable means for periodically changing a projecting direction of said light of said projection means; and
   a control means for determining a projection timing of said projection means in accordance with said projecting direction changed by said variable means to control a position of the index on said display portion.

2. The device according to claim 1, wherein said display portion is provided in a camera finder.

3. The device according to claim 1, wherein said variable means includes a means for displacing a mask means having a hole for passing the light from said projection means to change said projecting direction.

4. The device according to claim 3, wherein said variable means includes a means for alternately displacing said mask means.

5. The device according to claim 1, wherein said variable means includes a means for alternately changing said projecting direction.

6. The device according to claim 1, wherein said control means includes a means for determining said projection timing in accordance with an output of a detection means which detects the projecting direction of said projection means changed by said variable means.

7. The device according to claim 6, wherein said variable means includes a means for displacing the mask means having the hole for passing said light from said projection means to change said projecting direction, and said detection means includes a means for detecting a position of said mask means to detect said projecting direction.

8. The device according to claim 1, wherein said control means includes a means for determining said projection timing in accordance with a display indication signal indicative of a position in which said index is positioned on said display portion and said projecting direction.

9. The device according to claim 8, wherein said control means includes a means for allowing said projection means to operate at a timing at which the position indicated by said display indication means and a position in which said light is projected on said display portion coincide with each other.

10. The device according to claim 8, wherein said display indication signal corresponds to a vibration of the device.

11. The device according to claim 8, wherein said display indication signal indicates a distance measuring area.

12. The device according to claim 1, wherein said display portion includes a two-dimensional area.

13. The device according to claim 12, wherein said variable means includes a first projecting direction change means for changing said projecting direction in a first direction and a second projecting direction change means for changing said projecting direction in a second direction which is different from said first direction.

14. The device according to claim 13, wherein when said index is positioned in a predetermined position in said area, said control means includes a means for allowing said projection means to operate at a timing at which said first and second projecting direction change means are both in a condition in which said light is projected in said predetermined position.

15. The device according to claim 14, wherein said first projecting direction change means includes a means for alternately changing said projecting direction in a predetermined cycle, and said second projecting direction change means includes a means for alternately changing said projecting direction in a second cycle which is different from said predetermined cycle.

16. The device according to claim 1, further comprising:
   a vibration detection sensor including a vibrator, wherein said change means includes a means for changing said projecting direction by means of excitation of said vibrator.

17. The device according to claim 16, wherein said control means includes a means for determining the projection timing of said projection means in accordance with said projecting direction changed by said variable means and an output of said vibration detection sensor to move the index on said display portion in response to the output of said vibration detection sensor.

18. The device according to claim 16, wherein said variable means includes a means for displacing the mask means having a hole for passing said light from said projection means by means of the excitation of said vibrator to change said projecting direction.

19. The device according to claim 1, wherein said control means includes a means for changing a displacement of said index in accordance with a focal length of an optical device which is used together.

20. The device according to claim 19, wherein said control means includes a means for reducing the displacement of said index as the focal length of said optical device is shortened.

* * * * *

UNITED STATES PATENT AND TRADEMARK OFFICE
CERTIFICATE OF CORRECTION

PATENT NO.   : 6,006,041
DATED        : December 21, 1999
INVENTOR(S)  : Masao Mizumaki, et al.

It is certified that error appears in the above-identified patent and that said Letters Patent is hereby corrected as shown below:

Column 1,
Lines 16 and 21, "decentring" should read -- off-centering --.
Line 48, "increasingly" should read -- often --.
Line 49, "and generalized" should be deleted.

Column 4,
Line 6, "decentring" (both occurrences) should read -- off-centering --.
Lines 26, 37, 39 and 65, "decentring" should read -- off-centering --.

Column 6,
Line 26, "decentring" should read -- off-centering --.
Line 55, ""delay+$\Delta$T(Y) "." should read -- "delay+$\Delta$T(P)". --.
Line 56, ""delay+$\Delta$T(Y) "," should read -- "delay+$\Delta$T(P)", --.
Line 65, ""delay+$\Delta$T(P) "." should read -- "delay+$\Delta$T(Y)". --.
Line 66, ""delay+$\Delta$T(P) "," should read -- "delay+$\Delta$T(Y)". --.

Column 7,
Line 35, "decentring" (both occurrences) should read -- off-centering --.
Line 48, 56 and 58, "decentring" should read -- off-centering --.

Column 8,
Line 7, "decentring" should read -- off-centering --.

Column 9,
Line 23, "decentring" should read -- off-centering --.

Column 28,
Line 23, "Considering from the" should read -- As --.

Column 30,
Line 11, "informed" should read -- know --.

Column 31,
Line 34, "brought" should read -- left --.
Line 36, "rising" should read -- energizing --.

Column 36,
Line 25, "tilt" should read -- value --.

UNITED STATES PATENT AND TRADEMARK OFFICE
CERTIFICATE OF CORRECTION

PATENT NO. : 6,006,041
DATED : December 21, 1999
INVENTOR(S) : Masao Mizumaki, et al.

It is certified that error appears in the above-identified patent and that said Letters Patent is hereby corrected as shown below:

Column 37,
Line 47, "an display on" should read -- a display-on --.
Line 57, "tilt" should read -- value --.

Column 38,
Lines 25, 30 and 37, "tilt" should read -- value --.
Line 40, "tilt," should read -- value, --.

Column 40,
Lines 26, 32, 33, 39, 41 and 43, "tilt" should read -- value --.

Column 42,
Line 21, "tilt" should read -- value --.

Column 43,
Line 61, "the" should read -- a --.

Signed and Sealed this

Thirteenth Day of November, 2001

Attest:

NICHOLAS P. GODICI
Attesting Officer
Acting Director of the United States Patent and Trademark Office